US006262982B1

(12) United States Patent
Donahue et al.

(10) Patent No.: US 6,262,982 B1
(45) Date of Patent: *Jul. 17, 2001

(54) HIGH BANDWIDTH BROADCAST SYSTEM HAVING LOCALIZED MULTICAST ACCESS TO BROADCAST CONTENT

(75) Inventors: Paul W. Donahue; Jeffrey A. Dankworth; Larry W. Hinderks, all of Reno, NV (US); Laurence A. Fish; Ian A. Lerner, both of San Diego, CA (US); Thomas C. Ballister, Reno, NV (US); Roswell R. Roberts, III, San Diego, CA (US)

(73) Assignee: StarGuide Digital Networks, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/488,009

(22) Filed: Jan. 20, 2000

Related U.S. Application Data

(63) Continuation of application No. 08/969,164, filed on Nov. 12, 1997, now Pat. No. 6,101,180.
(60) Provisional application No. 60/029,427, filed on Nov. 12, 1996, provisional application No. 60/039,672, filed on Feb. 28, 1997, and provisional application No. 60/057,857, filed on Sep. 2, 1997.

(51) Int. Cl.[7] .................................................. H04Q 11/04
(52) U.S. Cl. ..................... 370/352; 370/270; 370/389; 370/401; 370/432; 370/486; 348/6
(58) Field of Search ..................... 370/259, 352, 370/395, 400, 401, 402, 421, 432, 465, 468, 389, 390, 270, 337, 347, 486, 351; 348/6, 10, 12, 13

(56) References Cited

U.S. PATENT DOCUMENTS

| 4,018,993 | 4/1977 | Edstrom ........................... 179/15 BY |
| 4,933,936 | 6/1990 | Rasmussen et al. ................ 370/85.9 |
| 5,280,625 | 1/1994 | Howarter et al. ..................... 395/200 |

(List continued on next page.)

FOREIGN PATENT DOCUMENTS

WO 97/48051  12/1997  (WO) ............................. G06F/13/00

OTHER PUBLICATIONS

Johnson, Software Guarantees Data Delivery, Data Communications, Apr. 1995, pp. 45–46.

IMPI, Implementing IP Multicast in Different Network Infrastructures, Stardust Technologies Inc. "Copyright 1995–1997."

(List continued on next page.)

*Primary Examiner*—Douglas Olms
*Assistant Examiner*—Shick Hom
(74) *Attorney, Agent, or Firm*—Nixon & Vanderhye P.C.; Robert C. Ryan; McAndrews, Held & Malloy, Ltd.

(57) ABSTRACT

A method of multicasting digital data to a user accessing an Internet connection is disclosed. The method includes placing digital data that is to the multicast in IP protocol to generate IP digital data. The IP digital data is transmitted from a transmission site to a remote Internet point of presence through a dedicated transmission channel substantially separate from Internet backbone. The dedicated transmission channel may be, for example, a satellite channel. At the remote Internet point of presence, the IP digital data is multicast for delivery to at least one receiving Internet user's apparatus connected to but distal from the remote Internet point of presence.

78 Claims, 33 Drawing Sheets

U.S. PATENT DOCUMENTS

| | | | |
|---|---|---|---|
| 5,394,561 | 2/1995 | Freeburg | 455/13.1 |
| 5,412,660 | 5/1995 | Chen et al. | 370/110.1 |
| 5,432,907 | 7/1995 | Picazo et al. | 395/200 |
| 5,457,808 | 10/1995 | Osawa et al. | 455/8 |
| 5,485,464 | 1/1996 | Strodtbeck et al. | 370/95.2 |
| 5,517,494 | 5/1996 | Green | 370/60 |
| 5,541,927 | 7/1996 | Kristol et al. | 370/94.2 |
| 5,550,984 | 8/1996 | Gelb et al. | 395/200 |
| 5,594,490 * | 1/1997 | Dawson et al. | 348/6 |
| 5,625,624 | 4/1997 | Rosen et al. | 370/307 |
| 5,684,799 | 11/1997 | Bigham et al. | 370/397 |
| 5,732,078 | 3/1998 | Arango | 370/335 |
| 5,751,961 | 5/1998 | Smyk | 395/200.47 |
| 5,764,916 | 6/1998 | Busey et al. | 395/200.57 |
| 5,778,187 * | 7/1998 | Montiero et al. | 370/351 |
| 5,790,541 * | 8/1998 | Patrick et al. | 370/402 |
| 5,812,786 * | 9/1998 | Seazholtz et al. | 370/468 |
| 5,818,845 * | 10/1998 | Moura et al. | 370/449 |
| 5,828,844 * | 10/1998 | Civanlar et al. | 370/400 |
| 5,852,721 * | 12/1998 | Dillon et al. | 370/401 |
| 5,857,072 * | 1/1999 | Crowle | 370/471 |
| 5,881,131 * | 3/1999 | Farris et al. | 379/27 |
| 5,892,910 * | 4/1999 | Safadi | 348/10 |
| 5,893,091 * | 4/1999 | Hunt et al. | 707/3 |
| 5,907,544 * | 5/1999 | Rypinski | 370/347 |
| 5,959,989 * | 9/1999 | Gleeson et al. | 370/401 |
| 5,991,306 * | 11/1999 | Burns et al. | 370/429 |
| 6,081,533 * | 6/2000 | Laubach et al. | 370/395 |
| 6,101,180 * | 8/2000 | Donahue et al. | 370/352 |
| 6,192,051 * | 2/2001 | Lipman et al. | 370/389 |

OTHER PUBLICATIONS

Klett, "Cisco Attacks Crowing on Multimedia Nets," Computerworld, Mar. 6, 1995, p. 10.
Brue, "The Business Case for ATM," Data Communications, Apr., 1995.
Information Sciences Institute, "Transmission Control Protocol, Darpa Internet Program, Protocol Specification," Sep., 1981, pp. 81.
International Preliminary Examination Authority, "Written Opinion," Jan. 4, 1999, Case No. 11707WO01, International Application No. PCT/US97/20734, related to the present application, 11707US03, 08/969,174.
Intel, "Intel ProShare Video Conferencing—White Paper," Jan. 10, 1997, pp. 1–5.
Videotex, "Multicast Video Service," Jan. 10, 1997,pp. 1–3.
Sepmeier, "Internet Connectivity by Satellite," Feb. 6, 1997, pp. 1–2 (note 1996 copyright notice on p. 2).
StarDust Technologies, Inc, "IP Multicast Initiative," Copyright 1995–96, IP Muticast Glossary pp. 1–7, IP Multicast BackGrounder, pp. 1–9, How IP Multicast Works, pp. 1–12.
Digex, "Digex to Supply Internet Connectivity to Southwestern Bell Internet Services," Oct. 3, 1996, one page.
Digex, "Orion Atlantic Launches International Internet Access Service Through Agreement With Digex," Sep. 17, 1996, one page.
Digex, "Amtrack Selects Digex to Track Onto the Internet," Aug. 23, 1996, one page.
Digex, "Digex Goes National . . . " Jul. 2, 1996, one page.
Digex, "Digex, Inc., and Winstar Communications, Inc. Form Partnership . . . ," Jun. 26, 1996, one page.
Digex, "LCI International/Digex Collaborate . . . ," Jun. 4, 1996, one page.
Adaptec, "Adaptec to Marry PCs and Satellites," 3/1197, pp. 1–2.
Datasat, "Hughes Insight DSS Satellite System," May 5, 1997, pp. 1–2.
Datasat, "RCA DSS Satellite Page," Apr. 5, 1997, pp. 104 (note 1996 copyright notice on p. 4).
Superior Communications, "Satllite Communications," Apr. 5, 1997, pp. 1–2 (note 1995 copyright notice on p. 2).
Datasat Communications, "DirecPC Internet Delivery," Apr. 5, 1997, pp. 1–3 (note 1996 copyright notice).
Cowen & Co., "White Pine Public Offering," Oct. 11, 1996, front cover, inside cover graphic, & pp. 3–5, 18, 23, 29–45.
ICTV, Inc., "Press Release—ICTV, Cox Communications . . . " Dec. 11, 1996, pp. 1–4.
ICTB, "Press Release—ICTV, ICT and WorldGate . . . ," Dec. 11, 1996, p. 1.
Goldberg, "ICTV Remains Flexible . . . ," Apr. 3, 1997, pp. 1–2 (note copyright notice of Jan. 20, 97).
Intel, "Intercast Technology—The Complete Picture," Feb. 6, 1997, pp. 1–2.
Intel, "Intercast Industry Group—Who We Ate," Feb. 6, 1997, pp. 1–2.
Microsoft, "Microsoft Windows to Deliver Digital TV Experience," Apr. 6, 1997, pp. 1–3.
Microsoft, "Microsft Proposes Standard to Link TV Networks to the Internet," Apr. 6, 1997, pp. 1–3.
Microsoft, "Microsoft Netshow," Apr. 7, 1997, pp. 1–3 (note 1997 copyright notice).
Microsoft, "Support for Microsoft Windows and Digital TV," 4/7/977, pp. 1–4 (note 1997 copyright notice).
Microsoft, "NPR, Audionet, and Other Broadcasters Choose Microsoft Netshow . . . ," Apr. 7, 1997, pp. 1–4 (note 1997 copyright notice).
Microsoft, "Netshow Benefits and Features," Apr. 7, 1997, pp. 1–5 (note 1997 copyright notice).
Microsoft, "Looking at Product Components," pp. 1–2, Apr. 7, 1997 (note 1997 copyright notice).
Microsoft, "Putting Netshow to Work," Apr. 7, 1997, pp. 1–2, (note 1997 copyright notice).
Microsoft, "A Look at What's New in Netshow Version 2.0 Beta," Apr. 7, 1997, pp. 1–2 (note 1997 copyright notice).
Microsoft, "Neshow Version 2.0 Beta Oversview," Apr. 7, 1997, pp. 1–2 (note 1997 copyright notice).
Microsoft, "About Microsoft Netshow," Jul. 7, 1997, pp. 1–2 (note 1997 copyright notice).
Microsoft, "Welcome to Microsoft Netshow," Apr. 7, 1997, pp. 1–2 (note 1997 copyright notice).
McGarvey, "IBN: Internet Broadcasting Network," Apr. 19, 1997, pp. 1–2 (note 1996 copyright notice).
VDOnet, "First Video Commercial Made Specifically for the Internet . . . ," Sep. 15, 1996, pp. 1–2.
VDOnet, "NBC Desktop Video, PBS, and Cisco . . . ," Jun. 13, 1996, pp. 1–3.
VDOnet, "VDOnet Permits Mac–Based Video . . . ," Jan. 6, 1997, pp. 1–2.
Progressive Networks, "RealVideo Technical White Paper," Apr. 5, 1997, pp. 1–7 (note 1995–97 copyright notice).
PC–Sat, "PC–Sat," Apr. 3, 1997, pp. 1–10 (note 1997 copyright notices).
Netday News, "WavePhre to Bundle "VBI" with PC Theatre," May 6, 1997, pp. 1.
Wavetore, "Imagine" and other documents regarding Wavetop, Apr. 3, 1997, pp. 1–11 (note 1997 copyright notices).
Montgomery, "Race for the Final Mile," Oct. 2, 1996, pp. 1–32.
Bauer & Yum, Netflow Switching, Cisco Netflow Switching Software . . . , Apr. 22, 1996, Cisco Systems USA.
Cisco Systems, RSVP for the Multimedia Party, Packet Magazine Archives, Third Quarter 1995, Cisco Sys. USA.
Cisco Systems, Internet Protocol, Version 6, Copyright 1992–99, Cisco Systems, USA.

* cited by examiner

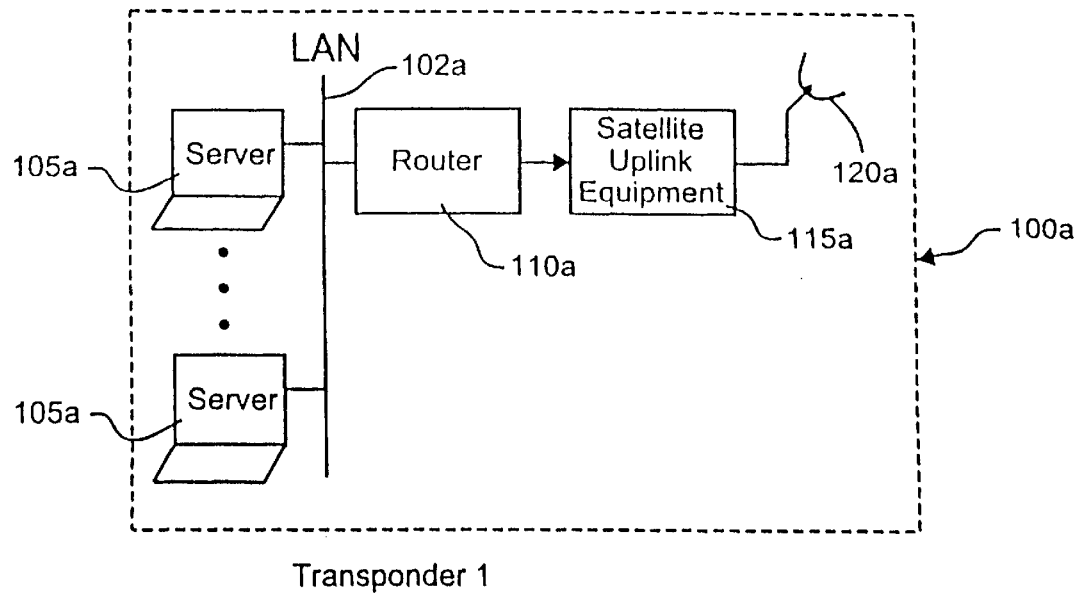
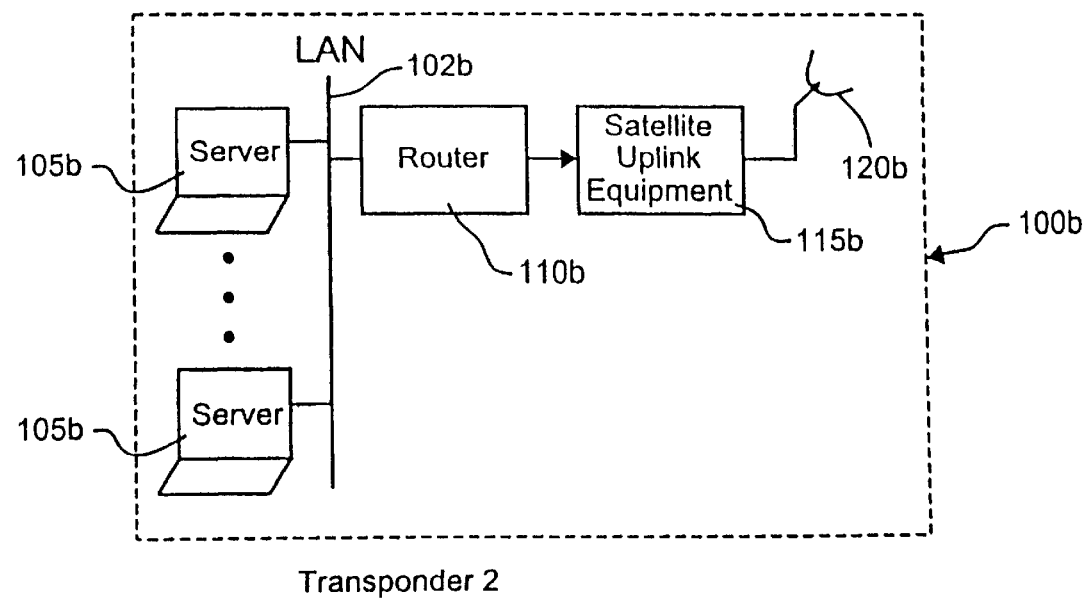
Fig. 8a

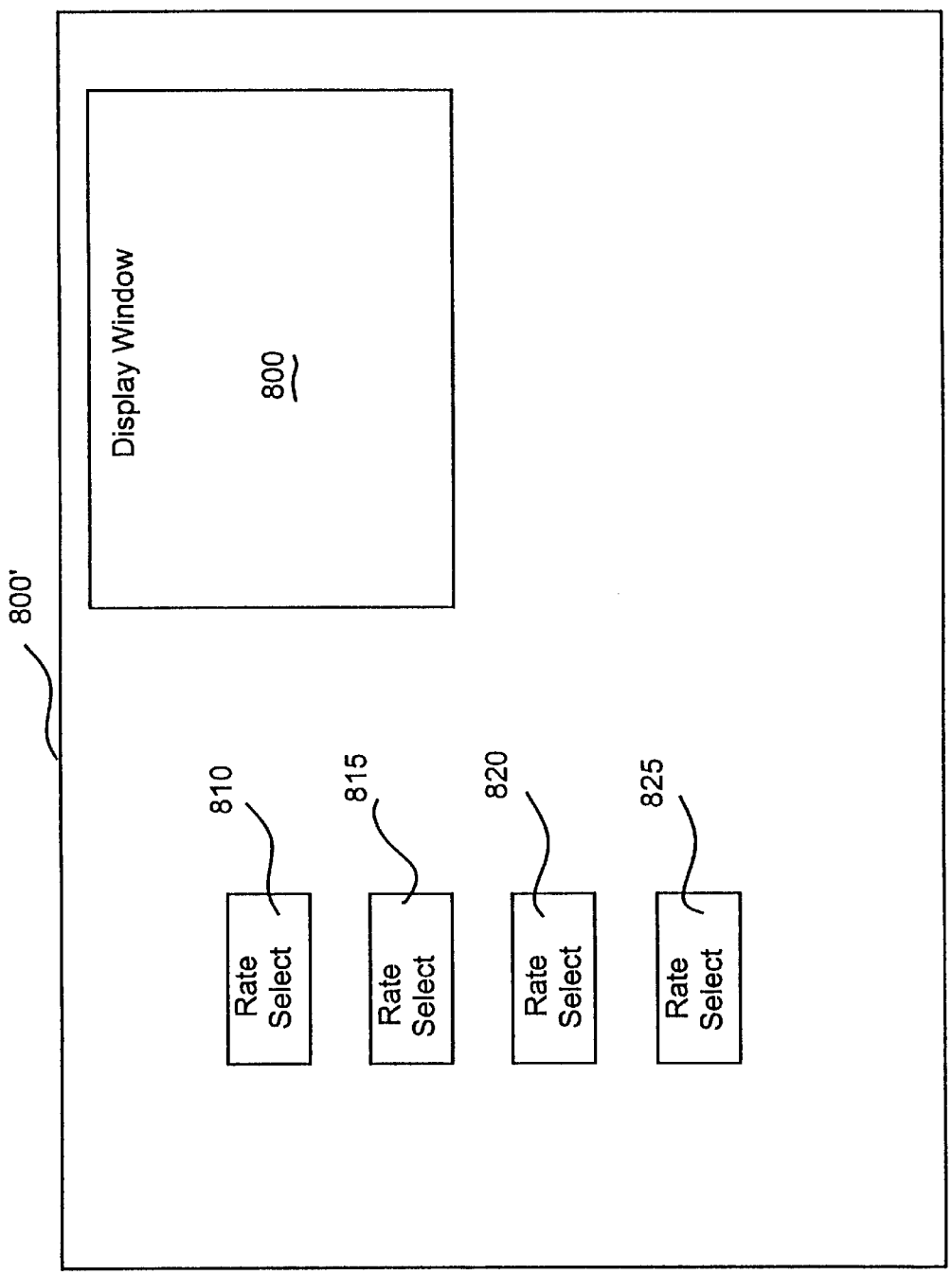

HIGH BANDWIDTH BROADCAST SYSTEM HAVING LOCALIZED MULTICAST ACCESS TO BROADCAST CONTENT

CROSS-REFERENCE TO RELATED APPLICATIONS

This is a continuation of application Ser. No. 08/969,164 filed Nov. 12, 1997, now U.S. Pat. No. 6,101,180. The present application claims priority from the following provisional applications: U.S. Ser. No. 60/029,427, filed Nov. 12, 1996; U.S. Ser. No. 60/039,672, filed Feb. 28, 1997; and U.S. Ser. No. 60/057,857, filed Sep. 2, 1997, all these provisional applications now abandoned.

STATEMENT REGARDING FEDERALLY SPONSORED RESEARCH OR DEVELOPMENT

Not Applicable

BACKGROUND OF THE INVENTION

During the 1970's and 1980's, the defense industry encouraged and developed an interconnecting network of computers as a back up for transmitting data and messages in the event that established traditional methods of communication fails. University mainframe computers were networked in the original configurations, with many other sources being added as computers became cheaper and more prevalent. With a loose interconnection of computers hardwired or telephonically connected across the country, the defense experts reasoned that many alternative paths for message transmission would exist at any given time. In the event that one message path was lost, an alternative message path could be established and utilized in its place. Hence, it was the organized and non-centralized qualities of this communications system which made it appealing to the military as a backup communication medium. If any one computer or set of computers was attacked or disconnected, many other alternative paths could eventually be found and established.

This interconnection of computers has since been developed by universities and businesses into a worldwide network that is presently known as the Internet. The Internet, as configured today, is a publicly accessible digital data transmission network which is primarily composed of terrestrial communications facilities. Access to this worldwide network is relatively low cost and hence, it has become increasingly popular for such tasks as electronic mailing and weather page browsing. Both such functions are badge or file transfer oriented. Electronic mail, for instance, allows a user to compose a letter and transmit it over the Internet to an electronic destination. For Internet transfers, it is relatively unimportant how long each file transfer takes as long as it is reasonable. Messages are routed, through no fixed path but rather, through various interconnected computers until they reached their destination. During heavy message low periods messages will be held at various internal network computers until the pathways cleared for new traditions. Accordingly to Internet transmissions are effective, but cannot be relied upon for time high incentive applications.

Web pages are collections of data including text, audio, video, and interlaced computer programs. Each web page has a specific electronic site destination which is accessed through a device known as a web server, and can be accessed by anyone through via Internet. Web page browsing allows a person to inspect the contents of a web page on a remote server to glean various information contained therein, including for instance product data, company backgrounds, and other such information which can be digitized. The remote server data is access by a local browser, and the information is displayed as text, graphics, audio, and video.

The web browsing process, therefore, is a two-way data communication between the browsing user, who has a specific electronic address or destination, and the web page, which also has a specific electronic destination. In this mode of operation, as opposed to electronic mail functions, responsiveness of the network is paramount since the user expects a quick response to each digital request. As such, each browsing user establishes a two-way data communication, which ties up an entire segment of bandwidth on the Internet system.

Recent developments on the Internet include telephone,. video phone. conferencing and broadcasting applications. Each of these technologies places a similar real-time demand on the Internet. Real-time Internet communication involves a constant two-way throughput of data between the users, and the data must be received by each user nearly immediately after its transmission by the other user. However, the original design of the Internet to did not anticipate such real-time data transmission requirements. As such, these new applications have serious technical hurdles to overcome in order to become viable.

Products which place real-time demands on the Internet will be aided by the introduction of an updated hardware interconnection configuration, or "backbone," which provides wider bandwidth transmission capabilities. For instance, the MCI backbone was recently upgraded to 622 megabytes per second. Regardless of such increased bandwidth, the interconnection configuration is comprised of various routers which may still not be fast enough, and can therefore significantly degrade the overall end-to-end performance of the traffic on the Internet. Moreover, even with a bandwidth capability of 622 megabytes per second, the Internet backbone can maximally carry only the following amounts of data: 414—1.5 mbs data streams; 4,859—128 kbs data streams; 21597—28.8 kbs data streams; or combinations thereof. While this is anticipated has being sufficient by various Internet providers, it will quickly prove to be inadequate for near-future applications.

Internal networks, or Intranet sites, might also be used for data transfer and utilize the same technology as the Internet. Intranets, however, are privately owned and operated and are not accessible by the general public. Message and data traffic in such private networks is generally much lower than more crowded public networks. Intranets are typically much more expensive for connect time, and therefore any related increase in throughput comes at a significantly higher price to the user.

To maximize accessibility of certain data, broadcasts of radio shows, sporting events, and the like are currently provided via Internet connections whereby the broadcast is accessible through a specific web page connection. However, as detailed above, each web page connection requires a high throughput two-way connection through the standard Internet architecture. A given Internet backbone will be quickly overburdened with users if the entire set of potential broadcasters across world began to provide broadcast services via such web page connections. Such broadcast methods through the Internet thereby prove to be ineffective given the two-way data throughput needed to access web pages and real-time data.

Furthermore, broadcasts are typically funded and driven by advertising concerns. A broadcast provided through a centralized location, such as a web page for real-time Internet connection, will be limited by a practicality to offer only nationally advertised products, such as Coke or Pepsi. Since people might be connected to this web page from around the world, local merchants would have little incentive to pay to advertise to distant customers outside of their marketing area. Local merchants, instead. would want to inject their local advertising into the data transmission or broadcasts in such a way not currently available the Internet.

There is an enormous demand for the delivery of large amounts of content to a large number of listeners. The broadcast channels of today, such as radio and TV, can only deliver a small number of channels to a large number of listeners. Their delivery mechanism is well known to customers. The broadcaster transmits programs and the listener must "tune in" at the proper time and channel to receive the desired show.

"On Demand" systems have been attempted by the cable industry. Such systems attempt to transport the program or show from a central repository (server) to the user (client) in response to his/her request. To initiate the request, the user selects from a list of candidate programs and requests that the system deliver the selected program.

The foregoing "on demand" model of content delivery places two significant requirements on the delivery system. First, there should be a direct connection between each content storage device (server) and each listener (client). The phone system is an example of such a point-to-point interconnection system. Another example of such an interconnection system is the Internet, which is also largely based on the terrestrial telecommunications networks. Second, the server must be capable of delivering all the programs to the requesting clients at the time that which the client demands the programming.

The foregoing requirements can be met using the Internet. However, as will become evident, the Internet is not suitable for any type of high bandwidth on-demand system. In today's Internet, all the users share a terrestrial infrastructure and, as a result, the total throughput is limited. In other words, the Internet is a party line shared by a large number of users and each subscriber must wait for the line to be free before he/she can send data. Since the signal from the server is generally a high bandwidth signal including multimedia content, any degradation of the throughput from the server to the clients results in an annoying disruption of the video and/or audio at the clients. Successful transmission of real-time streaming multimedia content requires sufficient transmission bandwidth between the server and the client. Since standard IP transmission facilities are a party line, attempts have been made to impose a quality of service (QOS) into this transmission structure. This QOS feature is accomplished by the new bandwidth reservation protocol called RSVP. This new protocol must be active in each network element along the path from the client to the server for it to be effective. Until RSVP is fully enabled, QOS cannot be guaranteed.

Once RSVP is fully deployed, then the mechanical process of reserving bandwidth will be possible. The next limitation encountered will be the problem of limited transmission bandwidth. Consider the case where the sum of all bandwidth reservations exceeds available transmission bandwidth. To reduce the excessive use of bandwidth reservation, transmission providers anticipate transmission charges based on the amount of bandwidth reserved. This bandwidth charge is not in the spirit of today's free connectivity.

Another example of the limitations inherent in the finite throughput of the Internet is the generally limited audience size for a given transmission link. For example, if there is a 622 megabit/second (mbs) link from an Internet server in New York to a number of clients in Los Angeles and each client requires a separate 28.8 kilobit/sec (kbs) connection to the server, then this link can only support about 22,000 clients, a relatively small number of clients when compared to the cost of a server capable of supplying the 622 mbs data content. The costs further escalate and the client audience size capability further diminishes as each client connects to the server using higher bandwidth modems or the like. Still further, the same large demand is placed on the server if each of the 22,000 clients requests the same program but at different times or if each of the clients request a different program at the same, or nearly the same time. The large bandwidth requirements (622 mbs) to supply a relatively small number of clients (22,000) coupled with the stringent requirements placed on the server to supply the content to each client has created problems that "on-demand" systems have yet to economically overcome.

A new development in the LAN/WAN technology is called "multicasting." Multicasting in LAN/WAN parlance means that only one copy of a signal is used until the last possible moment. For example, if a server in New York wants to deliver the same data to someone in Kansas City, Dallas, San Francisco, and Los Angeles, then only one signal needs to be sent to Kansas City. There it would be replicated and sent separately to San Francisco, Los Angeles, and Dallas. Thus the transmission costs and bandwidth used by the transmission would be minimized and the server in New York would only have to send one copy of the signal to Kansas City. This scenario is illustrated in FIG. 1A.

Multicasting helps to somewhat mitigate the transmission costs but there are still a great number of cases where it provides little optimization. For example, if there is one person in each city in the US that wants to view the same program generated by the server in New York, then the server must send the signal to all those cities, effectively multiplying the amount of bandwidth used on the network. As such, the transmission is still expensive. Further, the multicast system model breaks down at high bandwidths and during periods of low data throughput within the Internet infrastructure, resulting in annoying degradation of the transmission content.

Another issue is distribution of information between autonomous systems. This is called peering. FIG. 1B shows three autonomous simple systems labeled AS0, AS1 and AS2. These autonomous systems are self contained networks consisting of host computers (clients and servers) interconnected by transmission facilities. Each autonomous system is connected to other autonomous systems by peering links. These are shown in FIG. 1B by the transmission facilities labeled PL01, PL02 and PL12.

Peering allows a host in one autonomous system to communicate with a host in a different autonomous system. This requires that the routers at the end of the peering links know how to route traffic from one system to the other. Special routing protocols, such as boundary gateway protocol, enable the interconnection of autonomous systems.

Assume that host H1 in AS0 wants to communicate with host H2 in AS1 and H3 in AS2. To do this, H1 communicates with PL01 to reach H2 and PL02 to reach H3. If host H1 wants to multicast a message to multiple hosts in each of the autonomous systems, then boundary routers involved must understand the multicast protocols.

Backbone providers that form each of autonomous systems are reluctant to enable multicast over their peering links because of the unknown load placed on boundary routers and billing issues related to this new traffic which originates outside of their autonomous systems.

The present inventors have recognized that a different approach must be taken to provide a large amount of content to a large number of listeners. The proposed system proposes that the "on-demand" model and point-to-point connection model both be abandoned. In their place, the "broadcast" model is combined with localized multicast connections that selectively allow a client to receive the high bandwidth content of the broadcast.

The broadcast model assumes that the server delivers specific content at specific times on a specific channel as is currently done in today's radio and television industry. "Near on demand" can be affected by playing the same content at staggered times on different transmission channels, preferably, dedicated satellite broadcast channels. Localized receivers receive the broadcast channels and convey the content over a network using a mutlicast protocol that allows any client on the network to selectively access the broadcast content from the single broadcast. This single broadcast provides, in effect, an overlay network that bypasses congestion and other problems in the existing Internet infrastructure.

FIG. 1C shows how host H1 multicast directly to H2 and H3 via satellite or another dedicated link separate from the backbone of the Internet. This type of interconnection bypasses the peering links and the resulting congestion and billing issues. The present invention is based on the recognition of this advantage of using a separate dedicated link and implements the resulting solution in a unique manner.

Accordingly, what is needed is a data transmission system which is capable of sending multiple channels of broadcast data, or multicasting, to receiving computers without being injured by the bandwidth and car were constraints of to-way Internet connections. The ability to interconnects local programming and/or advertising into received broadcast transmissions should also be included. Data channels should therefore be configured, compressed, and encoded for transmission via satellite, or transmission via the existing Internet. Routers at the receiving end should be capable of replicating any downlinked broadcast signals. The local server would thereby provide the replicated transmission to any of the requesting users through a modem server, with local programming and/or advertising interspersed into the broadcast. Hence, users might receive the real-time broadcast transmission through a personal computer without having to establish an individual two-way connection to a Internet web page or real-time Internet connection.

SUMMARY OF THE INVENTION

A method of multicasting digital data to a user accessing an Internet connection is disclosed. The method includes placing digital data that is to the multicast in IP protocol to generate IP digital data. The IP digital data is transmitted from a transmission site to a remote Internet point of presence through a dedicated transmission channel substantially separate from the Internet backbone. The dedicated transmission channel may be, for example, a satellite channel. At the remote Internet point of presence, the IP digital data is multicast for delivery to at least one receiving Internet user's apparatus connected to but distal from the remote Internet point of presence.

As will be readily recognized, the foregoing method eliminates or circumvents many of the problems discussed above in connection with existing multicast systems. Further, since the principal equipment used to implement the method is disposed at the point of present of the Internet Service Provider, the normal psychological reluctance of an Internet user to purchase extraneous multicast equipment is avoided. Other significant advantages of the following apparatus and method will become apparent.

BRIEF DESCRIPTION OF THE DRAWINGS

FIG. 8a illustrates one embodiment of an uplink site suitable for use in the network of FIG. 2.

FIG. 30 illustrates one example of a web page layout for use in selecting baud rate of a video transmission at a user of the present system.

DETAILED DESCRIPTION OF THE INVENTION

Figure 1A:
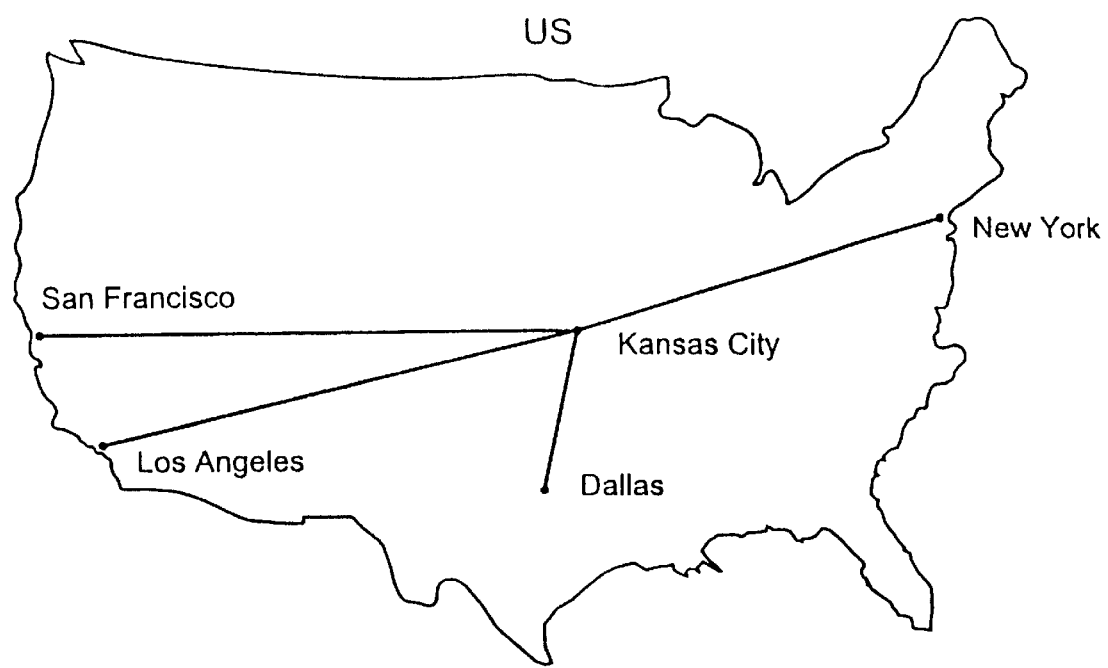
FIGS. 1A and 1B are drawings used to illustrate problems in inter-city communications over for example, the Internet using conventional systems.
Figure 1B:
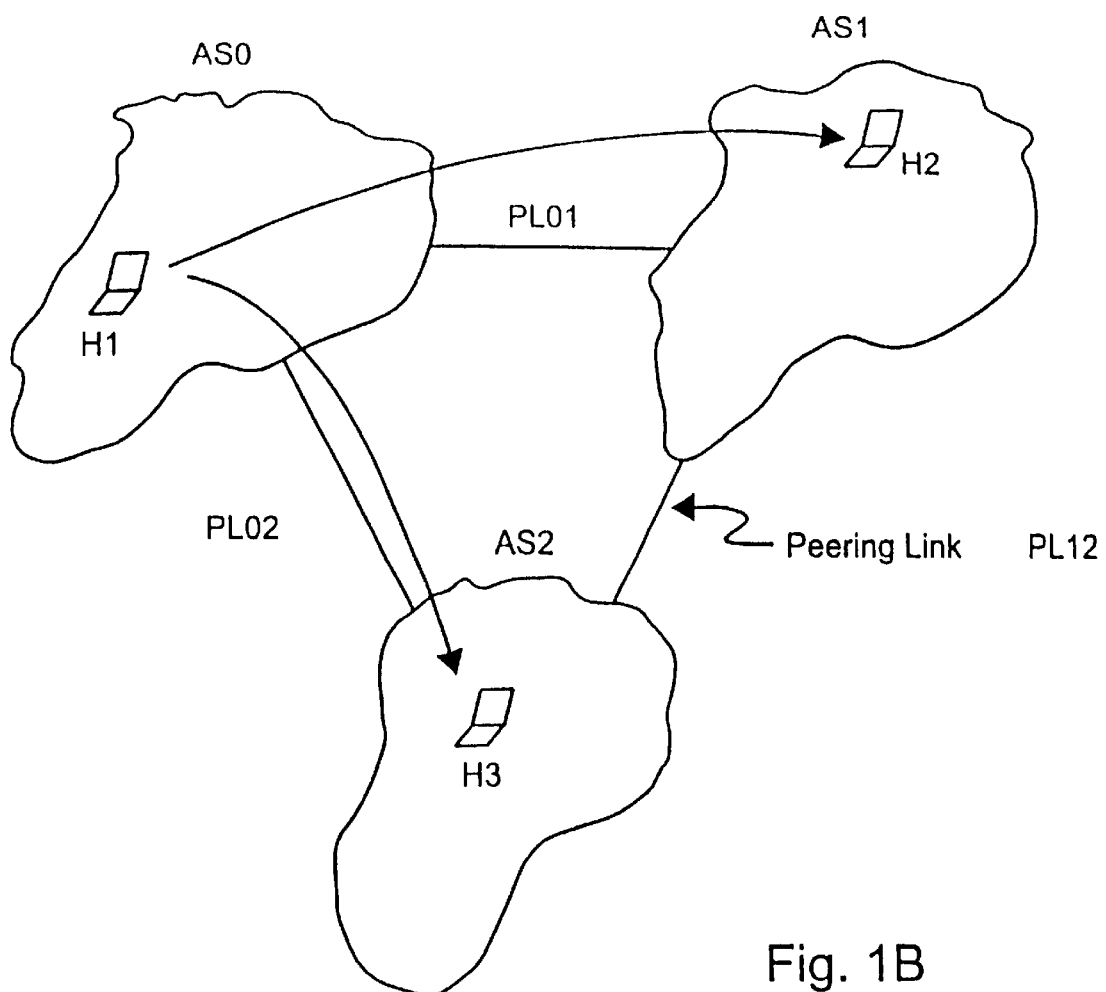
Figure 1C:
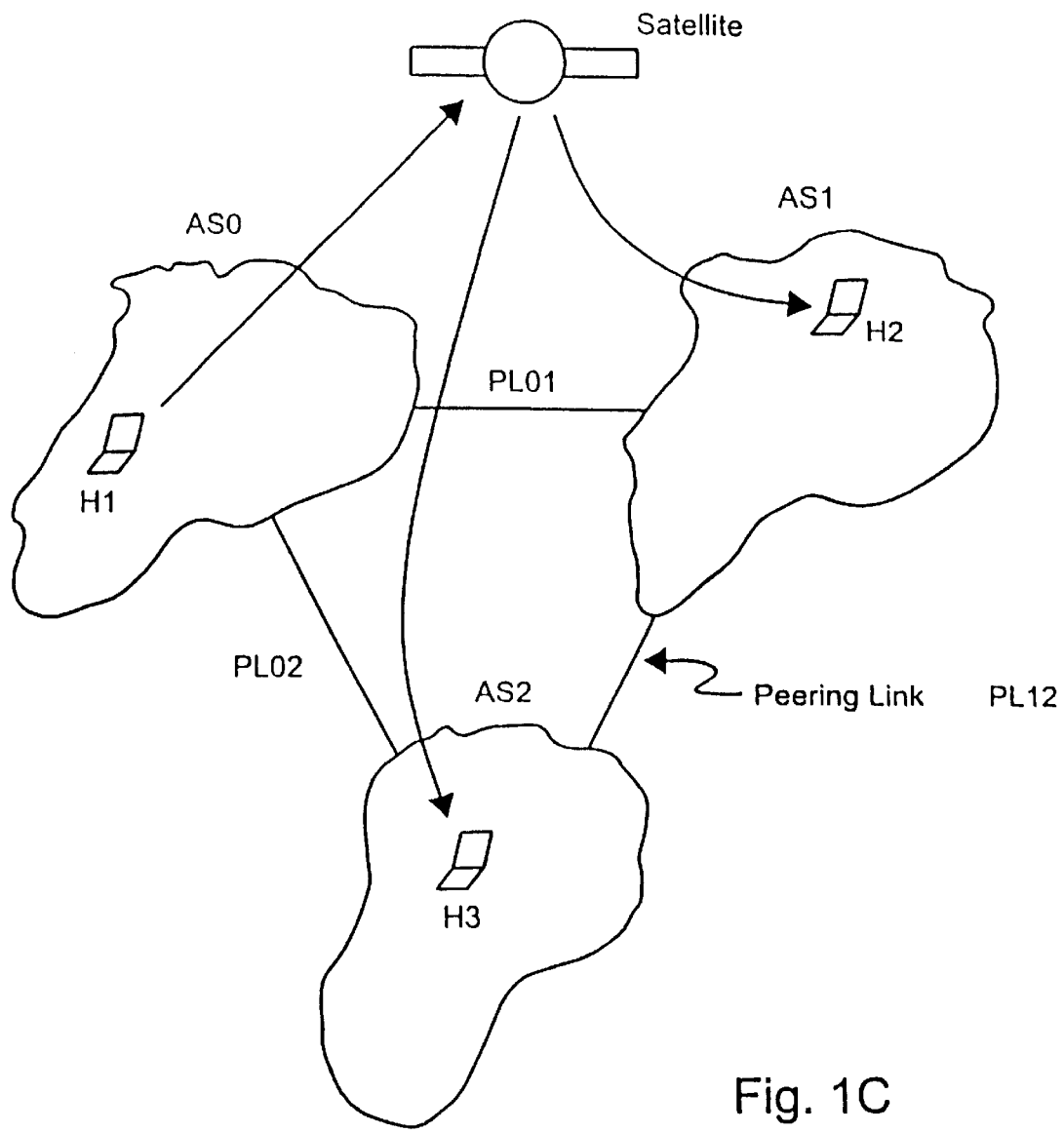
FIG. 1C illustrates an alternative delivery system to the system of FIG. 1B.
Figure 1D:
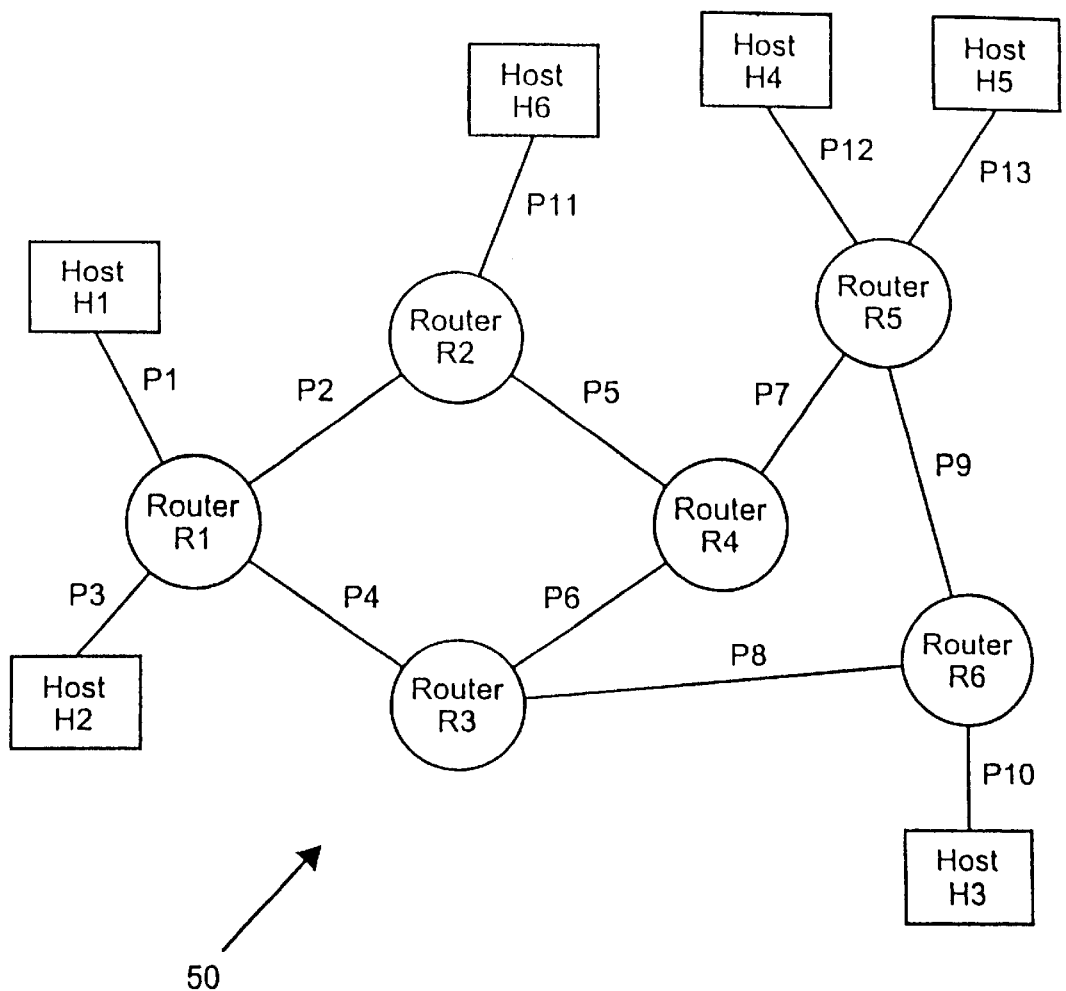
FIG. 1D illustrates a conventional network architecture.

The current networking architecture of today is generally illustrated in FIG. 1D. As illustrated, the network, shown generally at 50, comprises a group of host computers H1–H6 that are interconneted by transmission links P1–P13 and routers R1–R6 to form a LAN/WAN. An aggregated group of hosts is called a domain. Domains are grouped into autonomous systems that are, in-turn, interconnected together to form a network. When these networks span a large geographic area, they are called a wide area network or WAN. An example of this network architecture is the Internet and is illustrated in FIG. 1D.

At each interconnection node is a device called a router, designated here as R1–R6. The function of the router is to receive an input packet of information, examine its source and destination address, and determine the optimal output port for the message. These receive, route determinations, and transmit functions are central to all routers.

If host H1 wants to send a message to host H3, there are a variety of paths that the signal could take. For example, the signal could be transmitted along the transmission path formed by P1–P4–P8–P10. Otheralternatives include the paths formed by P1–P2–P5–P7–P9–P10 or P1–P4–P6–P7–P9–P10. The function of the router is to determine the next path to take based on the source and destination address. The router might use factors such as data link speed or cost per bit to determine the best path for the message to follow.

As more host computers are brought on-line, more domains are created. Each time a domain is created, any router associated with the domain must announce to its peers that it is present and ready to accept traffic. Conversely, if a domain is deleted, the system must respond by removing the paths and rerouting all messages around the removed domain. In any large network, there will be a constant addition and removal of domains. The success of the network architecture to respond to these changes is at the core of the networking problem. To this end, each router communicates with its peers to announce to the network or networks it services. This implies that a bi-directional link should exist at each router. Terrestrial telephone circuits have traditionally supplied these links on the Internet.

Figure 2:
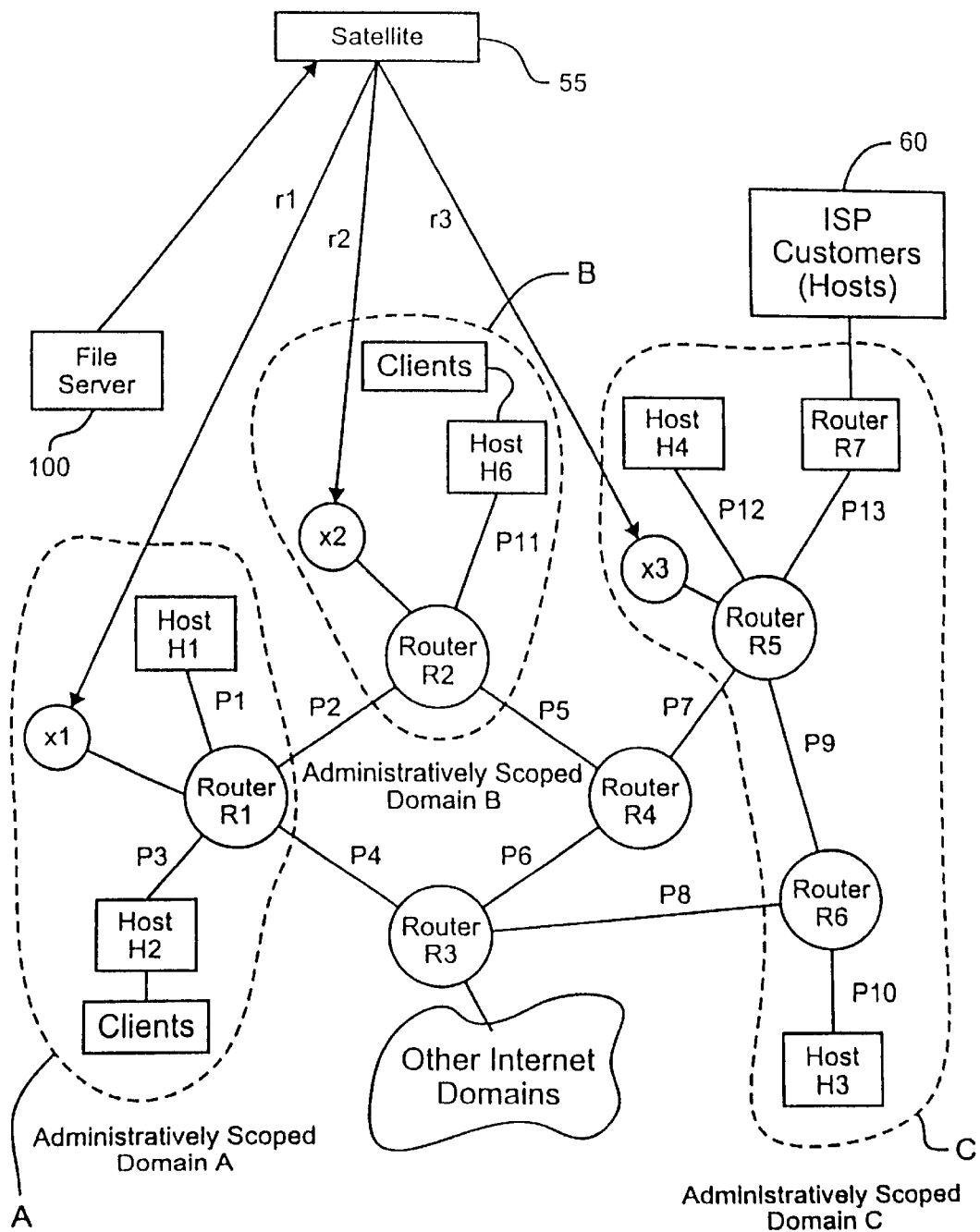
FIG. 2 illustrates a hybrid broadcast/multicast network constructed in accordance with one embodiment of the present invention.

FIG. 2 illustrates a hybrid broadcast/multicast constructed in accordance with one embodiment of the present invention. The system is illustrated in the context of a plurality of interconnected Internet domains A, B, and C. As noted above, a domain is an aggregate of one or more hosts. For example, domain A may be a corporate LAN while domain B may be a LAN at an educational institution or the like. In the illustrated embodiment, domain C is shown as an Internet Service Provider (ISP) that usually sells local access to the Internet through its domain. As such, domain C includes at least one access router R7 having one or more modems through which local but remotely located ISP customers (hosts) 60 connect to the domain through POTS, T1 lines, or other terrestrial links. From domain C, the ISP customers 60 are connected to the Internet.

In the preferred embodiment, a file server station 100 is used to store and transmit broadcast transmissions to a satellite 55. As will be set forth in further detail below, the file server station 100 includes one or more file servers that can provide, for example, multimedia content in TCP/IP format. The multimedia data is then encapsulated in HDLC or similar frame format and modulated to RF for transmission over one or more uplink channels of the satellite 55. The satellite 55 re-transmits the HDSL encapsulated frames on one or more downlink channels having different carrier frequencies than the uplink channels. The downlink transmissions are concurrently received by domains A, B, and C at local routing stations x1, x2, x3. At each routing station x1, x2, x3, the original TCP/IP data transmitted from the file server station 100 is extracted from the received HDLC frames. The extracted TCP/IP data is selectively supplied to hosts within the domain that have made a request to receive the data.

This satellite 55 network in effect provides an overlay network that bypasses or at least somewhat avoids congestion and limitations in at least some of the existing Internet infrastructure, such as in FIG. 1. Moreover, this satellite 55 network provides dedicated, guaranteed bandwidth for the transmission of multimedia data through the satellite 55.

In the preferred embodiment, the transmissions from the file server station 100 preferably include one or more multimedia transmissions formatted in accordance with the IP multicast protocol. IP Multicast is an extension to the standard IP network-level protocol. RFC 1112, Host Extensions for IP Multicasting, authored by Steve Deering in 1989, describes IP Multicasting as: "the transmission of an IP datagram to a 'host group', a set of zero or more hosts identified by a single IP destination address. A multicast datagram is delivered to all members of its destination host group with the same 'best-efforts' reliability as regular unicast IP datagrams. The membership of a host group is dynamic; that is, hosts may join and leave groups at any time. There is no restriction on the location or number of members in a host group. A host may be a member of more than one group at a time." In addition, at the application level, a single group address may have multiple data streams on different port numbers, on different sockets, in one or more applications.

IP Multicast uses Class D Internet Protocol addresses, those with 1110 as their high-order four bits, to specify groups of IPMS units 120. In Internet standard "dotted decimal" notation, host group addresses range from 224.0.0.0 to 239.255.255.255. Two types of group addresses are supported: permanent and temporary. Examples of permanent addresses, as assigned by the Internet Assigned Numbers Authority (IANA), are 224.0.0.1, the "all-hosts group" used to address all IP IPMS units 120 on the directly connected network, and 224.0.0.2, which addresses all routers on a LAN. The range of addresses between 224.0.0.0 and 224.0.0.255 is reserved for routing protocols and other low-level topology discovery or maintenance protocols. Other addresses and ranges have been reserved for applications, such as 224.0.13.000 to 224.0.13.255 for Net News (a text based service). These reserved IP Multicast addresses are listed in RFC 1700, "Assigned Numbers." Preferably, transmissions from the file server 100 containing related multimedia content are transmitted using a permanent address. Even more preferably, the same multimedia content is provided by the file server system 100 at multiple data rates using different permanent addresses.

For example, a multimedia file containing an automobile commercial may be concurrently transmitted for reception at a 28.8 KB data rate, a TI data rate, an ADSL data rate, etc. The 28.8 KB transmission is transmitted using a first group of one or more permanent addresses. The T1 data rate transmission is transmitted using a second group of one or more permanent addresses, wherein the first group differs from the second group. In this manner, a client having a high speed Internet connection may chose to receive the more desirable high data rate transmissions while a client having a lower speed Internet connection is not precluded from viewing the content due to the availability of the lower speed data transmissions. Additionally, a corresponding web page may be concurrently transmitted along with the multicast data or along the backbone of the Internet.

If permanent multicast addresses are not available, the TCP/IP addresses used for the broadcast transmissions may use a block of addresses that are normally designated as administratively scoped addresses. Administratively scoped addresses are used for the transmission of commands and/or data within the confines of a domain for administrative processes and are not supplied outside of the scope of the domain. In other words, any broadcast transmissions received using these administratively scoped addresses desirably remains within the bounds of the domain in which it is received. All addresses of the form 239.x.y.z are assumed to be administratively scoped. If administratively scoped addresses are used, provisions must be made to ensure that the domain does not use an administratively scoped address that is within the designated broadcast block for other system functions. This may be accomplished in one of at least two different manners. First, the domain can be reprogrammed to move the administratively scoped address used for the other system function to an administratively scoped address that does not lie within the broadcast block. Second, the routing station may perform an address translation for any administratively scoped addresses within the broadcast block that conflict with an administratively scoped address used for other purpose by the domain. This translation would place the originally conflicting address outside the conflict range but still maintain the address within the range of permissible administratively scoped addresses. As above, the same multimedia content is transmitted concurrently using different transmission data rates.

With respect to the use of administratively scoped addresses, assume that the system will utilize a block of addresses that contain 65,535 addresses (16 bits of address space). This block will utilize a predetermined, default address block. For the sake of this description. assume that the system default address space is defined as 239.117.0.0 to 239.117.255.255. This address space is defined by fixing the upper two bytes of the address space (in this case 239.117) while merely varying the lower two bytes of data to allocate or change the address of a channel of TCP/IP multimedia data. This addressing scheme, in and of itself, will provide the system with 64K possible channels but it may place restrictions on the ISP environment since they would be required to have a dedicated block of 64K address space, one in which none of the 64K addresses are being used by other applications. This may not always be feasible. In order avoid this kind of limitation, the system may only actually utilize the first 16K of the predefined address space. This will allow 16K channels for the entire system, which corresponds to a minimum aggregate data rate of 470 MHz (assuming every channel is running the minimum data rate of 28.8 kbps).

Even with the limited number of addresses, there are still two potential types of problems within the ISP environment. In the first type of problem, a limited number of the system broadcast addresses are already in use at the ISP or other domain type. In the second type of potential problem, a large block of the system broadcast address space is being used at the ISP or other domain type. In either case, the IPMS must be able to provide a solution for these two types of problems. These two cases are preferably addressed differently.

The most likely address conflict to be encountered in an ISP is the first one noted above, designated here as the "limited address" conflict. This type of conflict occurs when a single address or several isolated addresses within the broadcast address range are already allocated within the ISP or other domain type. The fact that only 16K addresses out of the 64K address block are used will provide a means for routing "around" these limited address conflicts.

Figure 3:
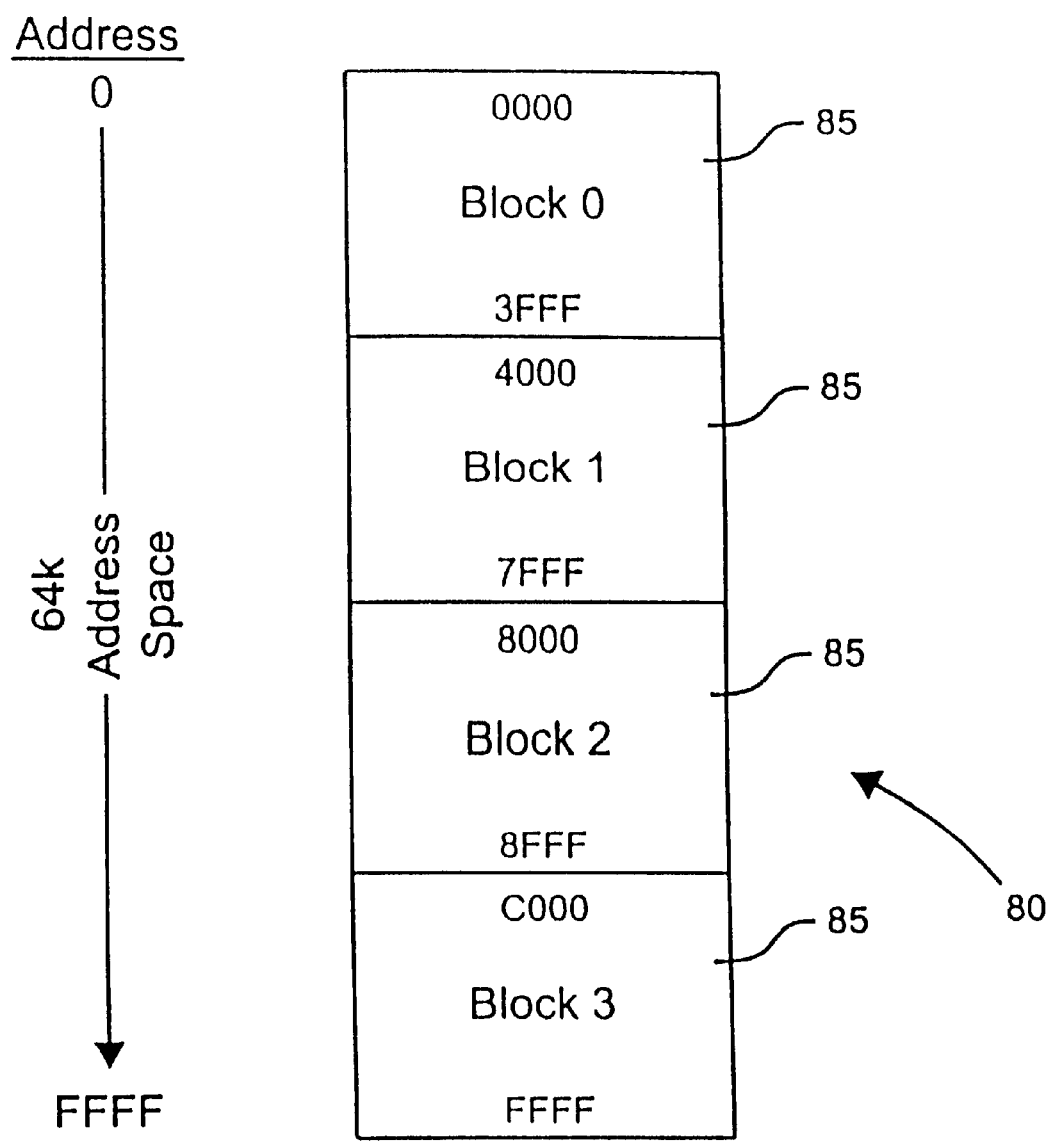
FIG. 3 illustrates one manner in which the Internet Protocol addresses may be mapped at an Internet Service Provider.

As illustrated in FIG. 3, the 64K address space shown generally at 80 will be divided into four 16K address blocks 85. The following diagram shows how the address blocks are defined. The system default addresses are all located in block 0 which begins at address 0 of the administratively scoped addresses.

The ISP or domain will setup a "routing table" within a routing station of the domain that indicates all of the administratively scoped addresses used within the ISP or domain. The routing station is programmed to re-route addresses with conflicts to the next available address block. For example, if the ISP has address 239.117.1.11 already assigned, the routing station routes this address to the next available block. The next available address block is found by adding 64 to the second byte of the IP address. For this service the next address would be 239.117.65.11. If this address is free, this is where the routing station re-routes the data associated with the conflicting address. Four alternate addresses may be assigned for rerouting a single channel having a conflicting address.

The address re-routing scheme should be implemented on both the routing station end and in any client Plug-In software used to receive the data. On the routing station side, once the ISP enters all address conflicts, the routing station performs address translation on all of the addresses that conflicts occur. All packets have their addresses re-mapped to the new location. If a single address can not be re-routed (all four address blocks are used for a given channel) then the receiver performs major address block re-routing as would occur in address block conflict management described below. On the client software side, the client opens sockets for all four address blocks (either sequentially or simultaneously). The address that provides valid broadcast data is accepted as the correct channel. The three other sockets are closed. If none of the addresses provide valid data, the client tries the alternate address block as defined below.

Alternative strategies for reconciling addressing conflicts may also be employed. As an example, an agent might be implemented with the IPMS which could be queried by the client for the appropriate address to use at a particular location. Such a query would include a "logical" channel number associated with the desired broadcast. The agent would then respond with the specific IP Address locally employed for that broadcast.

If a large number of addresses conflict with the default system address space, an alternate block of addresses will be used. The system defines the exact alternate address space (or spaces). but as an example, if 239.117.X.Y is the primary default broadcast block, an address space like 239.1 89. X.Y might be used as an alternate. In any event, the routing station will determine, based on the address conflicts entered by the ISP, if the entire broadcast address block must be re-routed. If it does, the routing station will modify each broadcast channel's address. As described above, if the client software can not find a valid broadcast stream within the standard address block, the alternate address space will be tried.

Routing multicast traffic is different than the routing of ordinary traffic on a network. A multicast address identifies a particular transmission session, rather than a specific physical destination. An individual host is able to join an ongoing multicast session by issuing a command that is communicated to a subnet router. This may take place by issuing a "join" command from, for example, an ISP customer to the ISP provider which, in turn, commands its subnet router to route the desired session content to the host to which the requesting ISP customer is connected. The host may then send the content using, for example, PPP protocol to the ISP customer.

Since the broadcast transmission is provided over a dedicated transmission medium (the satellite in the illustrated embodiment), problems normally associated with unknown traffic volumes over a limited bandwidth transmission medium are eliminated. Additionally, the number of point-to-point connections necessary to reach a large audience is reduced since the system uses localized connections within or to the domain to allow clients to join and receive the broadcast. In the illustrated embodiment, a virtually unlimited number of domains may receive the broadcast and supply the broadcast to their respective clients, additional domains being added with only the cost of the routing station at the domain involved. In most instances, ISPs or the like need only add a routing station, such as at x1 et seq., and may use their existing infrastructure for receiving broadcasts from the routing station for transmission to joined clients. This is due to the fact that most ISPs and the like are already multicast enabled using the IP multicast protocol.

Figure 4:
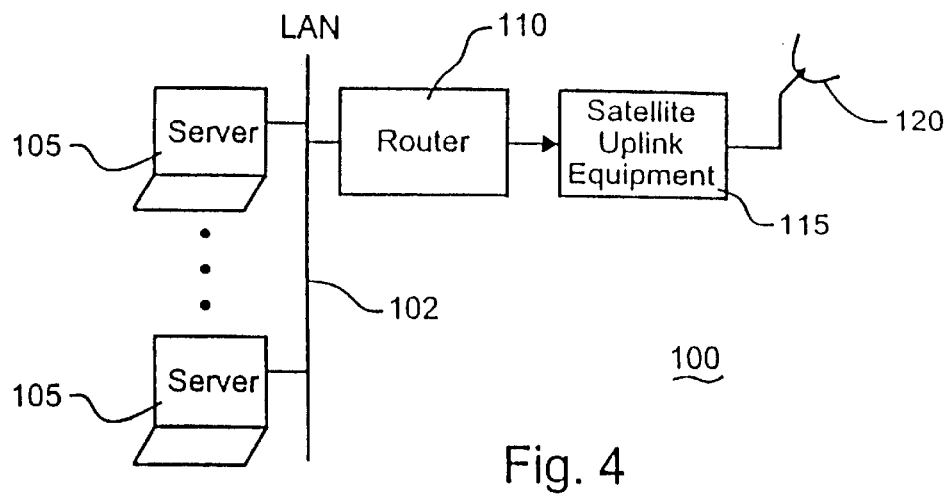
FIG. 4 is a block diagram of one embodiment of a file server station, such as one suitable for use in the conventional system of FIG. 1.

FIG. 4 illustrates a block diagram of one embodiment of a file server station, such as the one illustrated at 100 of FIG. 1. The file server station, shown generally at 100, comprises a local area network 102 with a collection of server PCs 105 connected to a router 110 over the local area network 102. The server PCs 105 include server software that either reads pre-compressed files from the local disk drive and/or performs real time compression of analog real time data. Each server 105 provides this data as output over the local area network.

The LAN 102 itself performs the function of multiplexing all the streaming data from the server PCs 105. The LAN 102 should have sufficient bandwidth to handle all the data from the server PCs 105. In present practice, 100 mbs LANs are common and, thus it is quite feasible to use 100 mbs LANs to aggregate the data output to a 30 mbs transponder. A common type of LAN is or 100Base T, referring to 100 mbs over twisted pair wire.

The functionality required at 110 is to gather the packets of data from the LAN 102, wrap them in a transport protocol such as HDLC, and convert the HDLC packets to the proper voltage levels (such as RS422). The functionality can be provided by the composite signal provided from the router 110 usually comprises clock and data signals. The composite signals are output from the router 110 for synchronous modulation by a satellite uplink modulator 115 which synchronously modulates the data to the proper RF carrier frequencies and transmits the resulting signal through an antenna 122 to the satellite 55.

One or more server PCs 105 of the LAN 102 store the multimedia content that is to be broadcast to the domains. Alternatively, the one or more PCs 105 may receive pre-recorded or live analog video or audio source signals and provide the necessary analog-to-digital conversion, compression, and TCP/IP packet forming for output onto the LAN wanted. These packets are transported over the LAN 102 in an asynchronous manner. The router 110 then receives these asynchronous packets and encapsulates them with the transport protocol and transmits them in a synchronous manner to the satellite 55. The constant conversion from one form to another is provided to fit the transmission technologies of the transmission equipment. LANs are becoming ubiquitous and low cost since it leverages the high manufacturing volumes of the consumer/corporate PC market. Satellite transmission is extremely cost effective for broadcasting signals to multiple destinations and is inherently synchronous (data is transmitted at precise intervals). Accordingly, the foregoing system is currently the most straight forward and lowest cost method to architect a system connecting computer LANs to a satellite transmission system.

A typical satellite 55 has two antennas, one for receiving the signal from the uplink and the second antenna for transmitting the signal to the downlink. An amplifier is disposed between the two antennas. This amplifier is responsible for boosting the level of the signal received from the file server station 100 (uplink). The received signal is very weak because of the distance between the uplink and the satellite (typically about 23,000 miles). The received signal is amplified and sent to the second antenna. The signal from the second antenna travels back to downlinks which are again about 23,000 miles away. In the illustrated embodiment of the system, the downlinks are the routing stations.

The signal is transmitted by the uplink at one frequency and shifted to a different frequency in the satellite before amplification. Thus, the signal received by the satellite is different from the frequency of the signal transmitted. The transmitted information content is identical to the received information.

A typical satellite has approximately 20 to 30 RF amplifiers, each tuned to a different frequency. Each of these receive/transmit frequency subsystems is called a transponder. The bandwidth of each of the transponders is typically about 30 MHz but can vary satellite to satellite.

At the file server station 100, the composite signal from the router 110 is preferably QPSK modulated by the satellite uplink modulator. During the modulation process, extra bits are usually added to the original signal. These extra bits are used by a receiver at the downlink to correct any errors which might occur during the 46,000 mile transmission. The extra protection bits that are added to the data stream are called Forward Error Correction bits (FEC).

The resulting modulation and error correction process typically allows about 1 megabit/second of data to occupy about 1 megahertz (MHz) of bandwidth on the transponder. Thus, on a 30 MHz bandwidth transponder, one can transmit about 30 mbs of data. The aggregate data rate of the signals generated by all server PCs 105, including the overhead of the underlying transmission protocols (IP and HDLC), must be less that the bandwidth of the satellite transponder.

Figure 5:
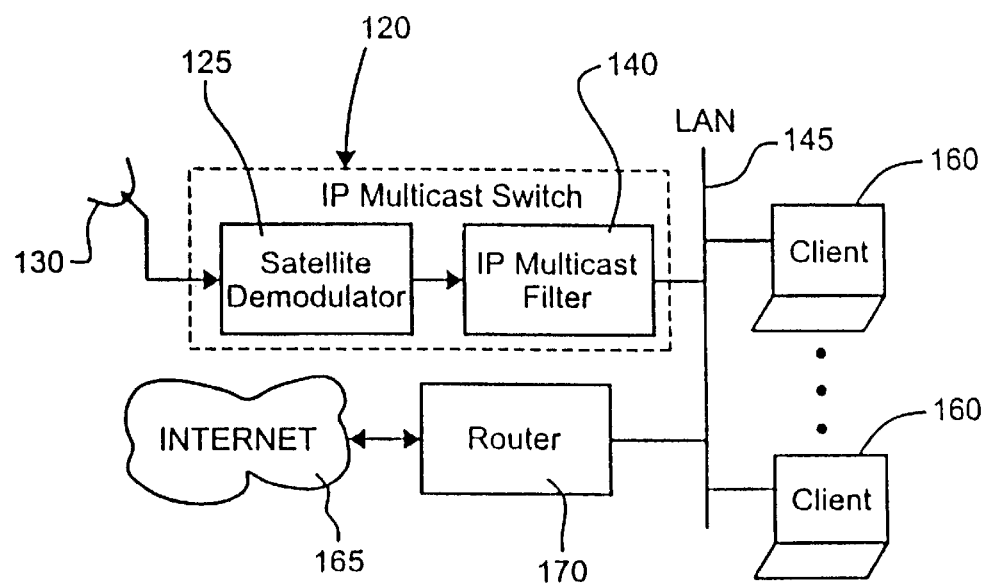
FIG. 5 illustrates one embodiment of a routing station constructed in accordance with one embodiment of the present invention and its connection within a network domain.

FIG. 5 illustrates one embodiment of a routing station and its connection within a domain. Here, the routing station is called an IP Multicast Switch (IPMS), labeled as 120 in FIG. 5. The IPMS 120 is comprised of a demodulator 125 that receives the radio frequency signals from the satellite 55 over receive antenna 130 and converts them into the original TCP/IP digital data stream. These digital signals are then input to a device called a IP Multicast Filter (IPMF) 140 that in-turn selectively provides the signals as output onto a LAN, shown generally at 145, having sufficient capacity to handle all the received signals. The IPMS 120 is multicast enabled, meaning that data is only output from the IPMF 140 onto the LAN 145 if a client 160 requests a connection to receive a broadcast channel. As noted above, this multicast protocol may be one such as defined in RFC 1112.

As illustrated, the LAN 145 can be connected to the Internet 165 through a router 170. If the broadcast data output on the LAN 145 uses administratively scoped addresses, the router 170 can prevent forwarding of the data to the Internet 165. This is a desirable feature associated with the use of administratively scoped addresses, as the broadcast can be localized and blocked from congesting the Internet 165. If other addresses are used, such as permanent IP multicast addresses, the router 170 is programmed to prevent data having an IP multicast address from being broadcast on the Internet 165.

The software of the IPMS 120 is capable of operating in an IP multicast network. In the embodiment described here, the control structure of the multicast software in the IPMS 120 has four main threads: initialization, multicast packet handling, LAN packet handling. and multicast client monitoring. In the initialization thread, a table used to determine whether a client has joined a broadcast has its content set to an empty state. Initialization is performed before any of the other threads are executed.

The multicast packet handling thread is responsible for reading data from the satellite demodulator and deciding what is to be done with it. To this end, the thread reads each multicast packet received from the satellite demodulator 125. If the multicast group address specified in the received packet is not in a group table designating the groups received from the satellite 55 by the demodulator 125, the group address is added to the group table and set to "not joined." If the multicast group address specified in the packet is specified in the join table as having been joined by a client, the packet is output through the IPMS 120 tothe LAN 145 for receipt by a requesting client 160. If none of the foregoing tests are applicable, the packet is simply ignored.

The LAN packet handling thread is used to determine whether a join command has been received from a client 160 over the LAN 145. To this end, the IPMS 120 reads an IP packet from the LAN 145. If the packet is a request from a client 160 to join the multicast session and it is in a group table (a table identifying groups which the IPMS 120 is authorized to receive), the group address is added to the list of joined addresses in the join table. In all other circumstances, the packet may be ignored.

The multicast client monitoring thread is responsible for performing periodic checking to ensure that a multicast client who has joined a broadcast is still present on the LAN 145. In accordance with RFC 1112, every predetermined number of seconds, or portions thereof, for each group address in the group table which has joined the multicast session a query is sent to that address and the IPMS 120 waits for a response. If there is no response, the IPMS 120 assumes that all joined clients have terminated and removes the group address from the joined list.

It will be recognized that other further software threads and variations on the foregoing threads may be used. However, in the simplest form of the illustrated embodiment, the four threads described above are all that is practically needed for effective IPMS operation where the IPMS 120 is disposed at an outer edge of a domain network. This simplification provides a reduction in complexity in the IPMS 120.

If there are one or more routers between the IPMS 120 and the multicast client 160, then the IPMS 120 is programmed to understand the various multicast protocols such as DVMRP, MOSPF and PIM. These protocols are well known and can easily be implemented in the IPMS 120.

In either configuration, the IPMS 120 appears to the domain network as the source of the data, and the satellite link effectively places an identical server at each downlink location in the separate domains described in connection with FIG. 2.

It is generally preferable to have the IPMS 120 as close as possible to the last point in the network before transmission to a client. This close proximity to the client minimizes the traffic burden on other system routers and the overall local LAN. The Internet Service Provider's (ISP) local Point of Presence (POP) is generally the optimum location for placement of the IPMS 120 at an ISP. Such a configuration is illustrated in FIG. 6.

Figure 6:
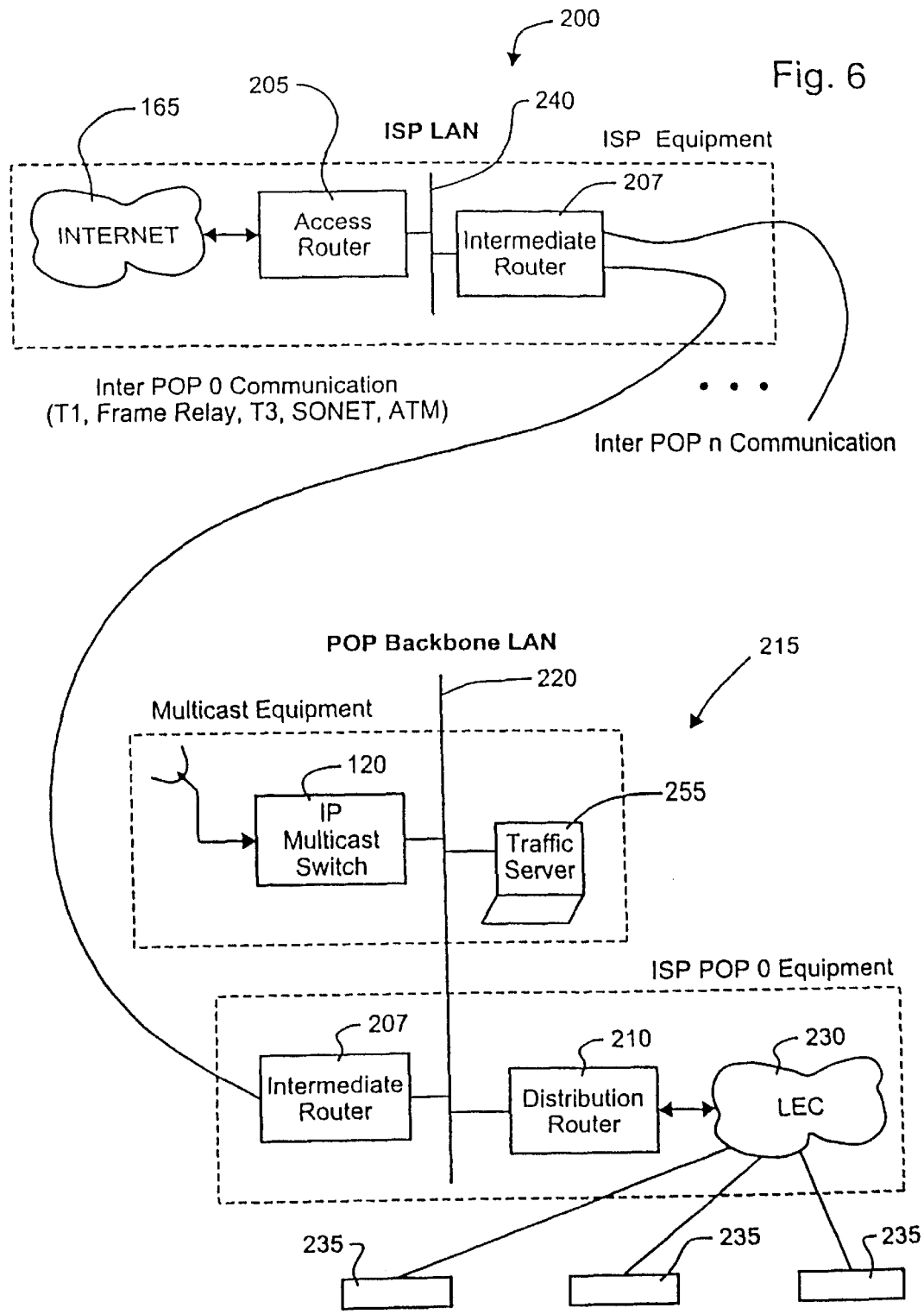
FIGS. 6 and 7 illustrate use of a routing station constructed in accordance lip the invention and its connection at an Internet Service Provider.

As shown in FIG. 6, the ISP, shown generally at 200, is connected via an access router 205 to the Internet 165. If a distribution router 210 is located some distance from the Internet access router 205, then inter-POP communications are required through one or more intermediate routers 207. These inter-POP communications may take place via frame relay or SMDS (Switched Multimegabit Data Service) since these are relatively inexpensive communication methods. In the POP 215, the IPMS 120 is connected to the backbone LAN 220. This LAN 220 is connected to the distribution router 210 and provides the connectivity to the customer base. Typically, the distribution router 210 is connected to a Local Exchange Carrier (LEC) 230 through telephone company interconnects such as T1, T3, and ATM lines and, thereafter, to remotely located home users/clients 235.

The architecture of FIG. 6 allows customers 235 to place local (free) calls into the distribution router 210 that, in turn, allows the customers 235 to access the Internet 165 through some remote access point. If the POP 215 and the Internet access at access router 205 are co-located, then the ISP LAN 240 and the POP Backbone LAN 220 are one in the same and there are no intermediate routers or intervening inter-POP communications.

Figure 7:
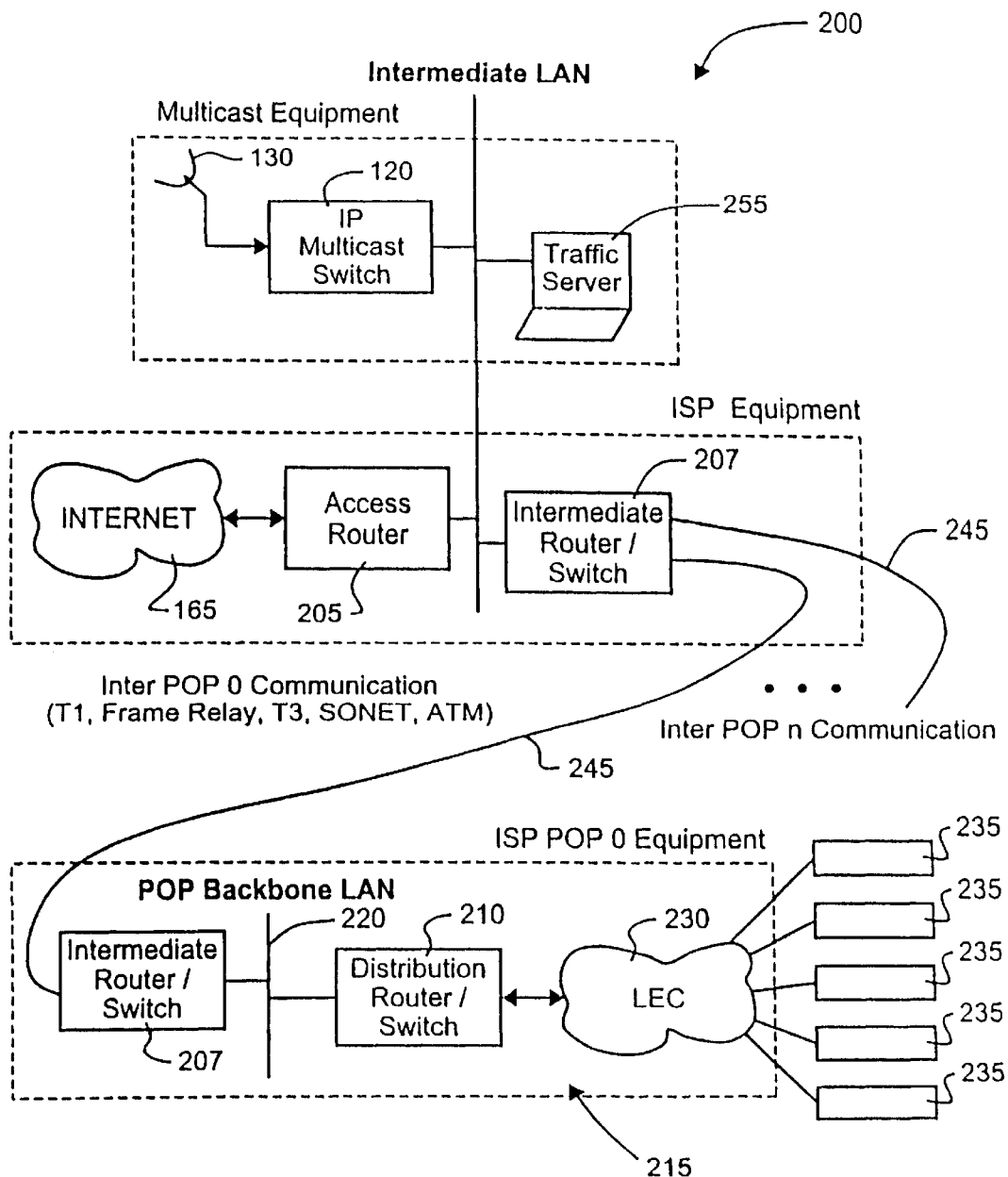

FIG. 7 illustrates a system in which the IPMS 120 is not disposed at the POP 215 location. This arrangement is functional, but requires a large amount of bandwidth over the inter-POP communication lines 245. The configuration shown in FIG. 6 minimizes the bandwidth requirements of the router interconnections relative to the configuration shown in FIG. 7 since only the POP Backbone LAN should include both the traditional Internet traffic as well as the Multicast traffic.

As can be seen from examination of FIGS. 6 and 7, the addition of multicast equipment to the ISP's POP 215 is minimal. It is also possible and desirable to add a traffic server PC 255 onto the LAN of the ISP 200 having the IPMF 120 (also known as a multicast switch). This traffic server 255 can be used for a variety of purposes, but in the embodiment shown here, it is used to store information received from the satellite 55 and the Internet 165 for later playback. It also can be used to monitor the number and identification of a connected user as well as performing other functions. For example, when a user selects a video/audio multicast channel to view/hear, it sends a specific IGMP message over the LAN that is directed to the IPMS 120. This message can also be monitored by all systems connected to the LAN. Specifically, the traffic server 255 may monitor the communication between the router 210 and any connected clients and may also monitor the number of connections to the multicast channels. The connection information gathered by the traffic server 255 is preferably relayed to a central server or the like over the Internet 165 at periodic intervals for consolidation at a central facility.

One advantage of the foregoing system architecture is that it provides a scaleable architecture that may be scaled to deliver a small number of megabits as well as further scaled to deliver nearly a gigabit of content to a large number of host computers. This architecture is only constrained by satellite transponder capacity, which is typically about 30 mbs per transponder.

Figure 8B:
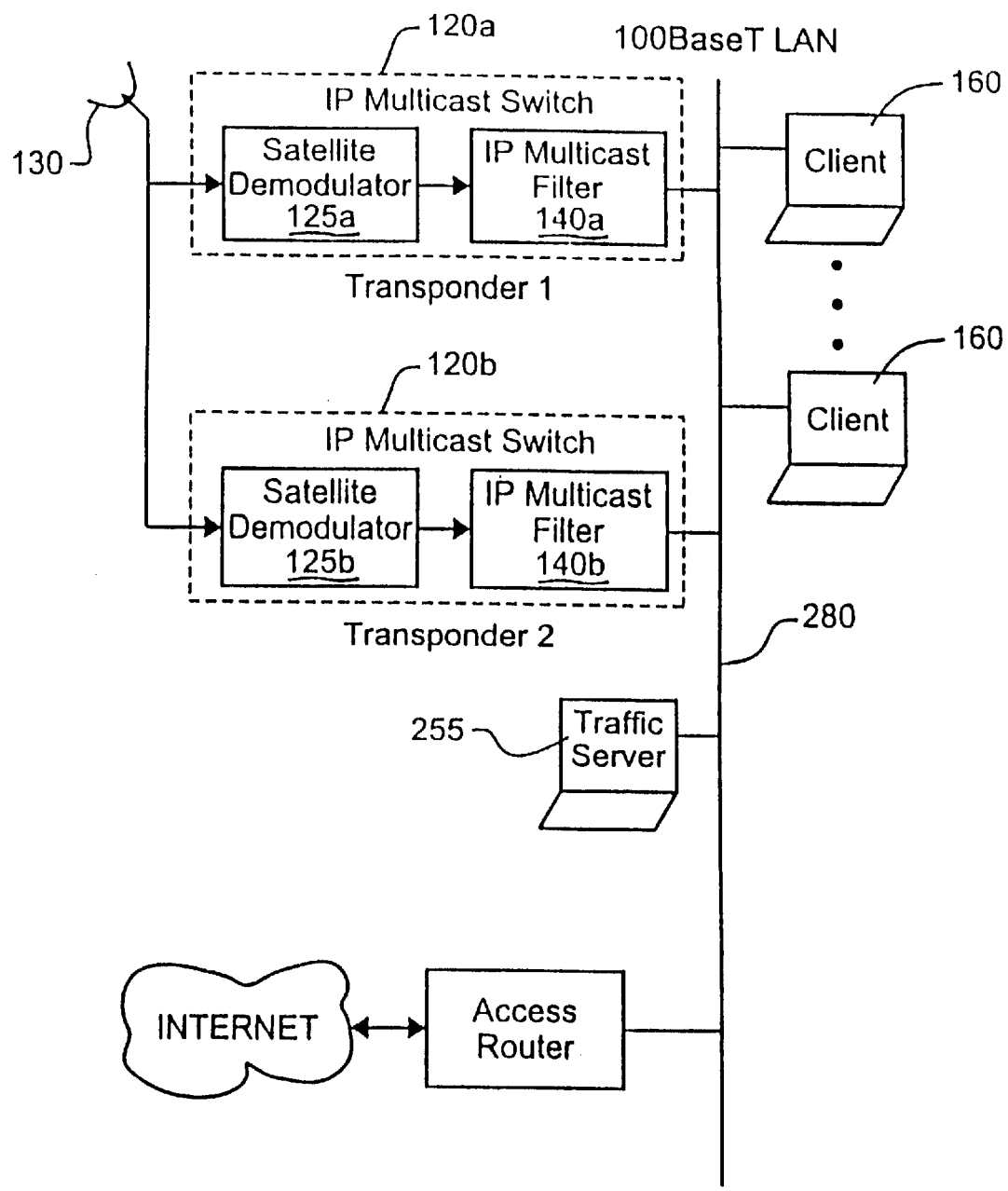
FIG. 8b illustrates one embodiment of a downlink site suitable for use in the network of FIG. 2.

FIGS. 8a and 8b illustrate the uplink and downlink systems suitable for handling at least 60 mbs. File server stations, such as the one shown at FIG. 4, typically only have a capacity of 30 mbs. As such, the uplink here uses two file server stations 100a and 100b. On the uplink side, a second cluster of server PCs 105 is connected to a second router 110b, which is connected to the uplink equipment and transmits the signal over the same satellite 55 using a different transponder frequency. Alternatively, the transmission of signals from the second router 110b may be directed to a different satellite than the one used by the first file server station 100a. If the two signals are uplinked onto the same satellite, then it is possible to share a common antenna.

At the downlink side of FIG. 8b, there are two IPMS units 120a and 120b, which are each identical to that described above. If the two signals are uplinked on the same satellite, it is possible to share an antenna 130 on the downlink as shown in FIG. 8b. If not, then two separate antennas are required, one pointing to each of the different satellites. In the scenario shown in 8b, the two IPMSs 120a and 120b are connected to a 100 baseT LAN 280. The maximum bit-rate delivered to the LAN 280 is the sum of the individual bit rates of the IPMSs 120a and 120b, or about 60 mbs. This is a convenient number since the maximum real capacity of a 100 BaseT LAN is about 60 mbs.

Additional file server stations and IPMSs may be added to the foregoing system to increase the number of available multimedia multicast channels available to the ISP clients. For example, a 90 mbs system may be constructed by adding a further file server station at the uplink side of the system and adding a further IPMS at the ISP POP. This third IPMS, however, presents a problem for a 100 BaseT LAN since the total possible throughput can now exceed the allowable LAN bandwidth. The traffic server 255 can be used to assist in eliminating this problem.

At the heart of the multicasting protocol is the fact that generally no unnecessary traffic is forwarded unless someone has requested it. This means that even if there is 90 mbs of total data received from the satellite, there would be no data output to the 100 BaseT LAN if there were no clients requesting a connection to it.

On the other hand, it is possible that there could be clients requesting placement of the entire 90 mbs on the LAN. Such traffic would saturate the LAN 280. To mitigate the problem, there are at least two potential solutions. The first solution is to modify the client software so that it first contacts the traffic server 255 to determine how much bandwidth is already delivered to the LAN 280. If the LAN is already delivering the maximum possible data to other clients, then the client currently trying to connect is given a message stating that the system is too busy.

A second solution is to have an IPMS first contact the traffic server 255 to check the load on the LAN 280 before providing a channel of multicast data on the LAN 280. To this end, the IPMS 120 contacts the traffic server 255 after a request has been made for a channel of multicast data but before the data is supplied on the LAN 280. If the traffic server 255 deems that the load is too high, it instructs the IPMS 120 to ignore the join request and refrain from transmitting the requested group on the LAN 280. As a result, the requesting client would not receive the requested video/audio stream. The client software may indicate the failure to receive the requested data upon termination of a predetermined time period and indicate this fact to the user. Nevertheless, the applicants believe that there is a high probability that 90 to 120 mbs of data could be uplinked with no downlink overload on the LAN, since it is highly unlikely that all data rates of all channels would be simultaneously used.

The traffic server software could be imbedded into one of the IP Multicast Switches 120 and thus eliminate separate traffic server hardware 255.

Figure 9:
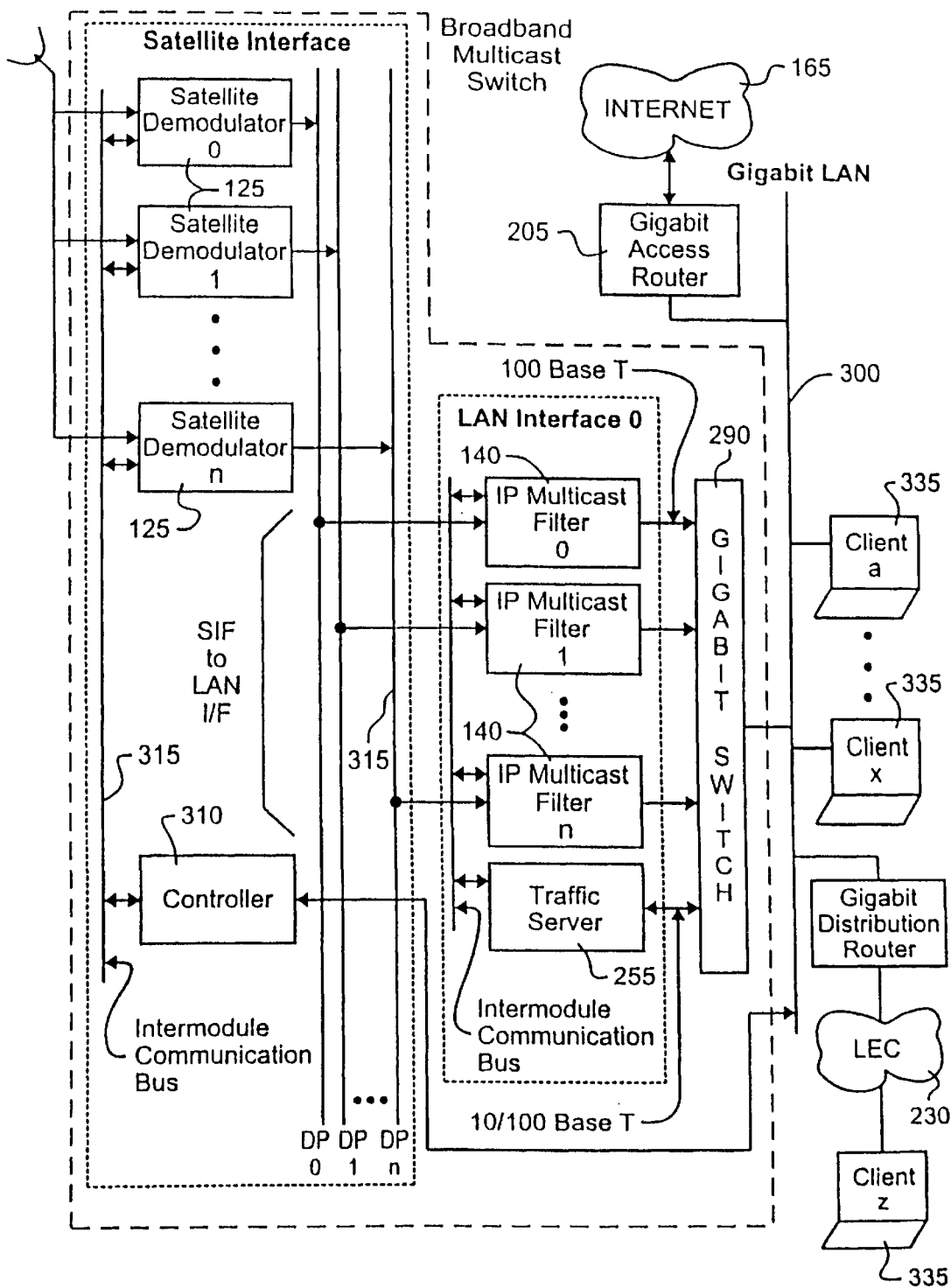
FIGS. 9–11 illustrate various embodiments of downlink sites suitable for use in the network of FIG. 2.

If the system data rate is scaled even higher, then the architecture shown in FIG. 9 is used at the downlink side of the system. The transmission data rate at the uplink side is obtained by merely adding further file server stations 100. The system shown in FIG. 9 adds a new piece of hardware called gigabit switch 290. On the right side of the switch 290 is a connection to the LAN 300. The LAN 300 in this embodiment is capable of handling the total aggregate bandwidth output by all IPMSs 120. For the case where each IPMS 120 is receiving 30 mbs and there are 10 IPMSs, then the aggregate bandwidth is 300 mbs. This implies that the LAN 300 is capable of handling such traffic.

As further illustrated in FIG. 9, a controller 310 may be used to communicate with the LAN 300 and, further, with the demodulators 125 and IPMFs 140 over a communication bus 315. Such an architecture allows the controller 310 to program the specific operational parameters used by the demodulators and IPMFs. Additionally, the demodulators 125 and IPMFs 140 may communicate information such as errors, status, etc., to the controller 310 for subsequent use by the controller 310 and/or operator of the routing station. Still further, the traffic server 255 may be used to facilitate intermodule communications between the IPMFs 140.

The connections between the IPMF 140 and the switch 290 may be the 100 BaseT connections shown in the previous figures. This implies that the switch 290 requires n-100 BaseT input ports to accommodate the n-IPMS inputs. The system proposed in FIG. 9 assumes the use of gigabit access and distribution routers, gigabit LAN's and gigabit switches. Such network components are in the very early stages of deployment.

Figure 10:
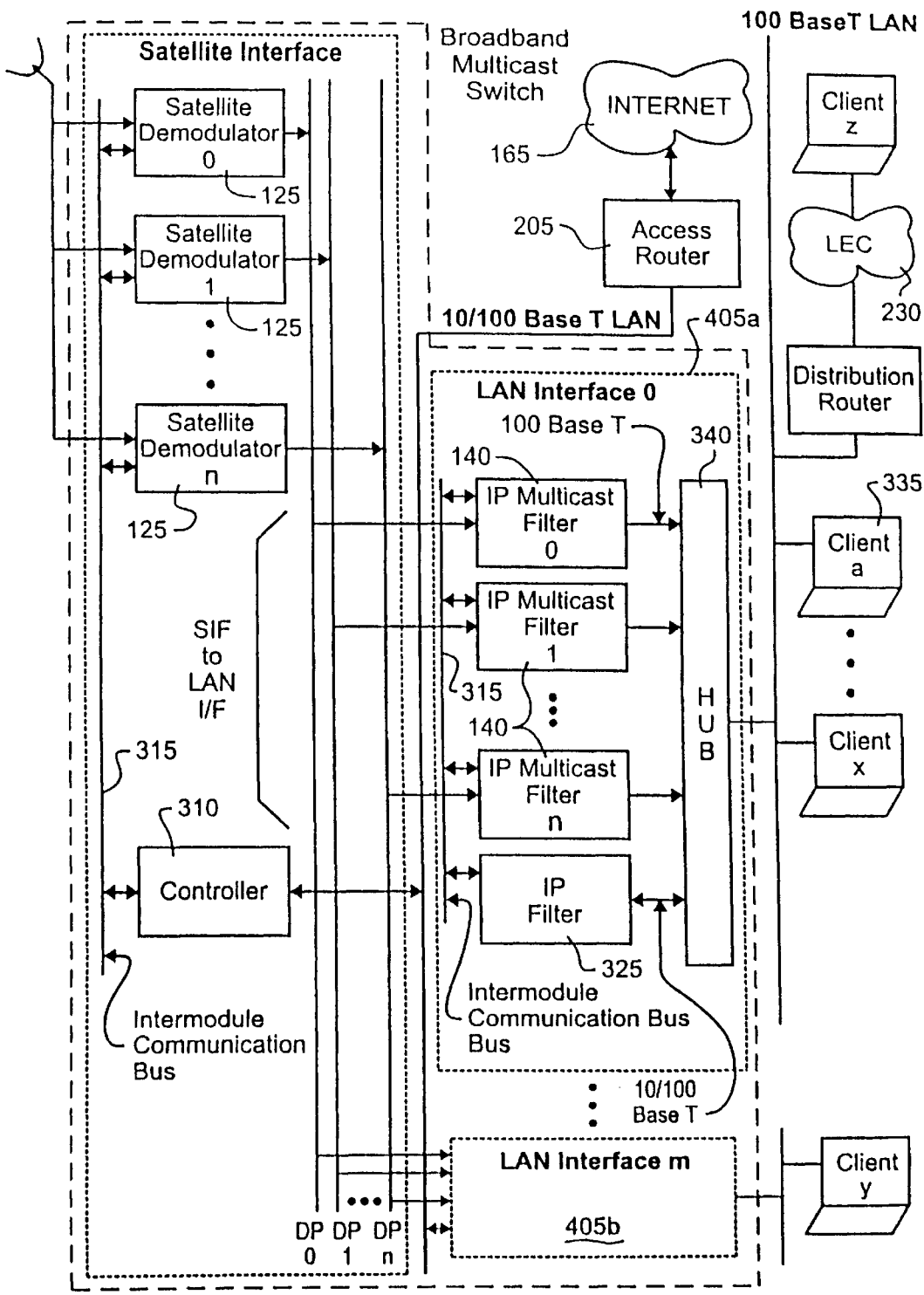

A second architecture that can be used to scale to a large number of users is shown in FIG. 10 and is similar to the architecture shown in FIG. 9 in that they both include the satellite demodulators 125 and the IP Multicast Filters 140. The system of FIG. 10. however, replaces the traffic server 255 with an IP filter 325 and the gigabit switch 290 with a standard 100 BaseT hub 340. Another significant difference between the two architectures is that the Internet access router 205 of FIG. 10 is directly connected to the backbone of the gigabit LAN while the connection for the Internet access by the clients 335 is through the IP filter 325 within the LAN interface module. The IP filter 325 may be implemented by a PC or the like, or by a microcontroller. The IP filter 325 performs the functions of the traffic server 255 as well as simple IP packet filtering. It passes each packet received from the Internet without examination or modification. This includes multicast as well as unicast traffic. Packets received from the hub 340 are examined on a per packet basis. Multicast packets with a group address used by the satellite delivered multicast system (shown here as the Satellite Interface Unit (SIU)) are blocked from traversing onto the Internet. This prevents the Internet Access LAN from overload and serves the function of administratively scoping the multicast traffic to one segment. This architecture also has an added advantage in that the routers used in the domain do not have to be multicast enabled.

The architecture shown in FIG. 10 can be viewed as dividing an ISP into smaller ISP's within the larger ISP. Each of these mini-ISPs has its own LAN Interface Unit (LIU) 405. This architecture places a performance requirement on the IP filter in that it must be capable of processing all packets flowing through it via the 100 BaseT LANs to which it is connected.

Figure 11:
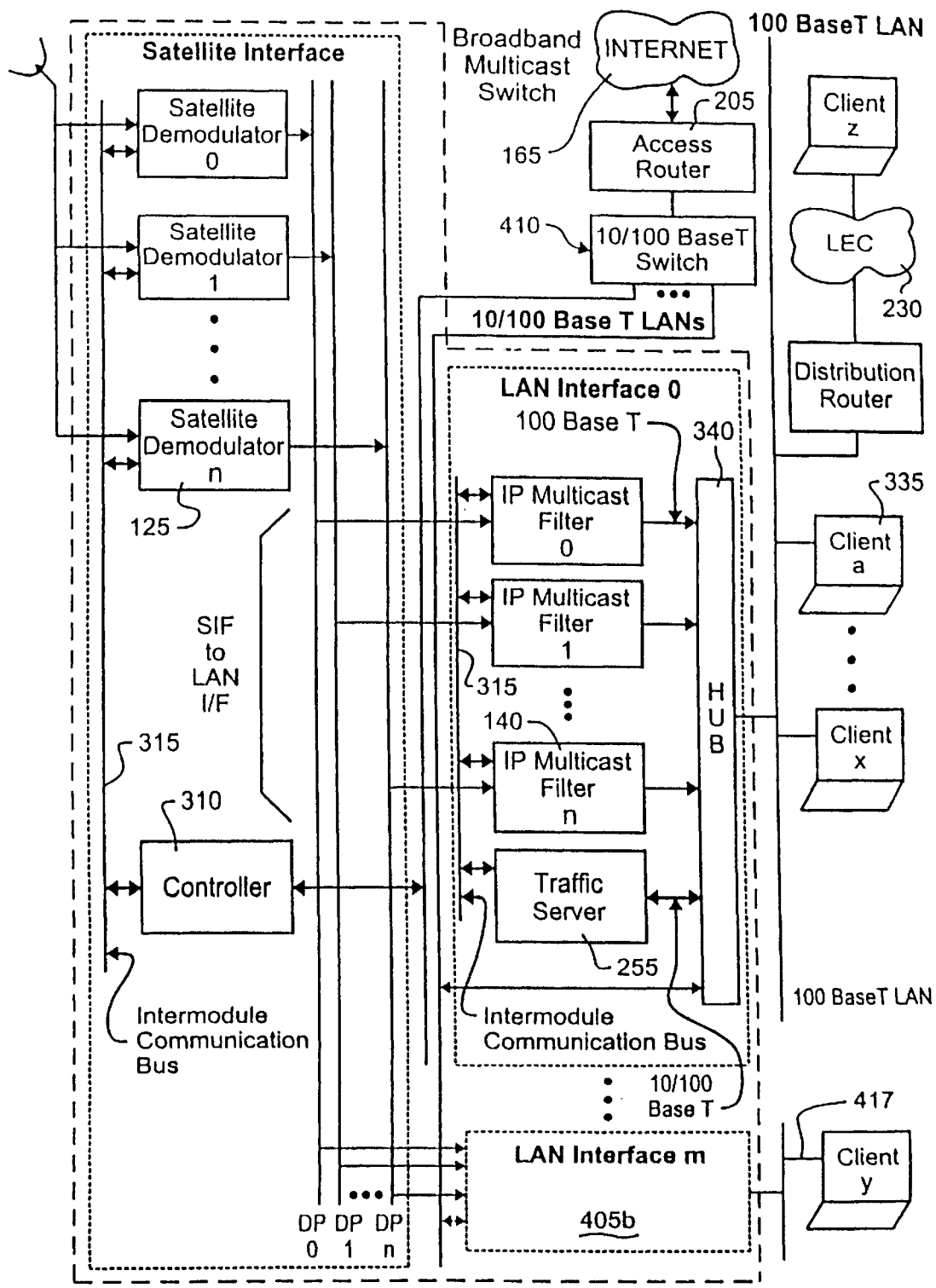

FIG. 11 illustrates a further system architecture that replaces the IP filter 325 of FIG. 10 with a traffic server 255 and uses a 10/100 BaseT switch 410 in place of the IP filter 325. This architecture requires the 10/100 BaseT switch 410 to perform the IP multicast filtering that was done in the IP filter 325.

The interface point 417 of FIG. 11, between the IPMS and a particular ISP LAN segment, may also be facilitated in cases where that LAN segment is remotely located. Standard digital telecommunications services may be employed to serve as electrical "extension cords" to bring the output of the IPMS onto the remotely located segment. This is done through commonly available "CSU/DSUs" that can transform the LAN output of the IPMS into a digital signal compatible with the Network Interface requirements of common communications carriers, and at the remote location, a subsequent translation. back into the required 100 BT LAN signal.

Figure 12:
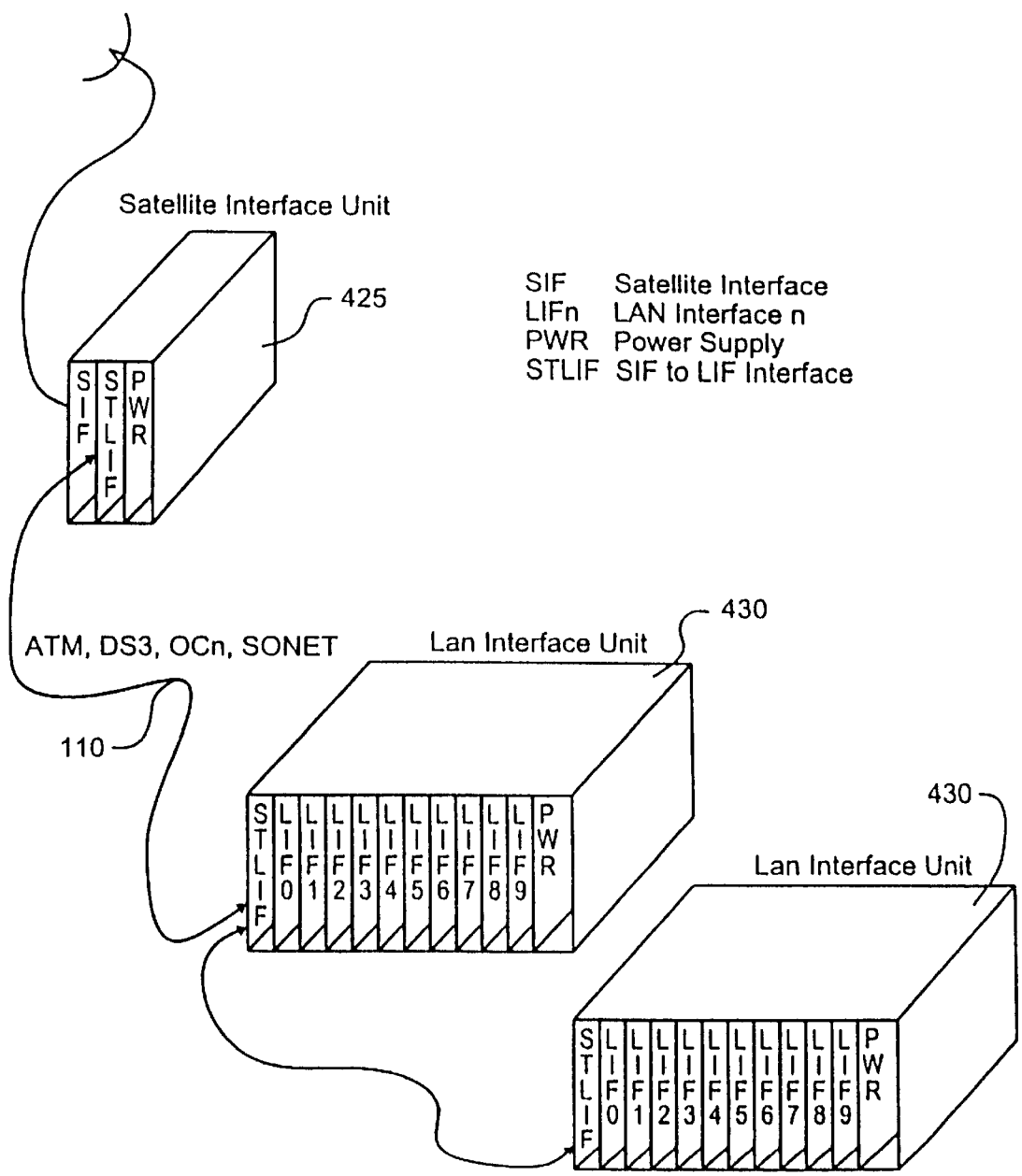
FIGS. 12 and 13 illustrate various manners in which various components of a downlink site may be modularized and interconnected.
Figure 13:
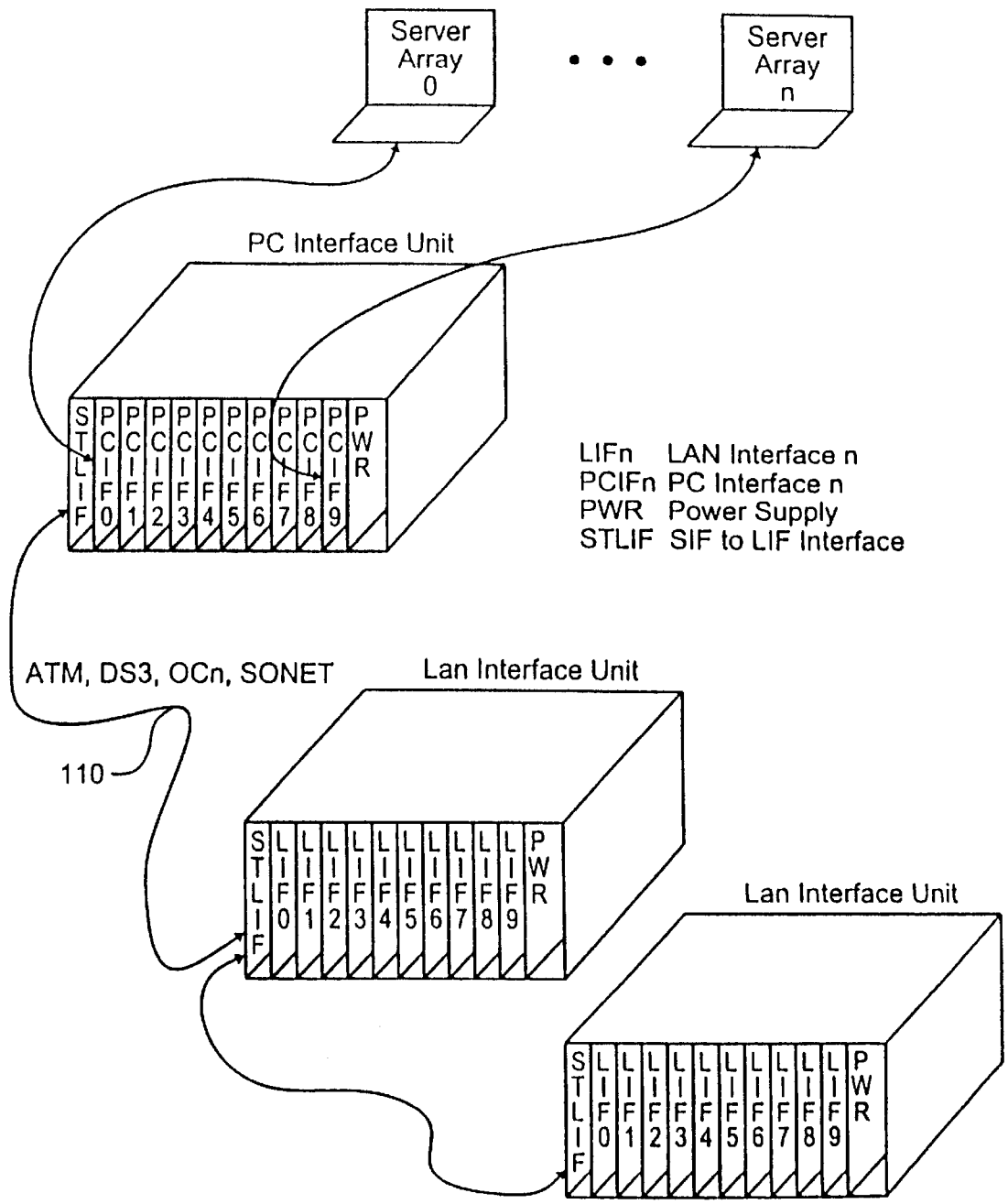

FIG. 12 shows one manner of implementing the architectures for the satellite downlink. The IP Multicast Switch 120 can be functionally and physically divided into a satellite interface unit 425 and a LAN interface unit 430. Multiple LAN interface units 430 may be connected to a single satellite interface unit 425. This allows the satellite reception equipment to be located at a first location and its output distributed to various remotely located LAN interface units. As shown in FIG. 13, the basic system architecture of FIG. 12 also allows for the distribution of content via an alternate transmission facility such as terrestrial fiber 110. Alternatively, these two modules can reside in the same chassis and use the chassis backplane for intermodule communication.

Figure 14A:
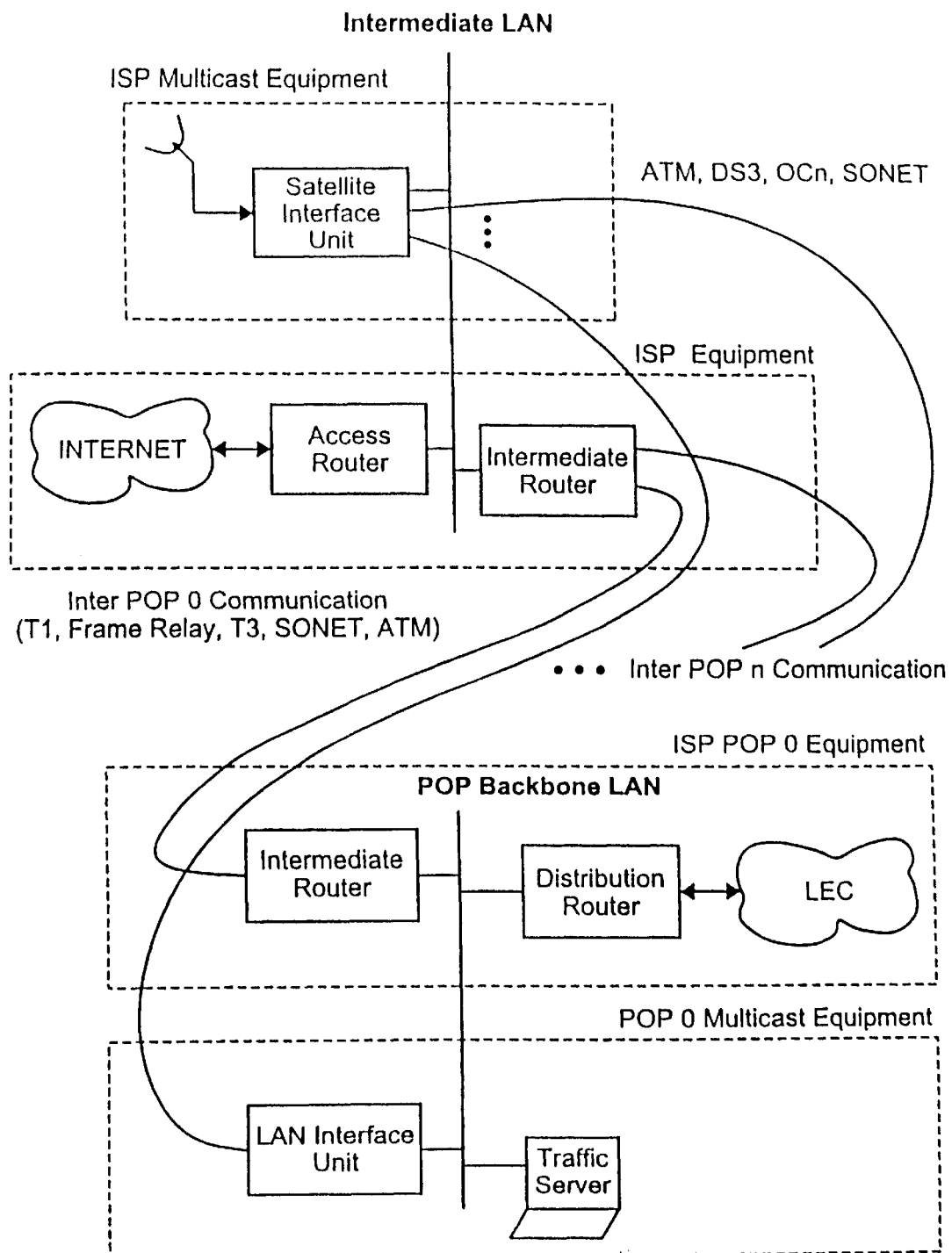
FIG. 14 illustrates one embodiment of the multicast system at an ISP with distributed POPs that are interconnected with one another.
Figure 14B:
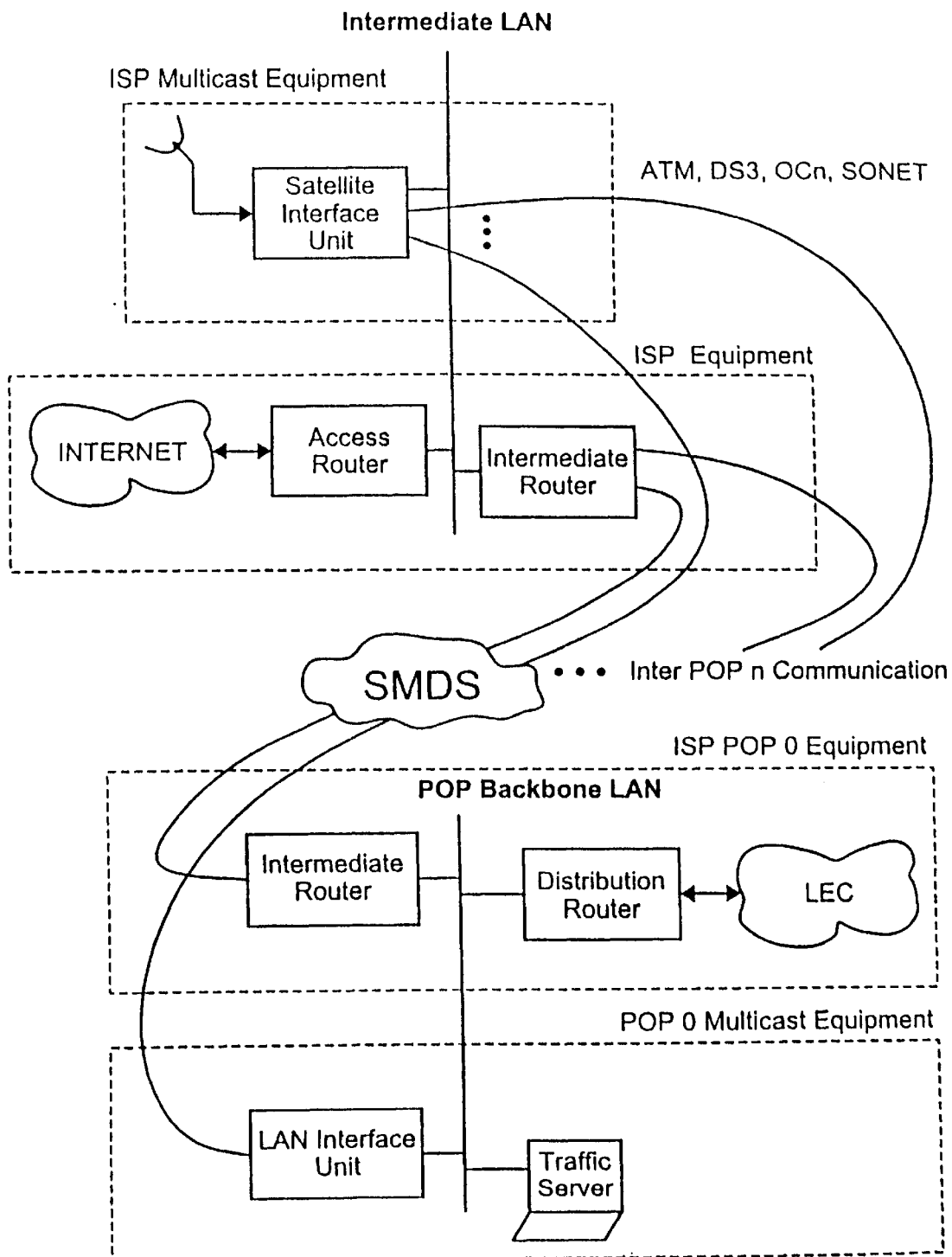

FIG. 14 illustrates an embodiment of the system at an ISP with distributed POPs that are interconnected with one another. This embodiment of the system isolates the multicast traffic from the unicast traffic. Inter-POP multicast traffic is carried on a separate transmission facility.

Figure 15:
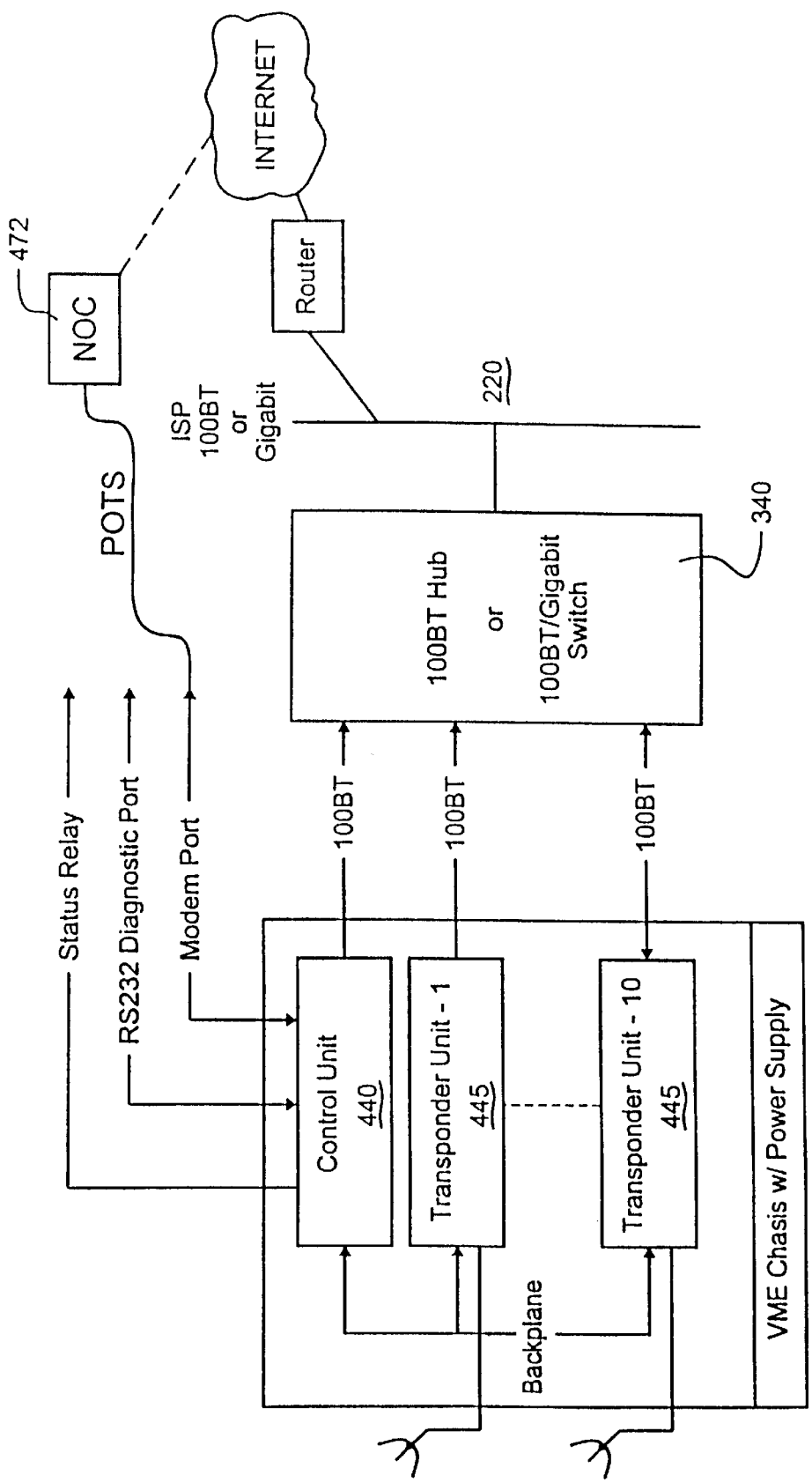
FIGS. 15 and 16 illustrate one embodiment of an IPMS.
Figure 16:
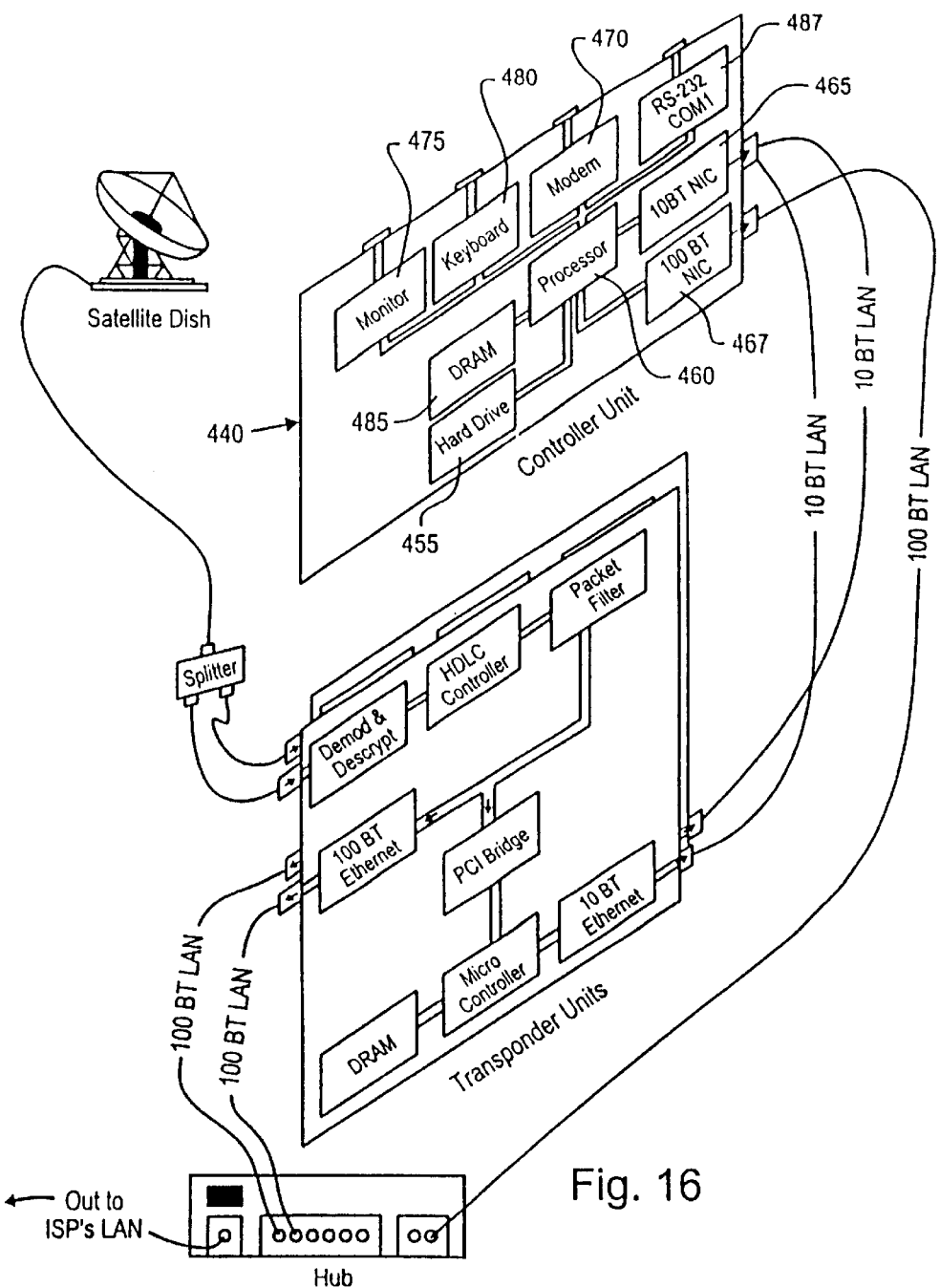

One embodiment of an IPMS is illustrated in FIGS. 15 and 16. Generally stated. the embodiment of the IPMS unit 120 shown here and subsequently described is comprised of a controller unit 440 and one or more transponder units 445. The controller unit 440 handles the monitoring, control, and configuration of the IPMS unit 120. The transponder units 445 performs demodulation and de-packetization of the RF signal data received from the satellite 55 and provides the demodulated data to the hub 340 of a 100 BT LAN 220 when directed to do so by the controller unit 440. In some implementations of the system, there may be a need for a splitter unit 450 that divides the RF signal for supply to several transponder units 445.

As noted above, the controller unit 440 handles all monitor, control, and configuration of the IPMS unit 120. It maintains logs of all of the events in the system and processes all incoming TCP/IP protocol messages to the IPMS unit 120. These messages include the IGMP join requests from remote clients, individually addressed commands to the controller unit 440, and packets destined to individual transponder units 445. The controller unit 440 is responsible for logging all of the trace type events in a non-volatile memory device, such as a hard disk drive 455.

As illustrated, the controller unit 440 is comprised of a microprocessor unit 460, two network interface cards (NIC) 465 and 467, a modem 470 for connection to a remote port, a video controller 475 for connecting a video monitor, a keyboard interface 480 for connection to a keyboard, a DRAM 485 for storage. an RS-232 port 487 for external communications, and the hard drive 455.

The microprocessor unit 460 may be an Intel Advanced ML (MARL) Pentium motherboard. This board has two serial ports, a parallel port, a bus mastering IDE controller, a keyboard interface, a mouse interface, support for up to 128 MB of DRAM, and a socket for a Pentium microprocessor. The board supports 3 ISA extension boards and 4 PCI extension boards. The MARL motherboard is designed to fit into the standard ATX form factor.

The RS-232 port 487 supports commands from a remote port that can be used for both monitor and control functions. This interface supports standard RS-232 electrical levels and can be connected to a standard personal computer with a straight through DB-9 cable. The software used to implement the interface supports a simple ASCII command set as well as a packet protocol that can be used to send commands that contain binary data.

Monitor and control interface software 490 executed by the microprocessor unit 460 supports multiple communications settings for the RS-232 port 487 by allowing the user to change the baud rate, the number of data bits, the number of stop bits, and the type of parity. These settings are saved in non-volatile memory so that they are preserved after power has been removed from the receiver.

The monitor and control interface software 490 preferably supports both a simple ASCII protocol and a more complex packet structure. The ASCII protocol is a simple string protocol with commands terminated with either a carriage return character, a line feed character, or both. The packet protocol is more complex and includes a data header and a terminating cyclic redundancy check (CRC) to verify the validity of the entire data packet.

The ASCII protocol is preferably compatible with a simple terminal program such as Procomm or HyperTerminal. When an external terminal is connected to the RS-232 port 47, the controller unit 440 initially responds with a sign-on message and then displays its "ready" prompt indicating that the is ready to accept commands through the monitor and control interface software 490. Commands are terminated by typing the ENTER key which generates a carriage return, a line feed, or both. The controller unit 440 interprets the carriage return as the termination of the command and begins parsing the command.

Most commands support both a query and a configuration form. Configuration commands adhere to the following format:

cmd param1<,param2>CR where cmd is the command mnemonic, param1 is the first parameter setting, the <,param2> indicates an optional number of parameters separated by commas, and CR is a carriage return.

Queries of commands can be entered in one of two forms as follows:

cmd ?CR or optionally cmdCR

The controller unit 440 responds to the query with the command mnemonic followed by the command's current setting(s).

Figure 17:
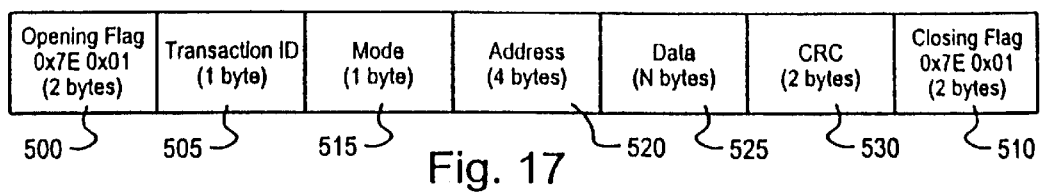
FIG. 17 illustrates a packet protocol that may be used by the controller unit to communicate through the monitor and control interface software.

The controller unit 440 may also communicate through the monitor and control interface software 490 using a predetermined packet protocol. One such protocol is illustrated in FIG. 17. The illustrated protocol is an asynchronous character based master-slave protocol that allows a master controller to encapsulate and transmit binary and ASCII data to a slave subsystem. Packets are delimited by a sequence of characters, known as 'flags,' which indicate the beginning and end of a packet. Character stuffing is used to ensure that the flag does not appear in the body of the packet. A 32-bit address field allows this protocol to be used in point-to-point or in point-to-multi point applications. A 16 bit CRC is included in order to guarantee the validity of each received packet.

The opening flag 500 includes a $7E_H01_H$ flag pattern indicating the start of packet or end of the packet at 510. A transaction ID 505 follows the opening flag 500 and is, for example, an 8-bit value that allows the master external computer to correlate the controller unit 440 responses. The master computer sends an arbitrary transaction ID to the controller unit 440, and the controller unit 440 preferably responds with the 1's complement of the value received from the master. Following the transaction ID 505 is a value that allows the master to identify the addressing mode of the packet. This portion of the packet is called the mode byte and is shown at 515. These addressing modes include broadcast, physical, and logical modes. An address field 520 and data field 525 follow the mode byte 515. The address field value is used in conjunction with the mode field to determine if the slave should process the packet. The data field 525 contains information specific to the application. This field can be any size and is only limited by the application. Finally, a CRC-16 field 530 follows the data field 525. The CRC-16 field 530 allows each packet to be validated. Each byte from the mode byte 515 to the last data byte is included in the CRC calculation.

The monitor and control interface software 490 supports the same command set as both a remote port and a TCP/IP in-band signaling channel. This allows the IPMS 120 to be controlled identically using any of the possible control channels (although the physical connection and physical protocol vary by connection) which provides redundant means of monitor and control. These commands are described in further detail below.

The controller unit 440 includes the hard drive 455 for its long-term storage. This drive is preferably at least 2.1 GB in size and uses a standard IDE interface. The drive 455 is preferably bootable and stores the operating system, the application(s) running the IPMS 120, and all long-term (non-volatile) data such as history/trace data.

The network interface card 465 is used to communicate with all of the transponder units 445 in the IPMS 120. The network interface card 465 is comprised of a 10 based-T LAN interface running standard TCP/IP. Individual commands are issued using the same protocol as set forth above in connection with the monitor and control interface software 490 as well as any remote port connected through modem 470. This protocol is encapsulated into TCP/IP and sent via an internal LAN 532 over transmission line 535.

The network interface card 465 supports both broadcast and individual card addressing. This interface also supports two-way communication that can be initiated by any unit on the internal LAN 532. Individual transponder units 445 may communicate with each other over the internal LAN 532, although this interface is not truly intended to be used in this fashion in the embodiment shown here. The 10 Based-T interface card 465 may be implement using any off-the-shelf network interface card.

The modem 470 of the controller unit 440 may also support commands that can be used for both monitor and control functions. The modem 470 supports standard phone modem electrical levels and can be connected to a standard phone jack with a straight through RJ-11 cable. Both the ASCII and packet protocols noted above are supported by the modem 470. The modem 470 thus provides another communications route to the IPMS 120 in case a standard TCP/IP link over the Internet to the IPMS 120 fails.

The modem interface 470 is implemented, for example, by an off the shelf modem and auto-negotiates all communications settings with a Network Operations Center or NOC 472 at a location that is remote of the ISP. The Network Operations Center 472 preferably uses an identical modem.

The IPMS 120 includes several miscellaneous input and output (IO) functions that are not illustrated in FIG. 15 and 16. These functions may be handled on either a plug in ISA board or a front panel board. The IO may include status LEDs, a status dry contact closure, and a panic button. The status LEDs may be set through an I/O card. LED indicators may include Power Present, Power OK, Fault, Test, Carrier OK, and LAN Activity. The Power Present LED may indicate that the IPMS 120 is plugged into its main AC source. The Valid Power LED may indicate if the power within the IPMS 120 is within valid tolerance levels. The Fault LED may indicate if a major fault is occurring in the IPMS 120. The Test LED may indicate that the IPMS 120 is in a test mode, either its power up test or an on-line test mode. The Carrier LED may indicate that all transponder units 445 that should be acquired (have been programmed to lock onto a carrier) are, in fact, locked. If any single transponder unit 445 is not locked, this LED will be off. The LAN activity LED may indicate that the IPMS 120 has activity on its 100 based-T LAN.

A Form C dry contact closure may be provided to indicate the status of the IPMS 120. If the IPMS 120 goes into a fault condition, the IPMS 120 will provide an output signal along one or more lines at 540 to drive closure to a closed state. This provides a means of monitoring the overall operational integrity of the IPMS 120 with an external device triggered by the contact closure. Devices that could be used include automatic pagers or alarm bells.

The IPMS 120 may also have a panic button that is used to turn off outgoing multicast video. This will provide the ISP with a quick and efficient way of stopping the IPMS 120 data flow onto the ISP LAN 240 in cases of extreme LAN congestion or a when a malfunctioning IPMS 120 inadvertently congests the LAN 240. This button preferably will not take the controller unit 440 link off of the network. This ensures that the controller unit 440 will still be susceptible to monitoring and control through the TCP/IP port connected to the ISP's LAN 240.

Once the panic button has been pressed, the IPMS 120 issues a "LAN shutdown" to every transponder unit 445 through the network interface card 465. The individual transponder units 445 are responsible for shutting their LAN output off.

CONTROLLER UNIT SOFTWARE FUNCTIONALITY

The following sections provide a brief overview of one embodiment of the software functionality used to operate the controller unit 440. This software is preferably developed in accordance with an object-oriented, C++, methodology.

The controller unit 440 preferably runs under a Microsoft Windows NT Workstation operating system. This operating system supports all of the networking protocols needed as well as supporting the hardware found in the controller unit 440.

1. Networking Protocols

The networking protocols discussed above are supported by the operating system. The operating system runs an HTTP server that allows control of the controller unit 440 through a web browser type of application.

2. Watchdog Process

A hardware watchdog timer counter that must be periodically reset is used in the controller unit 440. If this counter runs out, it generates an interrupt that reset as the controller unit 440. In addition to this system level watchdog timer, individual applications may maintain their own versions of watchdog monitoring to ensure that they do not "hang." In cases where an individual task can restart without affecting the overall system, the task will be restarted. In cases where the system becomes unstable, the entire controller unit 440 is preferably restarted in an orderly manner. In either case, an error should be generated and logged in the trace buffer.

3. Software Download

The controller unit 440 handles software downloads for itself and for all of the transponder units 445. Software downloads are preferably performed using FTP file downloads over the local ISP LAN the 240 through NIC 467, from a remote station over the modem interface 470, or through the RS-232 port 487. Before a file is downloaded, FTP server software in the controller unit 440 verifies that the download is, in fact, a new file. The files are preferably downloaded into a fixed directory structure.

4. Network Configuration Tables

The NOC 472 maintains a series of tables used to configure a network of systems such as the one shown in FIG. 15, each system being linked to the NOC 472. These tables may be downloaded using FTP or a predetermined table download command and are used by the controller unit 440 to configure all of the transponder units 445 and to handle any data rate adaptation required by the system. The tables include a Channel Definition Table (CDT), a Carrier Table (CT), and a Channel Cluster Table (CC).

The Channel Definition Table (CDT) is used to define the location and bandwidth of every channel containing, for example. multimedia content, in the overall system. Each channel of the disclosed embodiment has a unique ID that ranges from 0 to 16K. This ID is the same value as the channel's default low order administratively scoped address bits. For example, channel 128 will have a default address of X.Y.0.128 where X and Y are the administratively scoped high order address bytes (239.117 for example). The CDT also provides an indication of the carrier frequency on which a channel can be found. The carriers are assigned a unique ID number that can be converted to a frequency and data rate using the Carrier Table set forth below. The CDT also includes the Channel Cluster ID of the cluster in which the channel appears, if any. The Channel Cluster ID is defined in the Channel Cluster Table section below. Each CDT record preferably uses the following record format:

| | |
|---|---|
| Channel ID | (8-bits) |
| Transponder Number | (16-bits) |
| Data Rate (in Kilobytes) | (16-bits) |
| Cluster ID | (16-bits) |

The CDT only contains records for defined channels in the overall system. If a channel is not defined, the IPMS 120 will assume that the channel has zero bandwidth. The overall table will be represented in the following form:

| | |
|---|---|
| Table ID | (8-bit) |
| Number of Channels | (16-bit) |
| Channel Records | (40-bits per record * number of channels) |
| CRC | (16 bit) |

The Carrier Table (CT) provides a means for identifying all of the carriers being used in the overall system. The records in the CT indicate the satellite transponder ID, the frequency of the carrier, its data rate, and the type of coding that the carrier is using (including scrambling). The controller unit 440 provides these parameters to the transponder units 445 to acquire the desired carrier. The CT records also contain information about the satellite that the carrier is transmitted from and the polarity of the receive signal. The controller unit 440 uses this information to notify an installer, through, for example, a video terminal attached to the video controller 475, that multiple dishes are required. Further, the satellite ID is used to determine the azimuth and elevation settings for an antenna that is to receive the carrier transmission from the identified satellite. Each record within the CT preferably has the following format:

| | |
|---|---|
| Carrier Number | (16-bits) |
| Frequency (in kHz) | (32-bits) |
| Data Rate (in Hz) | (32-bits) |
| Coding Type | (8-bits) |
| Polarity | (8-bits) |
| Satellite ID | (8-bits) |

The overall table format for the CT is as follows:

| | |
|---|---|
| Table ID | (8-bit) |
| Number of Carriers | (16-bit) |
| Carrier Records | (104-bits per record * number of carriers) |
| CRC | (16 bit) |

The Channel Cluster Table (CCT) is used to describe a "cluster" of channels. A cluster of services is defined as a set of multiple channels with the same content but using different data rates. This aspect of the present embodiment of the system is set forth above. The CCT is used to allow a client to receive a channel at a different data rate from the one requested. For example, if a client requests a service at 1 Mb but the LAN 240 is congested or the controller unit 440 is close to its maximum allowable bandwidth on the LAN, the controller unit 440 can inform the client software (usually a browser plug-in or the like) to switch to another channel in the cluster at a lower data rate, say 500 kb. To facilitate lookup times, each channel has its associated cluster ID in its record within the Channel Definition Table. This allows the controller unit 440 to easily locate a channel ID. determine its Cluster ID, and find alternate channels. Each Channel Cluster record preferably conforms to the following record format:

| | |
|---|---|
| Cluster ID | (16-bits) |
| Number of Channels in Cluster | (8-bits) |
| Service ID's | (16-bits * the number of channels) |

The overall table format for the CT is as follows:

| Table ID | (8-bit) |
|---|---|
| Number of Clusters | (16-bit) |
| Cluster Records | (24 + (16 * the number of channels) * number of clusters) |
| CRC | (16 bit) |

5. Networking Protocols

As discussed above, the controller unit 440 may receive Internet related protocol messages. It processes such messages and performs the necessary actions to maintain the controller unit environment. For example, when the controller unit 440 receives an IGMP join message from an end-user client application requesting a new service, it may respond with a predetermined sequence of action. For example, the controller unit 440 logs the join request, verifies that there is enough bandwidth on the LAN 240 to output the service, and sends an Add Service command to the appropriate transponder unit 445. The controller unit 440 then sends a response back to the client indicating whether or not the join was successful.

6. Inter-IPMS Communications

The controller unit 440 communicates with the transponder units 445, and any I/O units that are utilized, through the 10 based-T LAN, shown here at 532. The software of the controller unit 440 maintains a TCP/IP protocol stack to support this interface.

7. Serial Communications Over the Modem 470 and RS-232 Port 487

The controller unit 440 utilizes the monitor and control software 490 described above to handle the modem 470 and RS-232 port 487 serial communications ports. The serial ports are used to send commands to and from the controller unit 440. The commands supported through this interface are the same as the commands through the 100 based-T LAN interface 240.

8. Command Processor

Command processor software tasks handle commands that have come in from the various command channels (modem 470, port 487, etc.) supported by the controller unit 440. The commands are parsed and executed as needed.

9. System Event Logging

All significant events may be logged into a trace buffer in, for example, the non-volatile memory (hard drive 455). The controller unit software tasks will take an event, timestamp it, and put the resulting string into a trace buffer. The software routines may disable individual events from being put into the log and may control the execution of the logging process (start, stop, reset, etc.).

10. Status Monitoring

A status-monitoring software task in the controller unit 440 monitors the current status of the controller unit 440 and periodically polls each of the transponder units 445 for their status. This task maintains an image of the current status as well as an image of past faults that have occurred since the last time a fault history table was cleared (via command). This task further reports fault and status information to the Network Operations Center 472 over, for example, an Internet connection or modem 470.

11. Statistics Gathering

The statistics gathering task of the controller unit 440 is similar to the status monitoring software described above. This process keeps track of the number of users "viewing" a particular channel, the addresses of users, the number of collisions on the LAN 240, and other long term statistics that may be helpful in monitoring the usage of the IPMS 120.

12. Power Up Sequence

The power up sequence software of the controller unit 440 starts all necessary start-up tasks, determines if the transponder units 445 need to be programmed, performs all needed power up diagnostic functions, and joins the in-band signaling group address of at least on transponder.

13. Dish Pointing Calculation

The controller unit 440 supports several antenna pointing aids. For example, the controller unit 440 provides a ZIP code to azimuth and elevation calculation. This software application takes a ZIP code as an input through, for example, the keyboard interface 480, performs the necessary mathematical calculations or look-up actions, and gives the user the antenna pointing angles needed to find the satellite signal (azimuth and elevation).

14. Interrupts

The controller unit 440 uses various software routines in response to interrupt signals. For example, an interrupt may indicate that the watchdog timer has expired and, as such, the controller unit 440 software begins an orderly soft reset procedure. The controller unit 440 also utilizes interrupts to service real time clock, serial port communications, parallel port communications, keyboard interface communications, and mouse interface communications. All of these interfaces generate interrupts that are handled by the operating system.

15. Diagnostics

The controlling unit software supports multiple forms of self-diagnostics. Some of the diagnostics run on power up to verify system integrity, and other diagnostic functions are run periodically while the controller unit 440 is operational. For example, the controller unit 440 initially runs several diagnostics including a memory test, a virus scan, a File Allocation Table (FAT) check, a backplane LAN 532 connectivity test, and an external 100 based-T LAN 240 interface test when power is first supplied. As part of its ongoing monitoring process, the controller unit 440 also performs hard drive 455 integrity tests to verify that the file system has not been corrupted. If a hard drive error is encountered, the controller unit 440 logs the error into its trace history, and tries to correct the problem via downloading any corrupted files from the Network Operations Center 472. Still further, the controller unit 440 monitors the fault status of every transponder unit 445 with which it is associated in the respective IPMS 120. The fault monitoring status is an on-going periodic process. All faults are preferably entered into a trace buffer that is available for history tracking. Each fault will be time-stamped and stored in non-volatile memory.

16. Security

The software of the controller unit 440 supports multiple levels of security using passwords. The types of levels of access includes ISP monitoring, ISP configuration, network operations monitoring, network operations configuration, and administrative operations. Each level of access has a unique password. The highest levels of authorization will have passwords that preferably change periodically. Any changes to either passwords or configuration settings of the controller unit 440 preferably requires a confirmation (either in the form of a Yes/No response or another password).

COMMAND SET FOR INTERFACING WITH THE CONTROLLER UNIT 440

As noted above, commands can be provided to the controller unit 440 through the RS-232 port 487, the 100 based-T LAN network interface card 467, the 10 based-T backplane LAN network interface card 465, or through the modem 470. Through the 100 based-T network card 467, commands can be issued either through a SNMP interface, an HTTP interface, or raw commands through TCP/IP. Exemplary commands are set forth and described below.

1. TCP/IP Address

The TCP/IP address of the IPMS 120 can be set or queried. This command may be sent from an interface other than the LAN connection (since the LAN connectivity depends on this parameter).

2. RS-232 Settings

The settings for the COM port can be either queried or configured through the command interface.

3. Table Download

The network provisioning tables are downloaded via a table download facility. This command is used to process all new tables and reconfigures the system as necessary. The tables are described above.

4. Set Transponder Characteristics (per unit)

The controller unit 440 keeps track of which transponder unit 445 is assigned to each transponder. This implies that the RF parameters of the transponder units 445 are maintained and configured through the controller unit 440. Once the user has changed a parameter, the controller unit 440 forwards the changed information to the transponder unit 445 via the backplane of the LAN 145.

5. Network Utilization

Several statistics are kept on the network utilization, including the absolute data rate being output onto the LAN 220 and the number collisions being encountered on the LAN 220. The network utilization statistics may be made available through a "Network Utilization" query command.

6. Maximum LAN Data Rate

The Maximum LAN Data Rate command may be used to limit the amount of bandwidth that the controller unit 440 uses on the LAN 220. This allows the ISP to control the maximum impact that the system has on the LAN backbone.

7. Current Status

The controller unit 440 maintains its own internal status and, further, monitors the status of all of the transponder units 445 cards on the LAN 145. The current status of the IPMS 120, and all of its individual modules, can be queried through the Current Status Command.

8. Card Configuration

The Card Configuration command is used to query the number of transponder units 445 in the IPMS 120 and their current settings.

9. Usage Statistics

The Usage Statistics command is used to retrieve the current and past statistics of the channel usage experienced by the IPMS 120. This includes the number of viewers per channel, the usage of a given channel per time, the overall usage of the system per time, and the LAN congestion over time. All of these statistics may be made available graphically through an HTTP server or downloaded to the NOC in a binary form using SNMP.

10. Trace

The Trace command is used to start, stop, and configure the trace functions of the controller unit 440. Individual events can be enabled or disabled to further customize the trace capabilities of the unit 440. The trace may be uploaded to the Network Operations Center 472 for diagnostic purposes. The trace data may be stored on the hard drive, which provides a non-volatile record of the events. The maximum size of the trace log is determined by the available space on the hard disk and, preferably, can be selected by the user.

The transponder unit 445 is designed to receive, for example, an L-Band signal off of the satellite 55, convert the signal into its original digital form, and put the resulting digital signal onto the ISP's 100BT LAN 220. Each IPMS 120 may include multiple transponder units 445 thereby allowing the IPMS 120 to handle significant data traffic.

Figure 18:
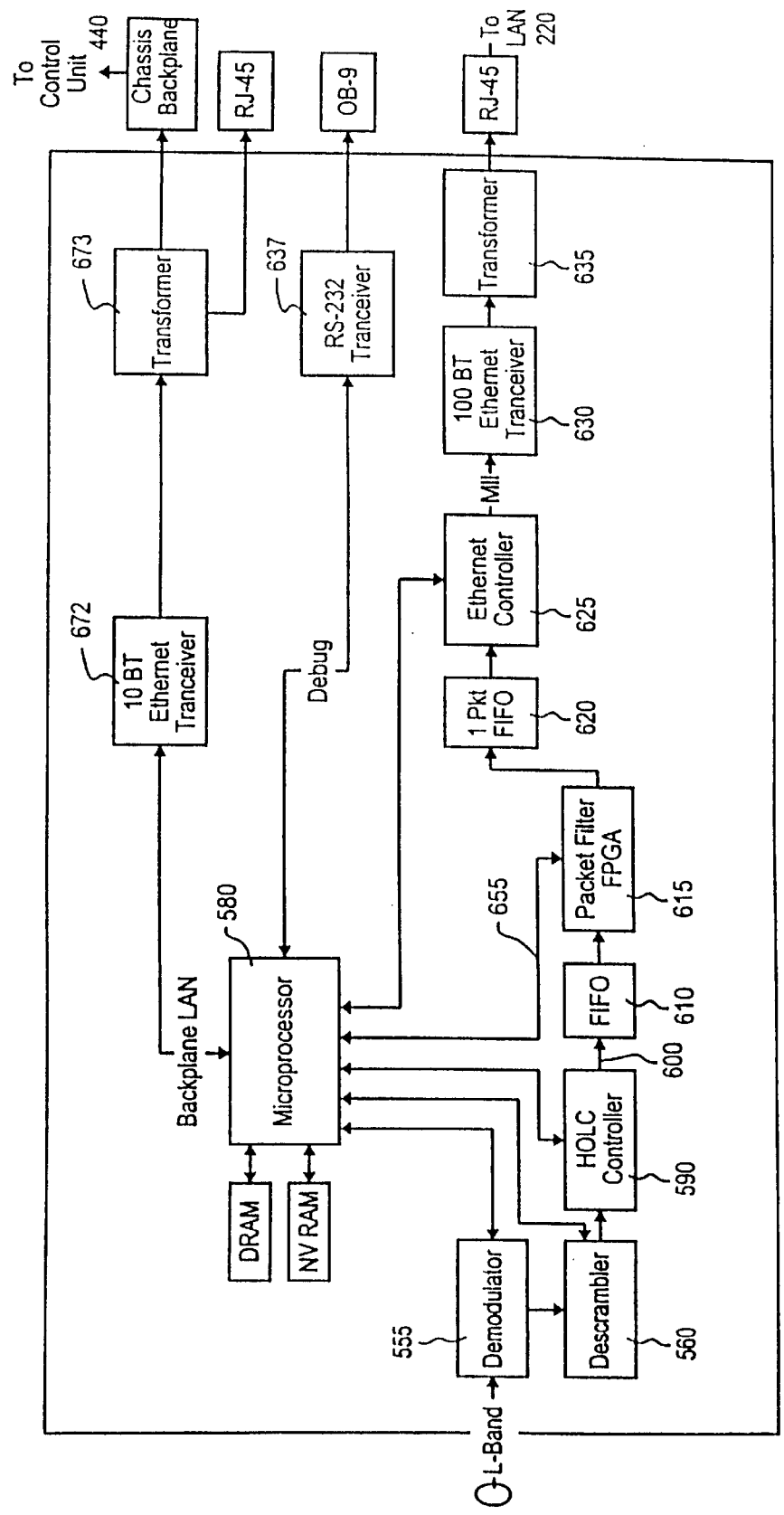
FIG. 18 illustrates one embodiment of a transponder unit.

FIG. 18 illustrates various functional blocks of a transponder unit 445. The transponder unit 445 includes an input 550 for receiving an RF signal, such as the L-band signal from the satellite 55. The RPF signal is supplied from the input 550 to the input of a demodulator 555 that extracts the digital data from the RF analog signal. The digital data from the demodulator 555 is optionally supplied to the input of a descrambler 560 that decrypts the data in conformance to the manner in which the data was, if at all, encrypted at the transmission site.

Figure 19:
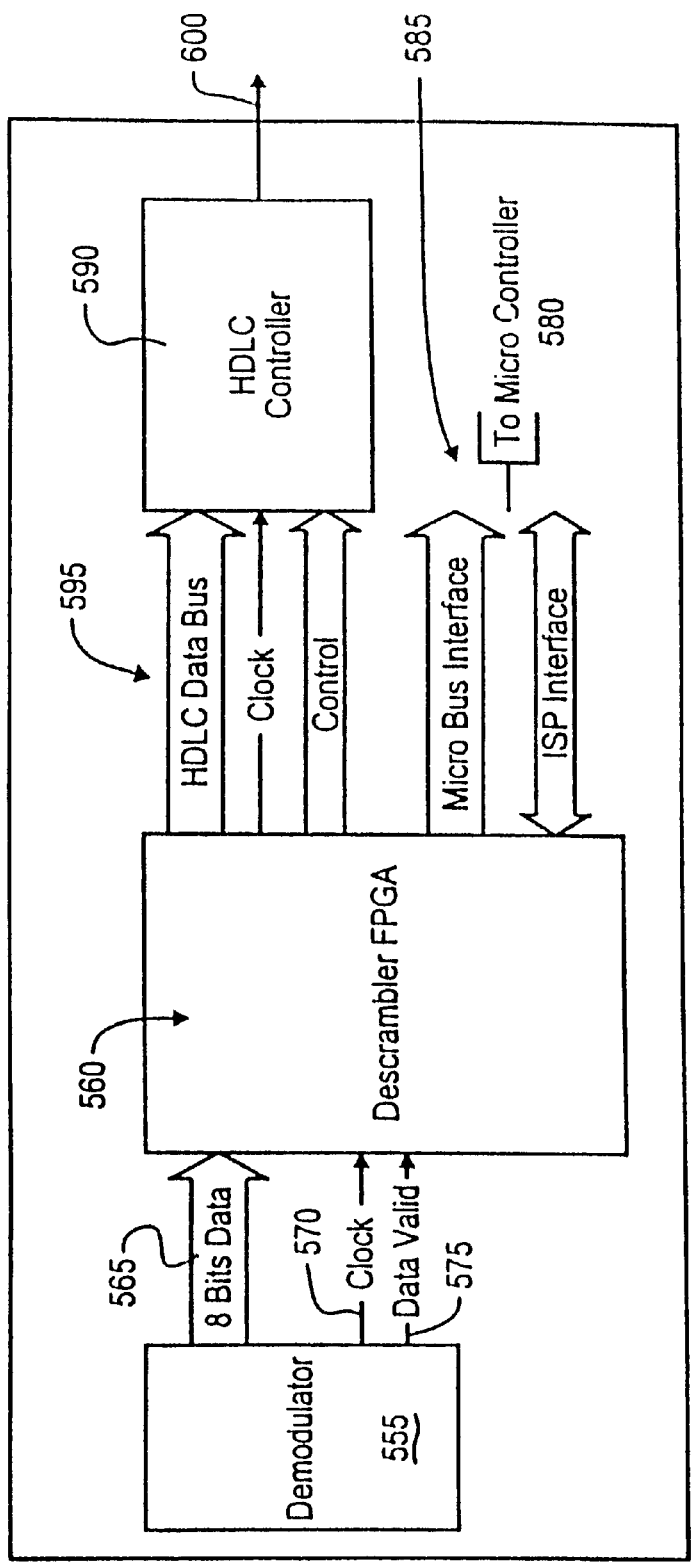
FIG. 19 is a schematic block diagram of selected components of one embodiment of a transponder unit including a descrambler.

One embodiment of a descrambler 560 is illustrated in FIG. 19. In the illustrated embodiment, the descrambler 560 may be implemented by a field programmable gate array. One type of field programmable gate array technology suitable for this use is a Lattice isp 1016.

The descrambler 560 preferably automatically synchronizes to the start of a DVB frame marker provided by the demodulator 555. The descrambler 560 receives digital data from the demodulator 555 along data bus 565, a clock signal along one or more lines 570, and a data valid signal along one or more lines 575. The data valid signal is used to qualify the clock signal in the descrambler 560. The descrambler 560 of the illustrated embodiment should have the capability of processing four megabytes/second. Such a processing rate is based on a maximum system data rate of 32 bits/second.

The descrambler 560 is also provided with a microprocessor interface for programming and monitoring the status of the device by a microprocessor 580 (see FIG. 18) such as a Motorola 860 type processor. The descrambler 560 preferably supports normal bus access in addition to data transfers through the device into the one packet FIFO. The descrambler 560 can also issue an interrupt to the microprocessor 580 to request immediate service.

Using a microprocessor interface 585 to the descrambler 560, the microprocessor 580 is provided with access to the internal registers of the descrambler 580 via a bidirectional data bus. The microprocessor 580 accesses the device's registers via the address bus of the microprocessor interface. Preferably, the microprocessor 580 gains access to the registers of the descrambler 560 using a RD/WR signal qualified by a CS signal consistent with the Motorola 860 bus architecture. The descrambler 560 can also issue an interrupt to the 860 processor using INT signal. The microprocessor 580 may also be used to perform overall fuse programming of the descrambler 560 when the descrambler is implemented using a field programmable gate array.

The descrambler 560 takes the data received on data bus 565 from the demodulator 555, de-scrambles it in a manner consistent with any scrambling operation performed on the data at the transmission site, and provides it to the input of an HDLC controller 590. In the illustrated embodiment, the descrambler 560 and the HDLC controller 590 interface with one another over an HDLC bus 595 that is preferably comprised of an HDLC parallel data bus, a clock signal, and a control bus. The HDLC controller 590 serializes the data received on the data bus of the HDLC bus 595 and provides it as a serialized output at serial bus 600 for supply at one or more output lines. The serial form of the data is used by the HDLC controller 590 for validation and de-packetization operations.

The descrambler 560 may have two modes of operation: a descramble mode and a clear channel mode. In the descramble mode, the device descrambles the data to be serialized for the HDLC controller 590. Preferably, the descrambler 560 supports simple P/N sequenced descrambling. This mode is used as a protected transmission mode that assists in preventing unauthorized access of the transmissions. In this mode, the descrambler may use, for example, an 8 bit seed used to descramble the input data. This seed is preferably programmed into the descrambler 560 through the microprocessor interface bus 605. The microprocessor 580 may asynchronously set the seed value by writing to a seed register internal to the descrambler 560.

In the clear channel mode, the descrambler 560 allows the data to be serialized without de-scrambling. This mode is used for an unprotected transmission mode in which unauthorized receipt of the transmission is not a significant issue. Clear channel mode can be set by programming the seed register to, for example, all zeros.

The descrambler 560 may also maintain several counters to allow the microprocessor to detect system errors. For example, the descrambler 560 may store a count of the number of block errors detected. This is preferably implemented as a 16 bit register that rails (i.e. does not cycle back to zero) at 0xFFFF (65,535). The descrambler 560 stores a count of the number of valid packets read from the IF.

The HDLC controller 590 receives the parallel bit data from the descrambler and depacketizes the HDLC frames. The HDLC controller 590 processes the CRC, removes the flags, and removes any bit stuffing characters from the HDLC frame. If there are any errors in the data, they are indicated in the status provided by the HDLC controller 590. Typical errors include CRC errors and frames that are too long. The resulting data is fed to a FIFO 610 with both start of packet (SOP) and end of packet (EOP) indications. The resulting packets stored in FIFO 610 are complete TCP/IP packets that can be output onto the 100 BT LAN 220. If a packet contains a CRC error, the packet will be discarded and a packet error counter will be incremented.

The data from the FIFO 610 is provided to the input of a packet filter 615. The packet filter 615 is preferably implemented using a field programmable gate array. The packet filter 615 determines whether the data packet stored in the FIFO 610 is intended for transmission on the LAN 220 or is to be discarded. This decision is made by the packet filter 615 based on whether someone directly connected to the LAN 220 or who is remotely connected to the LAN 220 has joined the multicast group to which the packet belongs. The packet filter 615 stores valid packets into a single packet FIFO 620 that is used to buffer the packet for provision to a network interface card, such as an ethernet controller 625. The ethernet controller 625 takes the packet from the FIFO 620 and transmits it onto the LAN 220 through an ethernet transceiver and transformer using standard ethernet protocols. Such protocols include collision detection and re-transmission as well as all preamble and CRC generation needed. The output of the ethernet controller 625 is fed, using a standard media independent interface (MII) to an ethernet transceiver 630 that converts the digital packet into an ethernet analog signal. A transformer 635 is used to alter the electrical levels of this signal so that it is compatible with the LAN 220. The microcontroller 580 configures and monitors this entire process and reports status, logs faults, and communicates with external systems via the internal 10-based T backplane LAN 145. In addition to the backplane LAN 145, the transponder unit 445 can be controlled through a standard RS-232 port 637 that, for example, may be used for debugging the unit.

Preferably, the packet filter 615 is a TCP/IP filter implemented using a field programmable gate array. The primary task of the packet filter 615 is to filter all IP packets received and to pass only valid packets for which a subscriber exists on the network for the multicast transmission. Other tasks that may optionally be performed by packet filter 615 are such tasks as IP address translation (see above), notification of the microprocessor of the occurrence of any over flow errors on the channel, etc.

Figure 20:
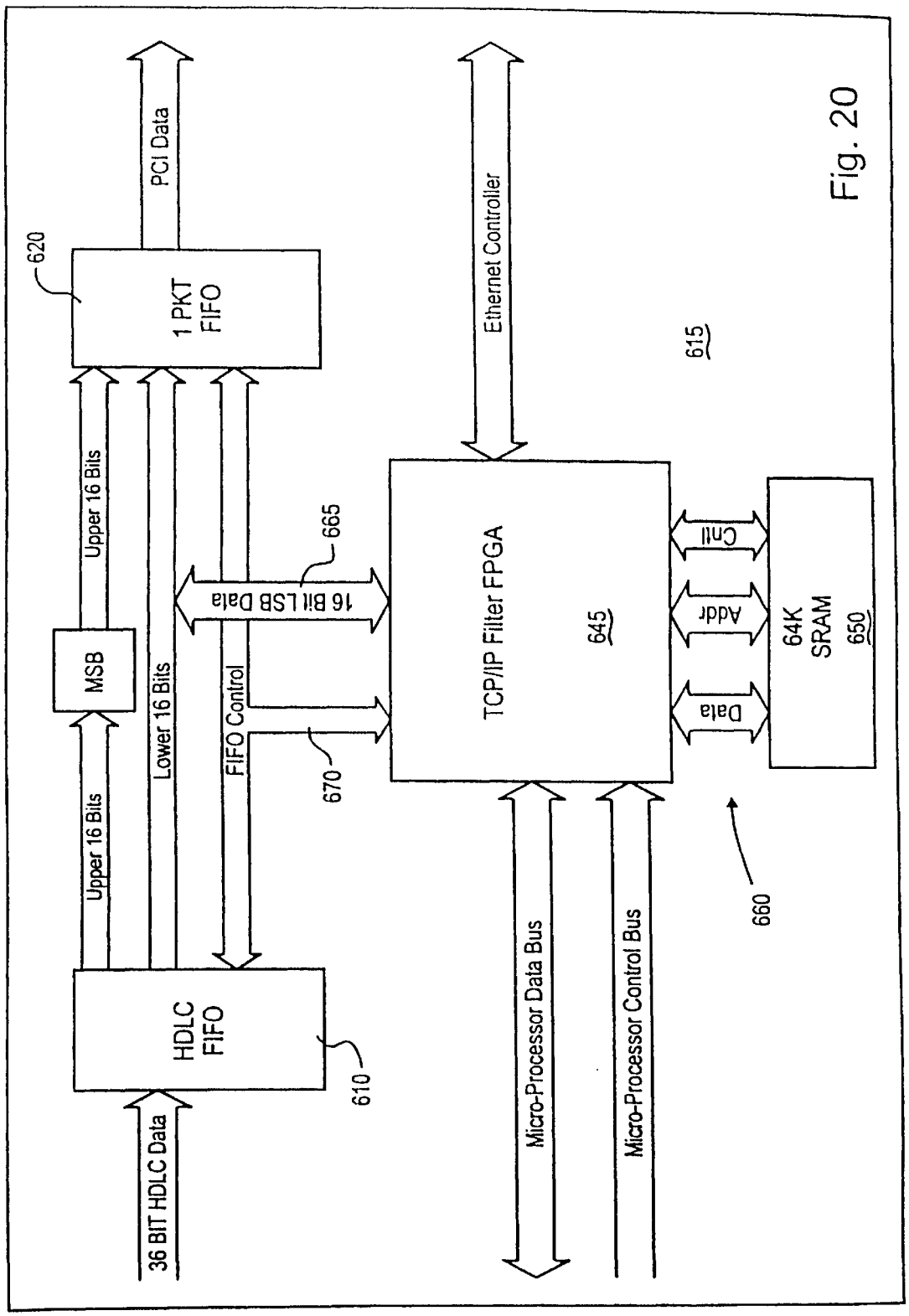
FIG. 20 illustrates one embodiment of a packet filter used in the transponder unit of FIG. 18.

FIG. 20 illustrates one embodiment of the packet filter 615 as implemented by a field programmable gate array 645 and a static RAM 650. The figure also illustrates the relationship between the packet filter 615 and other system components. The field programmable gate array may be one such as is available from XILINX, LATTICE, ALTERA, or other FPGA manufacturers.

As illustrated, the packet filter 615 includes a microprocessor interface 655 comprised of a microprocessor data bus, microprocessor address bus, and a microprocessor control bus. The microprocessor interface 655 provides an interface for programming and monitoring the status of the packet filter 615. The device supports normal bus access in addition to data transfers through the device into the one packet FIFO 610. The packet filter 615 may also issue an interrupt to the microprocessor 580 to request immediate service.

The microprocessor 580 accesses the registers of the programmable gate array 645 through the bi-directional data bus of the interface 655. Selection of which of the registers are accessed is performed by the microprocessor 580 over the address bus of the interface 655. The microprocessor 580 gains access to the registers over the control bus of the interface 655 using a RD/WR signal that is qualified with a CS signal consistent with the Motorola 860 bus architecture. Any interrupt from the packet filter 615 is also provided over the control bus.

The field programmable gate array 645 also provides an SRAM interface 660 for interfacing with SRAM 650. This interface is comprised of a data bus, an address bus, and a control bus. The gate array 645 gains access to the registers of the SRAM 650 by selecting the appropriate register over the address bus and providing a OE/WR signal qualified by a CS signal consistent with the SRAM bus architecture.

The field programmable gate array 645 provides packet flow control between the FIFO 620 and FIFO 610. This control is provided based on a FIFO interface that includes a data bus 665 and a FIFO control bus 670.

In the disclosed embodiment, the packet filter 615 is designed to store up to 64K (65,535) addresses that are used as filter addresses. The LSB (bottom 16 bits) of the 32-bit address field of a packet is compared to an addresses stored in SRAM 650. The addresses in SRAM 650 are stored based on commands received by the packet filter 615 from the microprocessor 580. These addresses correspond to multicast group addresses for which a subscriber on the system has issued a "join" command. If the address of a packet received at FIFO 610 matches a joined address stored in the SRAM 650, then the entire packet will be passed to the single packet FIFO 610 and the FPGA 645 will notify the ethernet controller 625 that the data is to be transmitted onto the LAN 220. The single packet FIFO 610 is used as temporary storage until the entire TCP/IP packet is processed and transmitted to the ethernet controller 625. If a re-transmit is needed, then the single packets FIFO 610 is reset and the data can be read again.

The packet filter 615 auto-synchronizes to the HDLC start of frame marker. This marker is read from the FIFO 620 and the ninth bit is used to signal the FPGA 645 to re-synchronize the internal state machine.

In the event that the ethernet controller 625 cannot successfully transmit the packet stored in the single packet FIFO 610, the packet filter 615 either initiates a re-transmit cycle or aborts the packet and continues with the next available packet. To make this determination, the packet filter 615 queries the FIFO 620 for a half-full status. If the FIFO 620 is more than half full, then the packet in the single packet FIFO 610 is discarded. If the FIFO 620 is more than half full, then the single packet FIFO 610 is placed in a re-transmit mode and the packet is given another chance for transmission.

The packet filter 615 may also include a pass-through mode of operation., In this mode the packet filter 615 allows the microprocessor 580 to write data into the single packet FIFO 610 for application to the ethernet controller 625 and, therefrom, for transmission on the LAN 220. This mode may be used to send test packets to the ethernet controller 625 and to the client sub-system.

The packet filter 615 may maintain several counters to allow the microprocessor 580 to detect system errors. Such counters may include a counter for demodulator block errors, a counter for packet re-transmit errors, a counter for packet abort errors, a counter for valid packet count, and a counter for valid address count. Each of these counters may be reset through commands issued from the microprocessor 580 to the packet filter 615.

The demodulator block error counter is used to count the number of block errors that are detected. This counter may be a 16 bit register that rails at 0xFFFF.

The packet re-transmit error counter stores a count of the number of packets that the packet filter 615 tried to re-transmit. If a packet is re-transmitted more than once, each attempt increments the count. This counter is preferably implemented as a 16 bit register that rails at 0xFFFF (65,535).

The packet abort error counter stores a count of the number of packet aborts that have occurred. This is the packets that were not successfully transmitted. This is a 16 bit register that rails (i.e. not cycle back to zero) at 0xFFFF (65,535).

The valid packet counter stores a count of the number of valid packets read from FIFO 620 while the valid address counter stores a count of the number of valid TCP/IP addresses received. Each of these counters is preferably implemented as a 32 bit register counter.

Table 1 describes some of the write registers that may be included in the packet filter 615 while Table 2 describes some of the read registers that may be included.

TABLE 1

WRITE REGISTERS

| REGISTER MNEMONIC | Size (bits) | Description |
|---|---|---|
| RAMADDRH | 8 | SRAM address High |
| RAMADDRL | 8 | SRAM address Low |
| RAMDATA | 5 | SRAM Data<br>Bit 0 - Filter ON/OFF<br>Bit 1 . . . 4 - Translation Address (A15 . . . A12) of the TCP/IP address. |
| CONTROLREG | 8 | Miscellaneous control register<br>Bit 0 - Micro pass-through Mode<br>Bit 1 - Address Translation ON/OFF<br>Bit 2 - unassigned<br>Bit 3 - unassigned<br>Bit 4 - unassigned<br>Bit 5 - unassigned<br>Bit 6 - unassigned<br>Bit 7 - unassigned |
| STATREG | 8 | Status Register Clear<br>Bit 0 - Clear DMERRCNT<br>Bit 1 - Clear RETXCNT<br>Bit 2 - Clear ABORTCNT<br>Bit 3 - Clear PKTCNT<br>Bit 4 - Clear ADDRCNT<br>Bit 5 - unassigned<br>Bit 6 - unassigned<br>Bit 7 - unassigned |
| MACADDR0 | 8 | Ethernet Controller Address BYTE 0 (LSB) |

TABLE 1-continued

WRITE REGISTERS

| REGISTER MNEMONIC | Size (bits) | Description |
|---|---|---|
| MACADDR1 | 8 | Ethernet Controller Address BYTE 1 |
| MACADDR2 | 8 | Ethernet Controller Address BYTE 2 |
| MACADDR3 | 8 | Ethernet Controller Address BYTE 3 |
| MACADDR4 | 8 | Ethernet Controller Address BYTE 4 |
| MACADDR5 | 8 | Ethernet Controller Address BYTE 5 (MSB) |

TABLE 2

READ REGISTERS

| REGISTER MNEMONIC | Size (bits) | Description |
|---|---|---|
| STATREG | 8 | Indicates status of packet filter<br>Bit 0 - Input OVERFLOW<br>Bit 1 - Single Packet FIFO Timeout<br>Bit 2 - Re-Transmit OVERFLOW<br>Bit 3 - unassigned<br>Bit 4 - unassigned<br>Bit 5 - unassigned |
| PKTSTAT | 16 | Last packet transmitted status |
| DMERRCNT | 16 | Demodulator Error Count |
| RETXCNT | 16 | Re-Transmit Count |
| ABORTCNT | 16 | Packets Aborted Count |
| PKTCNT | 32 | Valid Packets Count |
| ADDRCNT | 32 | Valid Address Count |

Table 3 below provides an exemplary pin-out listing for the packet filter 615.

TABLE 3

| PIN NAME(S) | SIZE (BITS) | TYPE | DESCRIPTION |
|---|---|---|---|
| MICROPROCESSOR INTERFACE | | | |
| DATA | 8 | Input/output | Microprocessor data bus |
| ADDRESS | 4 | Input | Microprocessor address bus |
| CS | 1 | Input | Microprocessor chip select |
| RW | 1 | Input | Microprocessor read/write |
| INT | 1 | Output | Microprocessor interrupt |
| FIFO 620 INTERFACE | | | |
| DATA | 8 | Input | FIFO data input |
| RD | 1 | Output | FIFO read |
| WR | 1 | Output | FIFO write |
| ERR | 1 | Input | FIFO block error |
| BCLK | 1 | Input | FIFO byte clock |
| BLKSTART | 1 | Input | FIFO start of block |
| FULL | 1 | Input | FIFO full flag |
| HALF | 1 | Input | FIFO half full flag |
| EMPTY | 1 | Input | FIFO empty flag |
| SRAM INTERFACE | | | |
| ADDRESS | 16 | O | SRAM address |
| DATA | 8 | I/O | SRAM data |
| RW | 1 | Output | SRAM read/write |
| OE | 1 | Input | SRAM output enable |
| SINGLE PACKET FIFO INTERFACE | | | |
| DATA | 9 | Output | FIFO data |
| RD | 1 | Output | FIFO read |
| WR | 1 | Output | FIFO write |
| RST | 1 | Output | FIFO reset |

TABLE 3-continued

| PIN NAME(S) | SIZE (BITS) | TYPE | DESCRIPTION |
|---|---|---|---|
| FULL | 1 | Input | FIFO full flag |
| EMPTY | 1 | Input | FIFO empty flag |

As noted above, the packet filter 615 may allow each filtered address to be translated into another IP address. Translation is preferably only allowed on the upper nibble of the LSB (A15, A14, A13, and A12). The translation bits will be downloaded along with the address filter information. Still further, the packet filter 615 preferably uses an FPGA 645 that is capable of being modified by the microprocessor 580. In such instances, the FPGA technology of the FPGA 645 should be chosen to allow local re-programming of the FPGA fuse map.

The FPGA 645 preferably processes at least one megawords per second (32 bits per word). If the FPGA 645 is run at 10 MHz, then 10 internal cycles can be used in a state machine per word received.

A shutdown relay or other type of physical device may be employed to shut the 100 based T LAN output off. This may be controlled by the microprocessor 580 and is preferably tied, via backplane communications, to the Panic Button on a front panel of the system. This relay is not shown in the figures.

The transponder unit 445 of the disclosed embodiment processes a 10 B baseT ethernet connection that necessitates a TCP/IP protocol stack. This stack requirement makes it preferable to use a DRAM in the transponder unit 445. The stack requirement drives the DRAM memory requirements of the unit 445. The DRAM should be large enough to support the software (the code will be downloaded into DRAM using a TFTP boot), the RAM variables, and the protocol stacks.

The transponder unit 445 also preferably includes a battery backed RAM that maintains a small trace buffer, factory test results, and the card's serial number. The non-volatile memory is preferably organized into two identical blocks which are both, individually, subject to CRC checks. Such checks ensure that if a write process is being performed and the power is removed, damaging the integrity of the block, a second backup image of the non-volatile memory will still be intact.

Each transponder unit 445 preferably includes a test LED, a fault LED, a carrier sync LED, a LAN activity LED, and a LAN collision LED. The test LED is on whenever the unit is performing a test function, including its power up test. The fault LED will be on whenever a major fault has occurred. The carrier sync LED is activated on whenever the RF signal received by the transponder unit 445 is being correctly demodulated and the data is error free. The LAN activity LED is activated on whenever the transponder unit 445 is actively outputting a multicast stream onto the 100 based-T LAN. The LAN collision LED indicates a collision has occurred on the 100 based-T LAN.

TRANSPONDER UNIT SOFTWARE OPERATION

The transponder unit 445 is preferably controlled by an embedded software application. The software is responsible for configuring the hardware of the transponder unit 445, monitoring all activity of the transponder unit 445, and processing any backplane communications. The following sections describe the various interfaces and tasks that the software supports.

1. Operating System

The underlying real time operating system (RTOS) is preferably VxWorks. VxWorks has been used in embedded processor designs for over 18 years and provides a pre-emptive operating environment with an integrated protocol stack and other types of networking support.

2. Backplane Host Interface

The host interface over the backplane is implemented on a 10 based-T ethernet LAN 145 and the LAN protocol is TCP/IP. All commands that are issued over the backplane LAN 145 are processed identically to commands received over the RS-232 serial interface 487. The controller unit 440 transmits commands to the transponder unit 445 over this interface. Still further, the controller unit 440 passes commands from the NOC 472 to the transponder unit 445. In order, to support this interface, the operating system's standard networking protocols are used.

3. RS-232 Serial Command Interface

The serial port 637 is used to provide a diagnostic port that can be used to send commands to the transponder unit 445. The serial port software processes commands identically to the backplane host interface.

4. Command Processor

The command-processing task parses incoming commands and executes any actions specified by the command. The following sections describe some of the commands that the transponder unit 445 supports.

A. Add Group

The Add Group command allows the controller unit 440 to enable a group address to be passed through to the 100 based-T LAN 220. When this command is executed, the microcontroller 640 enables the group's address within the lookup table in the SRAM 650.

B. Delete Group

The Delete Group command allows the transponder unit 445 to disable a group address that is currently being passed through to the 100 based-T LAN 220. When this command is executed, the microcontroller 655 disables the group's address within the lookup table in the SRAM 650.

C. Address Route

The Address Route command is used to change the default IGMP address of a particular service or block of services. As described previously, the entire address block allocated to the video from the satellite can be moved or individual channel addresses can be moved. The transponder unit 445 is programmed with an address map and programs the FPGA 650 accordingly.

D. LAN Shutoff

The LAN shutoff command activates a relay on the output to the 100 based-T LAN 220. The controller unit 440 issues this command when the Panic Button has been pressed.

E. RS-232 Port

The RS-232 Port command is used to change the communication port parameters. These parameters include the baud rate, parity bit, stop bit, and number of data bit settings for the port.

F. Boot

A TFTP process, initiated by the operating system of the transponder unit 445 will handle the boot process. This process is handled over the backplane LAN 145.

G. Status and Fault

The current status and fault histories can be queried through the Status and Fault commands. These commands are accessed by the controller unit 440, the NOC 472, and through the RS-232 port 675 to determine the status and fault histories of the transponder unit 445.

H. Trace

Similar to the trace command on the controller unit 440, the trace command of the transponder unit 445 can be used to configure (start, stop, or reset) the trace buffer, or it can be used to query the contents of a trace buffer. The trace buffer on the transponder unit 445 may be implemented to be much smaller than the trace buffer of the controller unit 440 so the controller unit 440 accesses data from the trace buffer of the transponder unit 445 periodically, resetting the trace after the query is complete.

I. Set Carrier

The Set Carrier command is used to set the L-Band frequency and data rate of the demodulator 555. Once this command has been issued, the transponder unit 445 begins its acquisition process.

J. Scrambler Bypass

The Scrambler Bypass command allows the transponder unit 445 to pass data through the system that has not been scrambled at the head end. This mode is used during development, testing, and may be used in operation.

K. Reset

The Reset command allows an external source, such as the controller unit 440, the NOC 472, or a terminal attached to the RS-232 port to initiate a soft reset on the transponder unit 445.

L. ID Query

Each transponder unit 445 will have a unique serial number associated with it. The serial number will be stored in non-volatile memory. The ID Query command is used to either query or set the serial number. When setting the serial number, the command is preferably sufficiently scrambled to prevent the serial number from being inadvertently programmed to an incorrect value.

M. Memory Read and Memory Write

The Memory Read and Memory Write commands are used primarily for development and allows any hardware register or memory location to be manipulated manually. This includes being able to toggle LED's, update the seven-segment LED, or other I/O based activities.

N. Test Mode

The Test Mode command provides a means of putting various components of the transponder unit 445 into test modes. For example, one test mode generates test packets onto the 100 based-T output LAN. These packets include a packet counter which can be used by a client application to determine if the link is experiencing dropped packets. This command may also be used during board level testing with the results of the production tests stored in non-volatile memory.

The transponder unit 445 is also provided with a number of diagnostic functions that support both power up and long-term diagnostic functions. On power up, all hardware subsystems are tested including the DRAM, the non-volatile memory, communications with the demodulator, and backplane ethernet connectivity. Long term diagnostic functions include validating the code space (CRC check of the code space), validating the non-volatile memory, and validating backplane connectivity.

On powering up, the operating system of the transponder unit 445 boots from its core from EPROM. After this, the transponder unit 445 requests its current version of firmware from the controller unit 440 using a Trivial File Transfer Protocol (TFTP). This method of booting the transponder unit 445 ensures that all transponder units in the IPMS chassis are running the same version of software. The operating system, as noted above, supports this type of boot procedure. Once the code has been downloaded, the code begins executing.

The transponder unit 445 also includes a status and fault monitoring task that keeps track of the current status as well as a fault history value that indicates all of the faults that have occurred since the last time the fault history was cleared. When the status of the transponder unit 445 changes, a trace event is logged into the non-volatile memory of the transponder unit 445 and the controller unit 440 is notified that the transponder unit 445 has at least one event saved in its non-volatile memory. Since the controller unit 440 preferably maintains a much larger trace buffer than the transponder unit 445, the controller unit 440 is responsible for pulling data out of the log of the transponder unit 445 prior to overflow thereof.

The transponder unit 445 also includes an internal watchdog timer. If the internal watchdog timer has expired, the transponder unit 445 assumes that its internal software has reached an unstable condition. As such, the transponder unit 445 will shutdown all current tasks and then reset. The reset re-initializes the transponder unit 445 and begins a re-boot procedure. The transponder unit 445 will preferably log this event in non-volatile memory. The controller unit 440 recognizes this condition, logs an error, and re-configures the transponder unit 445.

The transponder unit 445 shuts down the outgoing IGMP streams after the backplane LAN 145 becomes inoperable for a specified period of time. If the backplane LAN 145 has become inoperable, the transponder unit 445 assumes that the controller unit 440 has ceased operation. Since the controller unit 440 is responsible for all of the protocol communication of the IPMS 120 with external devices, the transponder unit 445 assumes that the controller unit 440 can no longer receive "leave" requests from clients. In order to prevent "bombarding" the client with potentially unwanted data, the transponder unit 445 will shutdown all outgoing streams. Once backplane LAN 145 communications are restored, the transponder unit 445 will request its current channel mapping and begin transmitting again. The transponder unit 445 logs this event in non-volatile memory.

Each transponder unit 445 is preferably implemented on a single printed circuit card having the ability to be "hot swapped". In order for this to be implemented, the connectors between the printed circuit card and its corresponding backplane connector include longer pins for the power and ground signals such that the transponder unit on the printed circuit board has power applied to it before output signals reach the connectors of the backplane bus.

A "hot sparing" system can also be employed. In such instances, one or more spare transponder units are included in the IPMS 120 chassis. The spare transponder units can be configured to take over for failed transponder units. This configuration procedure will be handled by the controller unit via the backplane LAN 145.

The IPMS 120 may have several means of helping an installer point the antenna. To this end, each transponder unit 445 provides an AGC indication that provides a means of identifying when the satellite signal is maximized. This indication alone will not necessarily provide the best signal, however, due to different types of interference (adjacent satellite, cross-pole, etc.). Many times the interference should be minimized instead of the signal level being maximized. To aid in this type of decision making, each transponder unit 445 will provide an Eb/No reading that indicates the quality of the incoming signal. This measurement should be maximized. The values of these parameters will be passed to the controller unit 440. which can present them in a user-friendly manner to the installer. This data may also be available through the serial port 637 of the transponder unit 445.

As also illustrated in FIG. 18, the transponder unit 445 also includes a 10 baseT connection to the controller unit. This interface includes an ethernet transceiver 672 and transformer 673. It should be furthered noted that substantially all of the principal units of the transponder unit 445 communicate with microprocessor 580 over a communications bus.

FIGS. 21–26 illustrate various ISP configurations and scenarios using the IPMS 120 of the present invention. In each scenario, an IP Multicast system application delivers IP multicast streams to Internet Service Providers' (ISPs) clients. The stream content is received, for example, over a satellite by the IPMS which is directly attached to an ISP's local backbone. The stream flows over the local backbone and through the ISP's networking equipment to the client's desktop browser as shown, for example, at arrow 680 of FIG. 21.

There are a number of goals for each of the following ISP configurations and scenarios. They include:

Delivering streams to clients on demand, and quickly removing these streams from the ISP backbone when the client is finished;

Delivering streams to clients while minimizing the traffic on the local backbone of the ISP;

Delivering streams to clients while minimizing additional traffic to other clients; and Delivering streams to clients while not introducing any additional traffic to the Internet.

Achieving these goals requires that the networking equipment utilized in the system support various protocol interactions (e.g. IP, IGMP, PIM).

ISP MODEL 1—SIMPLE ISP (SIMPLE IPMS 120)

Figure 21:
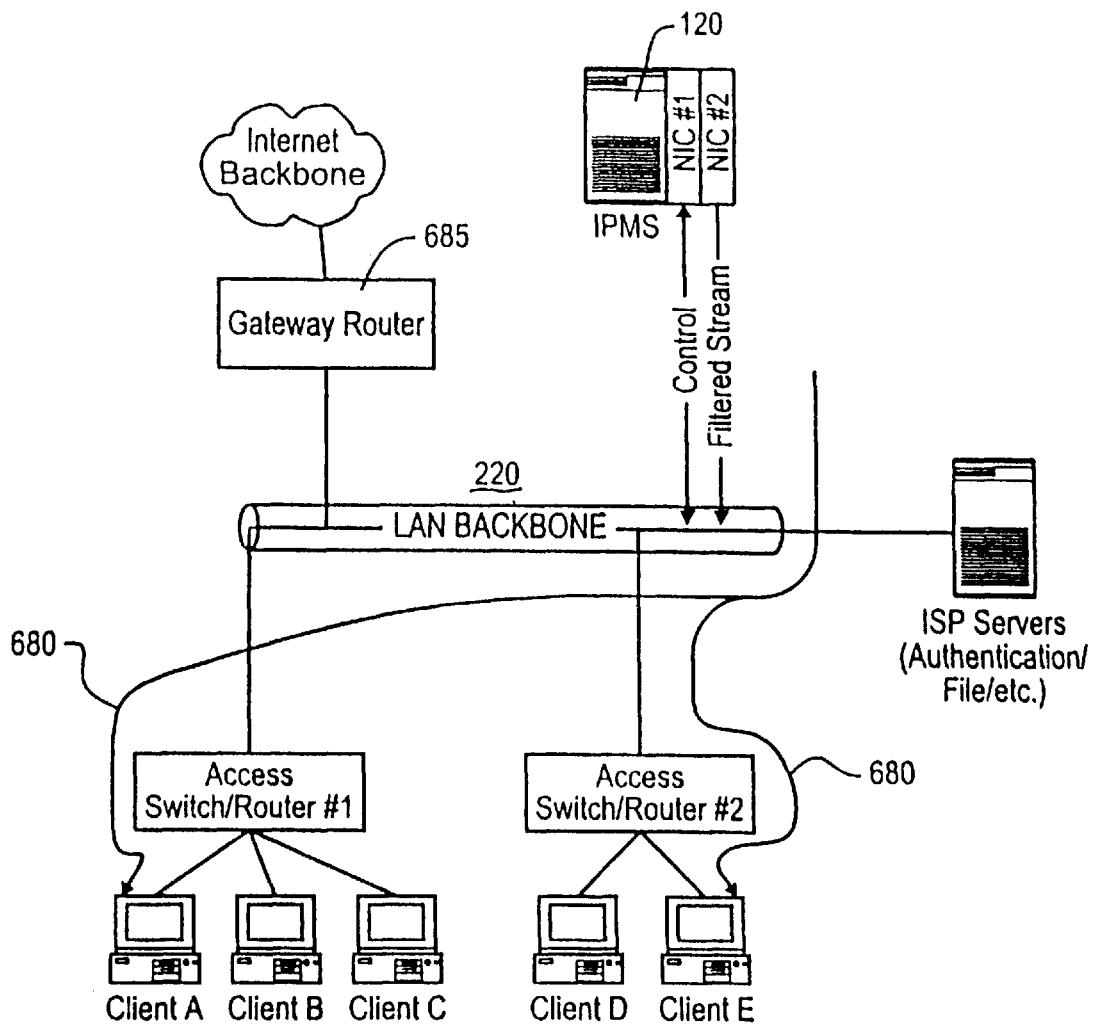
FIGS. 21–26 illustrate various configurations for networks using an IPMS constructed in accordance with the present invention.

ISP MODEL 1 is illustrated in FIG. 21. In this example, Client A joins, receives, and leaves Multicast Group 239.216.63.248 from the IPMS 120. Next, Client A joins and receives Multicast Group 239.216.0.8. Then, network elements query the group so that multicast traffic can be pruned in the event group members silently leave the group. Finally, Client A leaves Multicast Group 239.216.0.8.

The IPMS 120 filters the multicast stream so that only multicast addresses which are currently "joined" will be placed on the ISP LAN backbone 220. There are several assumptions associated with scenario, they are:

IPMS 120 IP Address=128.0.0.255, Client A IP Address=128.0.0.1;

All IP Multicast Addresses provided by the IPMS 120 are "Administratively Scoped" addresses in the range 239.216.0.0 through 239.219.255.255 (addresses 239.216.0.8 and 239.216.63.248 used in this example); and IPMS 120, Access Switch/Routers #1 and #2, and Gateway Router 685 support IGMP V2.

During initial handshake, the following occurs:

1. Client A sends an IGMP V2 Membership Report (Destination IP address=239.216.63.248, Group address=239.216.63.248);
2. Access Switch/Router #1 forwards IGMP V2 Membership Report to backbone LAN 220 (assuming it has no other interfaces in Group address=239.216.63.248);
3. Gateway Router does not forward "Administratively Scoped" membership report to the internet;
4. IPMS 120 receives IGMP V2 Membership Report and transmits 239.216.63.248 multicast onto Filtered Stream—the data payload of the 239.216.63.248 multicast includes the IPMS IP Address, and a test pattern;
5. Access Switch/Router #1 forwards 239.216.63.248 multicast to Client A only;
6. Gateway Router ignores 239.216.63.248 multicast as an administratively scoped address;
7. Client A receives IPMS IP Address and test pattern and then sends an IGMP Leave Group (Destination IP address=224.0.0.2, Group address=239.216.63.248);
8. Access Switch/Router #1 verifies it has no other interfaces in Group address=239.216.63.248 (using IGMP Query), forwards IGMP Leave Group to LAN backbone 220, and immediately stops forwarding the 239.216.63.248 multicast to Client A;
9. Gateway Router 685 ignores IGMP Leave Group command; and
10. IPMS 120 receives IGMP Leave Group, verifies it has no other clients in Group address=239.216.63.248 (using IGMP Query), and immediately stops transmission of the 239.216.63.248 multicast data.

When Client A joins Multicast Group 239.216.0.8, the following occurs:

11. Client A sends an IGMP V2 Membership Report (Destination IP address=239.216.0.8, Group address=239.216.0.8);
12. Access Switch/Router #1 forwards IGMP V2 Membership Report to LAN backbone 220 (assuming it has no other interfaces in Group address=239.216.0.8);
13. Gateway Router ignores IGMP V2 Membership Report for "Administratively Scoped" address;
14. IPMS 120 receives IGMP V2 Membership Report and transmits 239.216.0.8 multicast onto Filtered Stream;
15. Access Switch/Router #1 forwards 239.216.0.8 multicast to Client A only;
16. Gateway Router ignores 239.216.0.8 multicast as an administratively scoped address;
17. Client A receives 239.216.0.8 multicast.

In order to ensure that Client A has not silently left the multicast group, the system implements a querying of the Multicast Group 239.216.0.8 based on query timers configured in the access switch/router and IPMS 120. This query proceeds in the following manner:

18. Access Switch/Router #1 sends IGMP Group-Specific Query (Destination IP address=239.216.0.8, Group address=239.216.0.8) to Client A;
19. If Access Switch/Router #1 receives an IGMP V2 Membership Report (Destination IP address=239.216.0.8, Group address=239.216.0.8), do nothing;
20. If there is no Membership Report then Access Switch/Router #1 sends IGMP Leave Group (Destination IP address=224.0.0.2, Group address=239.216.0.8) to the LAN backbone 220 and immediately stops forwarding the 239.216.0.8 multicast to all clients (including Client A); system operation then proceeds with Step 26 below.

The following steps occur independently:

21. IPMS 120 sends IGMP Group-Specific Query (Destination IP address=239.216.0.8, Group address=239.216.0.8);
22. If IPMS 120 receives an IGMP V2 Membership Report (Destination IP Address=239.216.0.8, Group Address=239.216.0.8) do nothing;
23. If there is no Membership Report then IPMS 120 immediately stops transmission of 239.216.0.8 multicast (group left due to no response);

The following sequence of events occur when Client A leaves the Multicast Group 239.216.0.8:

24. Client A sends an IGMP Leave Group(Destination IP Address=224.0.0.2, Group Address=239.216.0.8);
25. Access Switch/Router #1 receives IGMP Leave Group, verifies it has no other interfaces in Group Address=239.216.0.8 (using IGMP Query), forwards IGMP Leave Group to LAN backbone 220, and immediately stops forwarding the 239.216.0.8 multicast to Client A;
26. Gateway Router ignores IGMP Leave Group command since it involves an administratively scoped address;
27. IPMS 120 receives IGMP Leave Group, verifies it has no other Clients in Group Address=239.216.0.8 (using IGMP Query), and immediately stops transmission of 239.216.0.8 multicast.

ISP MODEL 2—ISP WITH MULTIPLE LAN SEGMENTS/MULTICAST STREAMS SEGMENTED

Figure 22:
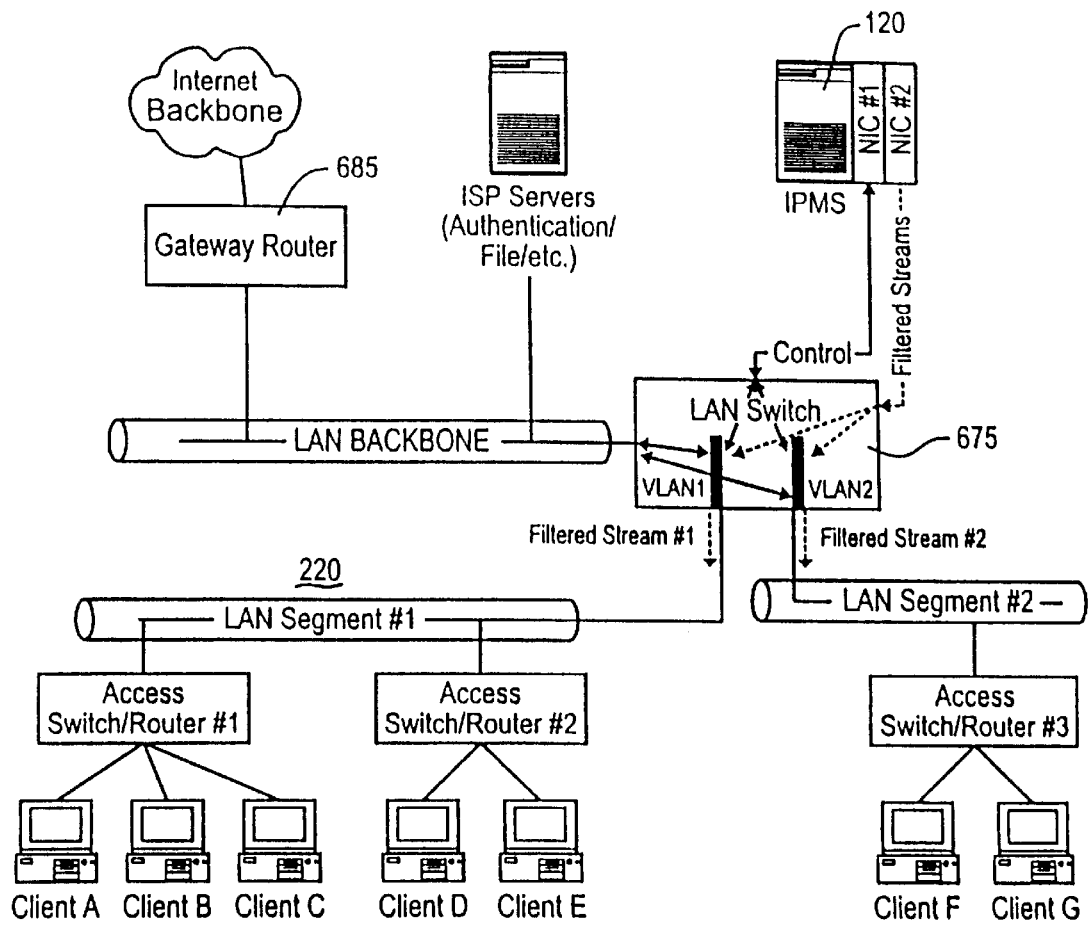

In the example shown in FIG. 22, Client A joins, receives, and leaves Multicast Group 239.216.63.248 to receive a brief multicast from the IPMS 120. Next, Client A joins and receives Multicast Group 239.216.0.8. Then, network elements query the group so that multicast traffic can be pruned in the event group members silently leave the group. Finally, Client A leaves Multicast Group 239.216.0.8.

The Simple IPMS 120 filters the Multicast Stream so that only Multicast Addresses which are currently "joined" will be sent to the LAN Switch. The LAN Switch filters the Multicast Stream sent to each segment so that only Multicast Addresses which are currently "joined" by Clients on a segment will be placed on that segment.

There are several assumptions associated with the illustrated scenario. They are:

IPMS 120 IP Address=128.0.0.255, Client A IP Address=128.0.0.1;

All IP Multicast Addresses transmitted by the IPMS 120 are "Administratively Scoped" addresses in the range 239.216.0.0 through 239.219.255.255 (addresses 239.216.0.8 and 239.216.63.248 used in this example);

Access Switch/Router, LAN Switch, and IPMS 120 support IGMP V2;

LAN Switch configuration:
  Virtual LAN#1=LAN Segment #1, Backbone, IPMS 120 Control, Filtered Stream#1
  Virtual LAN#2=LAN Segment #2, Backbone, IPMS 120 Control, Filtered Stream#2

Gateway Router 690 does not forward IGMP messages with "Administratively Scoped" Multicast addresses (this includes messages with Dest IP=239.*.*.*, and IGMP messages with Dest IP=224.0.0.1/224.0.0.2 that specify a Group Address=239.*.*.* ).

During initial handshake, the following occurs:
1. Client A sends an IGMP V2 Membership Report (Destination IP Address=239.216.63.248, Group Address=239.216.63.248);
2. Access Switch/Router #1 forwards IGMP V2 Membership Report to LAN Segment #1 (assuming it has no other interfaces in Group Address=239.216.63.248);
3. LAN Switch receives IGMP V2 Membership Report, forwards the message, and enables transmission of 239.216.63.248 multicast to LAN Segment #1;
4. Gateway Router does not forward "Administratively Scoped" membership report to the internet;
5. IPMS 120 receives IGMP V2 Membership Report and transmits 239.216.63.248 multicast out NIC#2 onto Filtered Stream—the data payload of the 239.216.63.248 multicast includes the IPMS 120 IP Address, and a test pattern;
6. LAN Switch forwards 239.216.63.248 multicast to LAN Segment #1 only;
7. Access Switch/Router #1 forwards 239.216.63.248 multicast to Client A only
8. Client A receives IPMS 120 IP Address and test pattern and then sends an IGMP Leave Group(Destination IP Address=224.0.0.2, Group Address=239.216.63.248);
9. Access Switch/Router #1 receives IGMP Leave Group, verifies it has no other interfaces in Group Address=239.216.63.248 (using IGMP Query), forwards IGMP Leave Group to LAN Segment #1 and immediately stops forwarding the 239.216.63.248 multicast to Client A;
10. LAN Switch receives IGMP Leave Group, forwards the message, verifies it has no other LAN Segment #1 Clients in Group Address=239.216.63.248 (using IGMP Query), and immediately stops transmission of 239.216.63.248 multicast to LAN Segment #1;
11. Gateway Router ignores IGMP Leave Group since it is an administratively scoped address;
12. IPMS 120 receives IGMP Leave Group, verifies it has no other client in Group Address=239.216.63.248 (using IGMP Query), and immediately stops transmission of the 239.216.63.248 multicast.

When Client A joins the Multicast Group 239.216.0.8, the following operations occur:
13. Client A sends an IGMP V2 Membership Report (Destination IP Address=239.216.0.8, Group Address=239.216.0.8);
14. Access Switch/Router #1 forwards IGMP V2 Membership Report to LAN Segment #1 (assuming it has no other interfaces in Group Address=239.216.63.248);
15. LAN Switch receives IGMP V2 Membership Report, forwards the message, and enables transmission of 239.216.0.8 multicast to LAN Segment #1;
16. Gateway Router ignores IGMP Leave Group since it is an administratively scoped address;
17. IPMS 120 receives IGMP V2 Membership Report and transmits 239.216.0.8 multicast out NIC#2 onto Filtered Stream;
18. LAN Switch forwards 239.216.0.8 multicast to LAN Segment #1 only;
19. Access Switch/Router #1 forwards 239.216.0.8 multicast to Client A only;
20. Client A receives 239.216.0.8 multicast.

In order to ensure that Client A has not silently left the multicast group, the system implements a querying of the Multicast Group 239.216.0.8 based on query timers configured in the access switch/router and IPMS 120. This query proceeds in the following manner:
21. Access Switch/Router #1 sends IGMP Group-Specific Query (Destination IP Address=239.216.0.8, Group Address=239.216.0.8) to Client A;
22. If Access Switch/Router #1 receives an IGMP V2 Membership Report(Destination IP Address=239.216.0.8, Group Address=239.216.0.8), do nothing;
23. If there is no Membership Report then Access Switch/Router #1 sends IGMP Leave Group(Destination IP Address=224.0.0.2, Group Address=239.216.0.8) to LAN Segment #1 and immediately stops forwarding the 239.216.0.8 multicast to all clients (including Client A);

operations then proceed at Step 32.

The following steps occur independently:

24. LAN Switch sends IGMP Group-Specific Query (Destination IP Address=239.216.0.8, Group Address=239.216.0.8) to LAN Segment #1;
25. If LAN Switch receives IGMP V2 Membership Report (Destination IP Address=239.216.0.8, Group Address=239.216.0.8) do nothing;
26. If there is no Membership Report then LAN Switch sends IGMP Leave Group (Destination IP Address=224.0.0.2, Group Address=239.216.0.8) to IPMS 120 and immediately stops transmission of 239.216.0.8 multicast to LAN Segment #1 (group is left due to no response).
27. IPMS 120 sends IGMP Group-Specific Query (Destination IP Address=239.216.0.8, Group Address=239.216.0.8);
28. If IPMS 120 receives IGMP V2 Membership Report (Destination IP Address=239.216.0.8, Group Address=239.216.0.8), do nothing;
29. If there is no Membership Report then IPMS 120 immediately stops transmission of 239.216.0.8 multicast (group left due to no response).

The following sequence of events occur when Client A leaves the Multicast Group 239.216.0.8:

30. Client A sends an IGMP Leave Group (Destination IP Address=224.0.0.2, Group Address=239.216.0.8);
31. Access Switch/Router #1 receives IGMP Leave Group, verifies it has no other interfaces in Group Address=239.216.0.8 (using IGMP Query), and forwards IGMP Leave Group to LAN Segment #1 and immediately stops forwarding the 239.216.0.8 multicast to Client A;
32. LAN Switch receives IGMP Leave Group, forwards the message, verifies it has no other LAN Segment #1 Clients in Group Address=239.216.0.8 (using IGMP Query), and immediately stops transmission of 239.216.0.8 multicast to LAN Segment #1;
33. Gateway Router ignores IGMP Leave Group since it is an administratively scoped address;
34. IPMS 120 receives IGMP Leave Group, verifies it has no other Clients in Group Address=239.216.0.8 (using IGMP Query), and immediately stops transmission of 239.216.0.8 multicast.

ISP MODEL 3—LARGE ISP WITH AFFILIATED ISP

Figure 23:
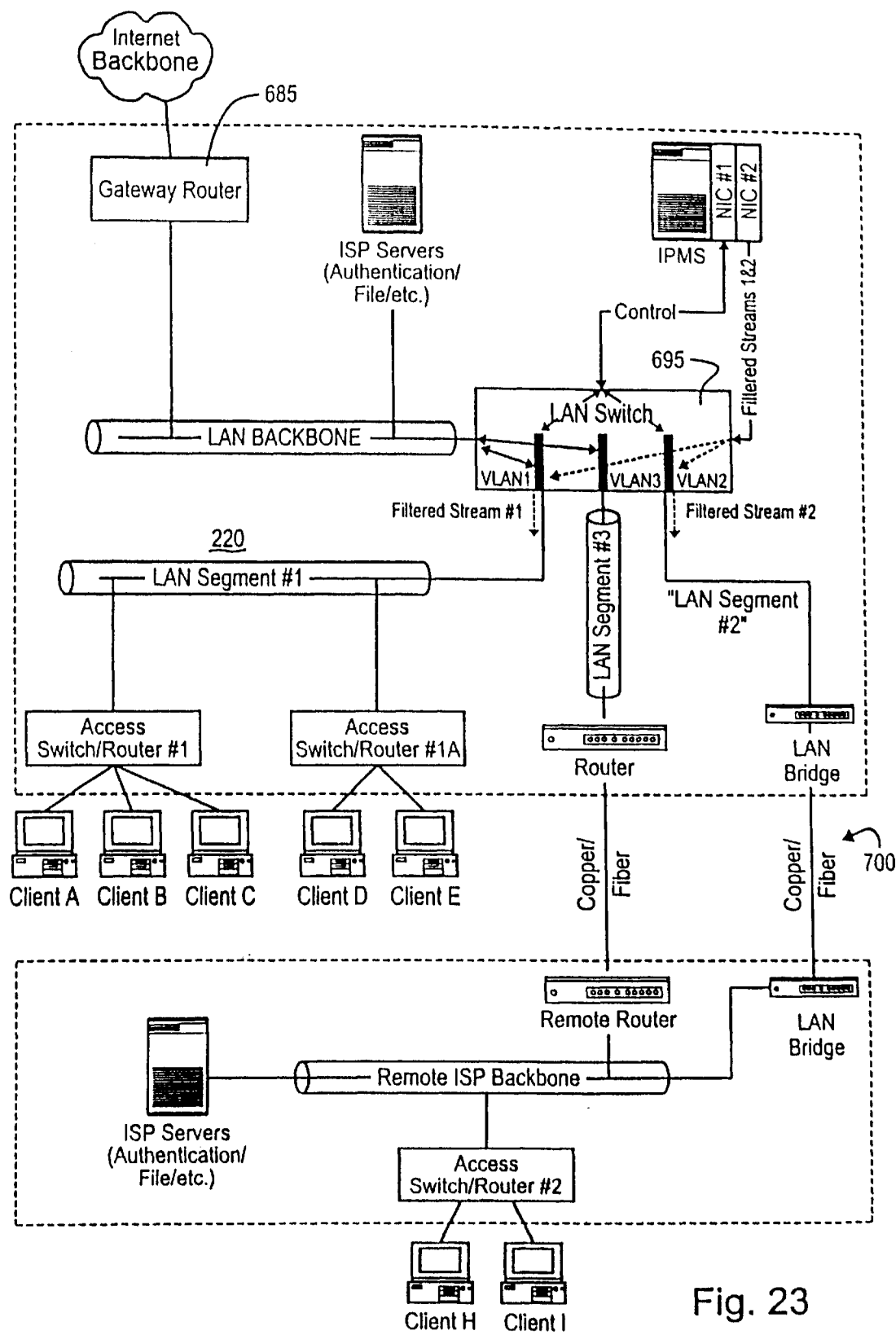

The system of FIG. 23 provides multicast streams to all ISP Clients and Remote ISP Clients on demand. In this example, Remote ISP Client H joins, receives. and leaves Group 239.216.63.248 to receive a brief multicast from the IPMS 120. Next, Client H joins and receives Multicast Group 239.216.0.8. Then, network elements query the group so that multicast traffic can be pruned in the event group members silently leave the group. Finally. Client H leaves Multicast Group 239.216.0.8.

The Simple IPMS 120 filters the Multicast Stream so that only multicast addresses that are currently "joined" will be sent to the LAN Switch 695. The LAN Switch 695 filters the multicast stream sent to each segment so that only multicast addresses which are currently "joined" by clients on a LAN segment will be placed on the LAN segment. For the Remote ISP, the multicast streams do not use bandwidth on the Router link to the ISP (to avoid impacting normal Internet traffic). Accordingly, a bridged connection 700 is used to send the streams to the Remote ISP. The only segments that receive the multicast streams are LAN Segment #1 and the bridged connection 700 to the Remote ISP that is considered to be LAN Segment #2.

There are several assumptions associated with the illustrated scenario. They are:

IPMS 120 IP Address=128.0.0.255, Client H IP Address=128.0.0.8;

All IP Multicast Addresses transmitted by the IPMS 120 are "Administratively Scoped" addresses in the range 239.216.0.0 through 239.219.255.255 (addresses 239.216.0.8 and 239.216.63.248 used in this example);

Access Switch/Routers, LAN Switches, and IPMS 120 support IGMP V2

LAN Switch configuration:
Virtual LAN#1=LAN Segment #1, Backbone, IPMS 120 Control, Filtered Stream#1;
Virtual LAN#2=LAN Segment #2, IPMS 120 Control, Filtered Stream#2; and
Virtual LAN#3=LAN Segment #3, Backbone.

LAN Bridge configuration: Only forward 239.216.0.0–239.219.255.255; 224.0.0.1, 224.0.0.2;

Remote Router does not forward IGMP messages with "Administratively Scoped" Multicast addresses (this includes messages with Destination IP=239.*.*.*, and IGMP messages with Destination IP=224.0.0.1/224.0.0.2 that specify a Group Address=239.*.*.* ).

During initial handshake, the following occurs:

1. Client H sends an IGMP V2 Membership Report (Destination IP Address=239.216.63.248, Group Address=239.216.63.248);
2. Access Switch/Router #2 forwards IGMP V2 Membership Report to Remote Backbone (assuming it has no other interfaces in Group Address=239.216.63.248) seminal
3. LAN Bridge forwards IGMP V2 Membership Report;
4. Remote Router ignores IGMP V2 Membership Report as an administratively scoped address;
5. LAN Switch receives IGMP V2 Membership Report, forwards the message, and enables transmission of 239.216.63.248 multicast to LAN Segment #2;
6. IPMS 120 receives IGMP V2 Membership Report and transmits 239.216.63.248 multicast out NIC#2 onto Filtered Stream—the data payload of the 239.216.63.248 multicast includes the IPMS 120 IP Address, and a test pattern;
7. LAN Switch forwards 239.216.63.248 multicast to LAN Segment #2 only;
8. LAN Bridge forwards the 239.216.63.248 multicast data;
9. Access Switch/Router #2 forwards 239.216.63.248 multicast to Client H only;
10. Remote Router ignores 239.216.63.248 multicast data;
11. Client H receives IPMS 120 IP Address and test pattern and then sends an IGMP Leave Group (Destination IP Address=224.0.0.2, Group Address=239.216.63.248);
12. Access Switch/Router #2 receives IGMP Leave Group, verifies it has no other interfaces in Group Address=239.216.63.248 (using IGMP Query). forwards IGMP Leave Group to LAN Bridge, and immediately stops forwarding the 239.216.63.248 multicast to Client H;
13. LAN Bridge forwards IGMP Leave Group;
14. Remote Router ignores IGMP Leave Group as an administratively scoped address;

15. LAN Switch receives IGMP Leave Group, forwards the message, verifies it has no other LAN Segment #2 Clients in Group Address=239.216.63.248 (using IGMP Query), and immediately stops transmission of 239.216.63.248 multicast to LAN Segment #2;
16. IPMS 120 receives IGMP Leave Group, verifies it has no other Clients in Group Address=239.216.63.248 (using IGMP Query), and immediately stops transmission of the 239.216.63.248 multicast;

When Client H joins the Multicast Group 239.216.0.8, the following actions occur:

17. Client H sends an IGMP V2 Membership Report (Destination IP Address=239.216.0.8, Group Address=239.216.0.8);
18. Access Switch/Router #2 forwards IGMP V2 Membership Report to Remote Backbone (assuming it has no other interfaces in Group Address=239.216.0.8);
19. LAN Bridge forwards IGMP V2 Membership Report;
20. Remote Router ignores IGMP V2 Membership Report as an administratively scoped address;
21. LAN Switch receives IGMP V2 Membership Report, forwards the message, and enables transmission of 239.216.0.8 multicast to LAN Segment #2;
22. IPMS 120 receives IGMP V2 Membership Report and transmits 239.216.0.8 multicast out NIC #2 onto Filtered Stream;
23. LAN Switch forwards 239.216.0.8 multicast to LAN Segment #2 only;
24. LAN Bridge forwards the 239.216.0.8 multicast;
25. Access Switch/Router #2 forwards 239.216.0.8 multicast to Client H only;
26. Remote Router ignores 239.216.0.8 multicast;
27. Client H receives 239.216.0.8 multicast.

In order to ensure that Client H has not silently left the multicast group, the system implements a querying of the Multicast Group 239.216.0.8 based on query timers configured in the access switch/router and IPMS 120. This query proceeds in the following manner:

28. Access Switch/Router #2 sends IGMP Group-Specific Query (Destination IP Address=239.216.0.8, Group Address=239.216.0.8) to Client H;
29. If Access Switch/Router #2 receives an IGMP V2 Membership Report (Destination IP Address=239.216.0.8, Group Address=239.216.0.8), do nothing;
30. If there is no Membership Report then Access Switch/Router #2 sends IGMP Leave Group (Destination IP Address=224.0.0.2, Group Address=239.216.0.8) to Remote Backbone and immediately stops forwarding the 239.216.0.8 multicast to Client H; operations then proceed to Step 40.

The following steps occur independently:

31. LAN Switch sends IGMP Group-Specific Query (Destination IP Address=239.216.0.8, Group Address=239.216.0.8) to LAN Segment #2;
32. LAN Bridge forwards IGMP Group-Specific Query;
33. If LAN Switch receives an IGMP V2 Membership Report (Destination IP Address=239.216.0.8, Group Address=239.216.0.8), do nothing;
34. If there is no Membership Report then LAN Switch immediately stops transmission of 239.216.0.8 multicast to LAN Segment #2 (group is left due to no response);
35. IPMS 120 sends IGMP Group-Specific Query (Destination IP Address=239.216.0.8, Group Address=239.216.0.8)
36. If IPMS 120 receives IGMP V2 Membership Report (Destination IP Address=239.216.0.8, Group Address=239.216.0.8), do nothing;
37. If there is no Membership Report then IPMS 120 immediately stops transmission of 239.216.0.8 multicast (group left due to no response).

The following sequence of operations occur when Client H leaves Group Address=239.216.0.8.

38. Client H sends an IGMP Leave Group (Destination IP Address=224.0.0.2, Group Address=239.216.0.8);
39. Access Switch/Router #2 receives IGMP Leave Group, verifies it has no other interfaces in Group Address=239.216.0.8 (using IGMP Query), and forwards IGMP Leave Group to Remote Backbone and immediately stops forwarding the 239.216.0.8 multicast to Client H;
40. LAN Bridge forwards IGMP Leave Group;
41. Remote Router ignores IGMP Leave Group since it is an administratively scoped address;
42. LAN Switch receives the IGMP Leave Group command, forwards the message, verifies it has no other LAN Segment #2 Clients in Group Address=239.216.0.8, and immediately stops transmission of 239.216.0.8 multicast to LAN Segment #2;
43. IPMS 120 receives IGMP Leave Group, verifies it has no other Clients in Group Address=239.216.0.8 (using IGMP Query), and immediately stops transmission of the 239.216.0.8 multicast.

If Remote Clients join "normal" multicast groups (i.e., those transmitted over the backbone of the Internet) through the Remote Router, the 224.0.0.1 and 224.0.0.2 IGMP V2 messages will be bridged to the LAN Switch. The LAN Switch forwards the IGMP messages through LAN segment #2 to the IPMS 120. The IPMS 120 ignores the messages issued for a non-existent stream.

ISP MODEL 4—SIMPLE ISP SCENARIO 2

Figure 24:
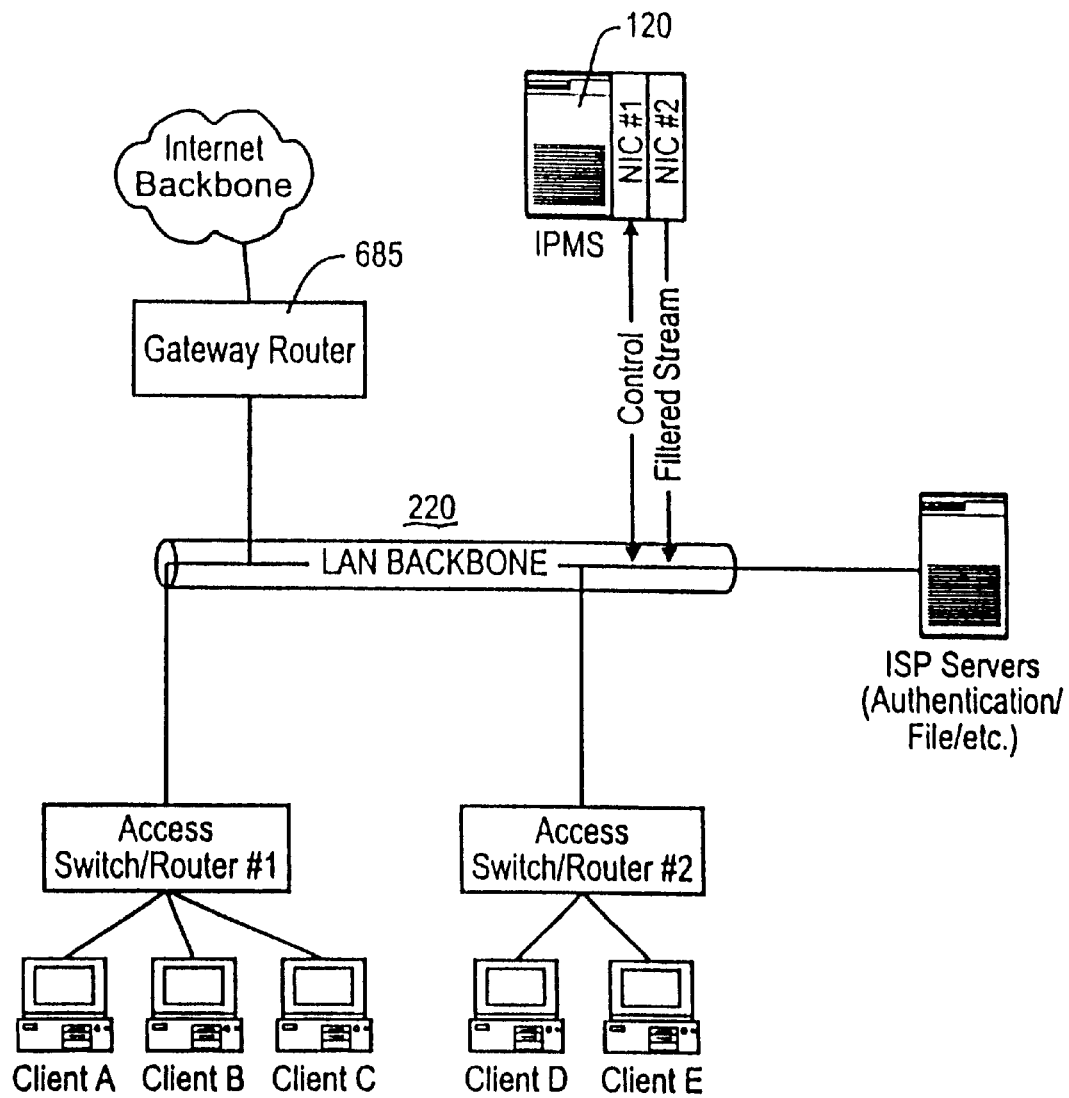

In the scenario of FIG. 24, Client A and the IPMS 120 first join Multicast Group 239.216.63.240 to establish a mechanism for sending multicast control messages to each other. Next, Client A joins, receives, and leaves Multicast Group 239.216.63.248 to receive a brief multicast from the IPMS 120. After that, Client A joins and receives Multicast Group 239.216.0.8. Then, network elements query the group so that multicast traffic can be pruned in the event group members silently leave the group. Finally, Client A leaves Multicast Group 239.216.0.8. As above, IPMS 120 filters the multicast stream so that only multicast addresses which are currently "joined" are provided on the backbone of the LAN.

In this scenario, several assumptions have been made. They are:

IPMS 120 IP Address=128.0.0.255, Client A IP Address=128.0.0.1;

All IP Multicast Addresses transmitted by the IPMS 120 are "Administratively Scoped" addresses in the range 239.216.0.0 through 239.219.255.255 (addresses 239.216.0.8, 239.216.63.24 the 0, 239.216.63.248 being used in this example);

IPMS 120, Access Switch/Routers, and Gateway Router support IGMP V2 protocol;

The IPMS 120 and the clients use Multicast Address=239.216.63.240 to pass proprietary UDP packets using UDP Port=255.

The following operations occur during initial handshake:

1. IPMS 120 sends an IGMP V2 Membership Report (Destination IP Address=239.216.63.240, Group Address=239.216.63.240);

2. The 239.216.63.240 multicast will be used for multicast control messages;
3. Gateway Router does not forward "Administratively Scoped" membership report to the internet;
4. Client A sends an IGMP V2 Membership Report (Destination IP Address=239.216.63.240, Group Address=239.216.63.240);
5. Access Switch/Router #1 forwards IGMP V2 Membership Report to LAN Segment#1 (assuming it has no other interfaces in Group Address=239.216.63.240);
6. LAN Switch receives IGMP V2 Membership Report, forwards the message, and adds Client A to the Group;
7. Gateway Router does not forward "Administratively Scoped" membership report to the Internet;
8. IPMS 120 receives IGMP V2 Membership Report; the 239.216.63.240 multicast will be used for multicast control messages;
9. Client A sends an IGMP V2 Membership Report (Destination IP Address=239.216.63.248, Group Address=239.216.63.248);
10. Access Switch/Router #1 forwards IGMP V2 Membership Report to backbone (assuming it has no other interfaces in Group Address=239.216.63.248);
11. Gateway Router does not forward "Administratively Scoped" membership report to the Internet;
12. IPMS 120 receives IGMP V2 Membership Report and transmits 239.216.63.248 multicast out NIC#2 onto Filtered Stream—the data payload of the 239.216.63.248 multicast includes the IPMS 120 IP Address, and a test pattern;
13. Access Switch/Router #1 forwards 239.216.63.248 multicast to Client A only;
14. Gateway Router ignores 239.216.63.248 multicast since it is an administratively scoped address;
15. Client A receives IPMS 120 IP Address and test pattern and then sends an IGMP Leave Group (Destination IP Address=224.0.0.2, Group Address=239.216.63.248);
16. Access Switch/Router #1 verifies it has no other interfaces in Group Address=239.216.63.248 (using IGMP Query), forwards IGMP Leave Group to backbone, and immediately stops forwarding the 239.216.63.248 multicast to Client A;
17. Gateway Router ignores IGMP Leave Group command since it is on an administratively scoped address;
18. IPMS 120 receives IGMP Leave Group, verifies it has no other Clients in Group Address=239.216.63.248 (using IGMP Query), and immediately stops transmission of the 239.216.63.248 multicast;
19. Client A sends a UDP packet (Destination IP Address=128.0.0.255, Port=255) to the IPMS 120;
20. Access Switch/Router #1 forwards UDP packet to backbone;
21. Gateway Router does not forward packet to internet since it is destined for a local administratively scoped address;
22. IPMS 120 receives UDP packet and sends UDP packet (Destination IP Address=128.0.0.1, Port=255);
23. Gateway Router does not forward packet to internet since it is destined for a local administratively scoped address;
24. Access Switch/Router #1 forwards UDP packet to Client A;
25. Client A receives UDP packet.

The following operations occur when Client A joins Multicast Group 239.216.0.8;

26. Client A sends an IGMP V2 Membership Report (Destination IP Address=239.216.0.8, Group Address=239.216.0.8);
27. Access Switch/Router #1 forwards IGMP V2 Membership Report to the LAN backbone(assuming it has no other interfaces in Group Address=239.216.63.248);
28. Gateway Router ignores IGMP V2 Membership Report since it is an administratively scoped address;
29. IPMS 120 receives IGMP V2 Membership Report and transmits 239.216.0.8 multicast out NIC#2 onto Filtered Stream;
30. Access Switch/Router #1 forwards 239.216.0.8 multicast to Client A only;
31. Gateway Router ignores 239.216.0.8 multicast ("Administratively Scoped" address);
32. Client A receives 239.216.0.8 multicast.

The following query operations ensure that the IPMS 120 does not transmit a Multicast Group that a client has silently left;

33. Access Switch/Router #1 sends IGMP Group-Specific Query (Destination IP Address=239.216.0.8, Group Address=239.216.0.8) to Client A;
34. If Access Switch/Router #1 receives an IGMP V2 Membership Report (Destination IP Address=239.216.0.8, Group Address=239.216.0.8), do nothing;
35. If there is no Membership Report then Access Switch/Router #1 sends IGMP Leave Group(Destination IP Address=224.0.0.2, Group Address=239.216.0.8) to backbone and immediately stops forwarding the 239.216.0.8 multicast to all Clients (including Client A); operations then proceed at Step 40;
36. IPMS 120 sends UDP packet(Destination IP Address=239.216.63.240, Port=255);
37. Client A receives UDP packet and responds with UDP packet (Destination IP Address=239.216.63.240, Port=255) (other Clients will receive and ignore this packet);
38. If IPMS 120 receives no UDP response, then it immediately stops forwarding the 239.216.0.8 to all Clients (group left due to no response).

The following operations occur when Client A purposely leaves the Group;

39. Client A sends an IGMP Leave Group (Destination IP Address=224.0.0.2, Group Address=239.216.0.8);
40. Access Switch/Router #1 receives IGMP Leave Group, verifies it has no other interfaces in Group Address=239.216.0.8 (using IGMP Query), forwards IGMP Leave Group command to the LAN backbone, and immediately stops forwarding the 239.216.0.8 multicast to Client A;
41. Gateway Router ignores the IGMP Leave Group command since it is directed on an administratively scoped address;
42. IPMS 120 receives the IGMP Leave Group command, verifies it has no other Clients in Group Address=239.216.0.8 (using IGMP Query), and immediately stops transmission of 239.216.0.8 multicast.

The following handshake operations occur during final termination:

43. Client A sends a UDP packet (Destination IP Address=128.0.0.255, Port=255) to the IPMS 120;
44. Access Switch/Router #1 forwards UDP packet to backbone;

45. Gateway Router ignores the message since it is routed locally;
46. IPMS 120 receives the UDP packet and sends a UDP packet (Destination IP Address=128.0.0.1, Port=255) to Client A;
47. Gateway Router ignores message routed locally;
48. Access Switch/Router #1 forwards the UDP packet to Client A;
49. Client A receives UDP packet.

ISP MODEL 5—ISP WITH MULTIPLE LAN SEGMENTS/MULTICAST STREAMS SEGMENTED—SCENARIO 2

Figure 25:
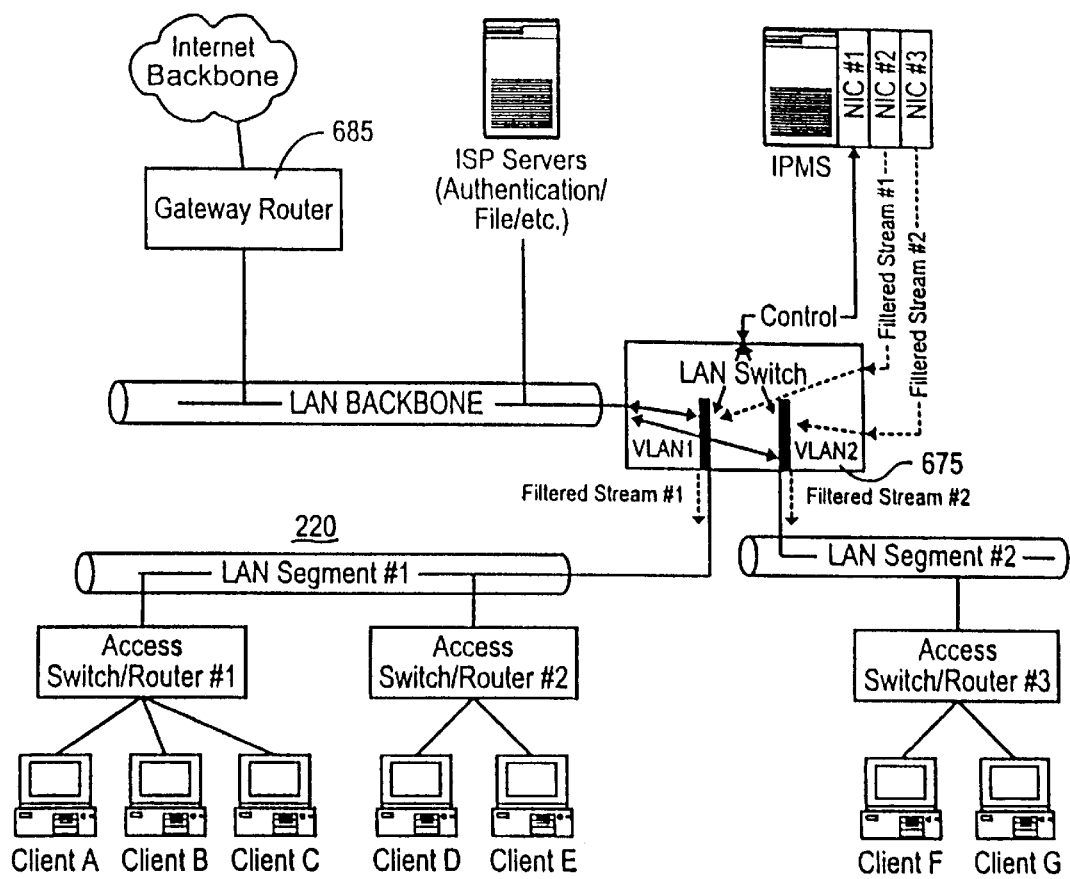

In the example of FIG. 25, Client A and the IPMS 120 first join Multicast Group 239.216.63.240 to establish a mechanism for sending multicast control messages to each other. Next, Client A joins, receives, and leaves Multicast Group 239.216.63.248 to receive a brief multicast from the IPMS 120. After that, Client A joins and receives Multicast Group 239.216.0.8. Then, network elements query the group so that multicast traffic can be pruned in the event group members silently leave the group. Finally, Client A leaves Multicast Group 239.216.0.8.

The IPMS 120 filters the multicast streams sent to each segment so that only multicast addresses which are currently "joined" will be sent to the LAN Switch per segment. This implies that the LAN switch does not have to support IGMP V2, although this provision is not mandatory.

In the scenario of FIG. 25, the following assumptions have been made:

IPMS 120 IP Address=128.0.0.255, Client A IP Address=128.0.0.1;

All IP Multicast Addresses transmitted by the IPMS 120 are "Administratively Scoped" addresses in the range 239.216.0.0 through 239.219.255.255 (addresses 239.216.0.8, 239.216.63.240, 239.216.63.248 used in this example);

Access Switch/Routers and IPMS 120 support IGMP V2;

LAN Switch may or may not support IGMP V2;

LAN Switch configuration:
  Virtual LAN#1=LAN Segment #1, Backbone, IPMS 120 Control,
  Filtered Stream#1;
  Virtual LAN #2=LAN Segment #2, Backbone, IPMS 120 Control,
  Filtered Stream#2;

Remote Router does not forward IGMP messages with "Administratively Scoped" Multicast addresses (this includes messages with Dest IP=239.*.*.*, and IGMP messages with Dest IP=224.0.0.1/224.0.0.2 that specify a Group Address=239.*.*.* );

The IPMS 120 and the Clients use Multicast Address=239.216.63.240 to pass proprietary UDP packets using UDP Port=255.

The following operations occur during initial handshake in the system:

1. IPMS 120 sends an IGMP V2 Membership Report (Destination IP Address=239.216.63.240, Group Address=239.216.63.240)
2. LAN Switch receives IGMP V2 Membership Report, forwards the message, and adds the IPMS 120 to the Group, the 239.216.63.240 multicast being used for multicast control messages;
3. Gateway Router does not forward the administratively scoped membership report to the Internet;
4. Client A sends an IGMP V2 Membership Report (Destination IP Address=239.216.63.240, Group Address=239.216.63.240);
5. Access Switch/Router #1 forward s IGMP V2 Membership Report to LAN Segment#1 (assuming it has no other interfaces in Group Address=239.216.63.240);
6. LAN Switch receives IGNIP V2 Membership Report, forwards the message, and adds Client A to the Group;
7. Gateway Router does not forward the administratively scoped membership report to the Internet;
8. IPMS 120 receives IGMP V2 Membership Report, the 239.216.63.240 multicast being used for multicast control messages;
9. Client A sends an IGMP V2 Membership Report (Destination IP Address=239.216.63.248, Group Address=239.216.63.248);
10. Access Switch/Router #1 forward s IGMP V2 Membership Report to LAN Segment #1 (assuming it has no other interfaces in Group Address=239.216.63.248);
11. LAN Switch receives IGMP V2 Membership Report and forwards the message;
12. Gateway Router does not forward the administratively scoped membership report to the Internet;
13. IPMS 120 receives IGMP V2 Membership Report and transmits 239.216.63.248 multicast out NIC #2 and NIC#3 onto Filtered Steams 1 and 2—the data payload of the 239.216.63.248 multicast includes the IPMS 120 IP Address, and a test pattern;
14. If LAN Switch is IGMP V2 enabled, it will forward 239.216.63.248 muticast to LAN Segment #1 only. If it isn't, then the 239.216.63.248 multicast will be forwarded to both LAN Segment #1 and LAN Segment #2;
15. Access Switch/Router #1 forwards 239.216.63.248 multicast to Client A only;
16. Client A receives IPMS 120 IP Address and test pattern and then sends an IGMP Leave Group (Destination IP Address=224.0.0.2, Group Address=239.216.63.248);
17. Access Switch/Router #1 receives IGMP Leave Group, verifies it has no other interfaces in Group Address=239.216.63.248 (using IGMP Query), forwards IGMP Leave Group to LAN Segment #1, and immediately stops forwarding the 239.216.63.248 multicast to Client A;
18. LAN Switch receives the IGMP Leave Group and forwards the message. If it is IGMP V2 enabled, it will verify it has no other LAN Segment #1 Clients in Group Address=239.216.63.248 (using IGMP Query), and immediately stop transmission of 239.216.63.248 multicast to LAN Segment #1;
19. Gateway Router ignores IGMP Leave Group since it is on an administratively scoped address;
20. IPMS 120 receives IGMP Leave Group, verifies it has no other Clients in Group Address=239.216.63.248, and immediately stops transmission of the 239.216.63.248 multicast;
21. Client A sends a UDP packet(Destination IP Address=128.0.0.255, Port=255) to the IPMS 120;
22. Access Switch/Router #1 forwards UDP packet to LAN Segment #1;
23. LAN Switch forwards the UDP packet to the IPMS 120 control stream (NIC #1);
24. IPMS 120 receives UDP packet and sends UDP packet response (Destination IP Address=128.0.0.1, Port=255) from NIC #1;
25. LAN Switch forwards the UDP packet to the LAN Segment #1 since the packet is addressed to Client A;

26. Access Switch/Router #1 forwards UDP packet to Client A;

27. Client A receives UDP packet.

The following operations occur when Client A joins Multicast Group 239.216.0.8:

28. Client A sends an IGMP V2 Membership Report (Destination IP Address=239.216.0.8, Group Address=239.216.0.8);

29. Access Switch/Router #1 forwards IGMP V2 Membership Report to LAN Segment #1 (assuming it has no other interfaces in Group Address=239.216.63.248);

30. LAN Switch receives IGMP V2 Membership Report and forwards the message. If it is IGMP V2 enabled, it will enable transmission of 239.216.0.8 multicast to LAN Segment #1;

31. Gateway Router ignores IGMP Membership Report since it is referencing an administratively scoped address;

32. IPMS 120 receives IGMP V2 Membership Report and transmits 239.216.0.8 multicast out NIC#2 onto Filtered Stream #1;

33. LAN Switch forwards 239.216.0.8 multicast to LAN Segment #1 only;

34. Access Switch/Router #1 forwards 239.216.0.8 multicast to Client A only;

35. Client A receives 239.216.0.8 multicast.

The following query operations occur to ensure that the IPMS does not unnecessarily provide a Group multicast transmission when there are no subscribers;

36. Access Switch/Router #1 sends IGMP Group-Specific Query (Destination IP Address=239.216.0.8, Group Address=239.216.0.8) to Client A;

37. If Access Switch/Router #1 receives an IGMP V2 Membership Report (Destination IP Address=239.216.0.8, Group Address=239.216.0.8), do nothing;

38. If there is no Membership Report, then Access Switch/Router #1 sends IGMP Leave Group (Destination IP Address=224.0.0.2, Group Address=239.216.0.8) to LAN Segment #1 and immediately stops forwarding the 239.216.0.8 multicast to all clients (including Client A); operations then proceed from Step 53;

39. IPMS 120 sends UDP packet(Destination IP Address=239.216.63.240, Port=255) from NIC #1;

40. If LAN Switch is IGMP V2 enabled, it will forward the packet to all interfaces currently monitoring the 239.216.63.240 stream. If it is not IGMP V2 enabled. the packet will be forwarded to all LAN interfaces.

41. Gateway Router will ignore the administratively scoped packet;

42. Access Switch/Routers will forward the packet to all Clients listening to the 239.216.63.240 stream;

43. Client A will respond with a UDP packet (Destination IP Address=239.216.63.240, Port=255);

44. The packet will be forwarded by Access/Switch Router #1 to LAN Segment #1;

45. The LAN Switch will forward the packet to the IPMS 120 NIC #1;

46. Gateway Router will ignore the administratively scoped packet;

47. If IPMS 120 receives no UDP response, then it immediately stops forwarding the 239.216.0.8 to all Clients (group is left due to no response);

Independently, if the LAN Switch is IGMP V2 enabled, the following operations occur:

48. LAN Switch sends IGMP Group-Specific Query (Destination IP Address=239.216.0.8, Group Address=239.216.0.8) to LAN Segment #1;

49. If LAN Switch receives IGMP V2 Membership Report(Destination IP Address=239.216.0.8, Group Address=239.216.0.8), do nothing;

50. If there is no Membership Report then LAN Switch sends IGMP Leave Group (Destination IP Address=224.0.0.2, Group Address=239.216.0.8) to IPMS 120 and immediately stops transmission of 239.216.0.8 multicast to LAN Segment #1 (group is left due to no response);

The following operations occur when Client A leaves Group Address 239.216.0.8:

51. Client A sends an IGMP Leave Group(Destination IP Address=224.0.0.2, Group Address=239.216.0.8);

52. Access Switch/Router #1 receives IGMP Leave Group, verifies it has no other interfaces in Group Address=239.216.0.8 (using IGMP Query), forwards IGMP Leave Group to LAN Segment #1, and immediately stops forwarding the 239.216.0.8 multicast to Client A;

53. LAN Switch receives IGMP Leave Group and forwards the message. If it is IGMP V2 enabled it verifies it has no other LAN Segment #1 Clients in Group Address=239.216.0.8 (using IGMP Query), and immediately stops transmission of 239.216.0.8 multicast to LAN Segment #1;

54. Gateway Router ignores IGMP Leave Group since it is in an administratively scoped address packet;

55. IPMS 120 receives IGMP Leave Group, verifies it has no other Clients in Group Address=239.216.0.8, and immediately stops transmission of 239.216.0.8 multicast.

The following termination handshake operations occur upon termination of the multicast subscription:

56. Client A sends a UDP packet (Destination IP Address=128.0.0.255, Port=255) to the IPMS 120;

57. Access Switch/Router #1 forwards UDP packet to LAN Segment #1;

58. LAN Switch forwards packet to IPMS 120 NIC #1;

59. IPMS 120 receives UDP packet and sends a UDP packet (Destination IP Address=128.0.0.1, Port=255) to Client A;

60. LAN Switch forwards packet to LAN Segment #1;

61. Gateway Router will ignore the administratively scoped packet;

62. Access Switch/Router #1 forwards packet to Clients A;

63. Client A receives UDP packet.

ISP MODEL 6—LARGE ISP WITH AFFILIATED ISP—SCENARIO 2

Figure 26:
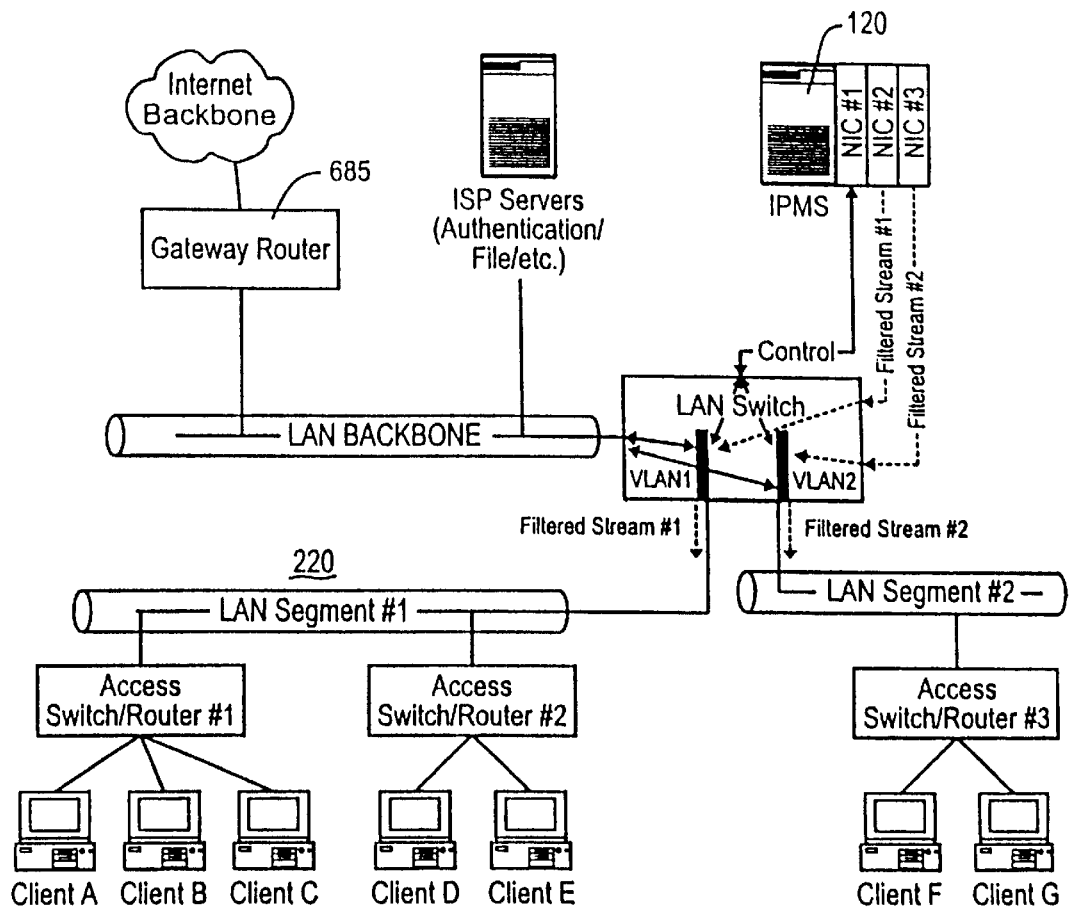

In the example of FIG. 26, Remote Client H and the IPMS 120 first join Multicast Group 239.216.63.240 to establish a mechanism for sending multicast control messages to each other. Next, Remote Client H joins, receives, and leaves Multicast Address 239.216.63.248 to receive a brief multicast from the IPMS 120. After that, Client H joins and receives Multicast Group 239.216.0.8. Then, network elements query the group so that multicast traffic can be pruned in the event group members silently leave the group. Finally, Client H leaves Multicast Group 239.216.0.8.

The IPMS 120 filters the multicast streams sent to each segment so that only multicast addresses that are currently "joined" will be sent to the LAN Switch per segment. This implies that the LAN switch does not have to support IGMP V2, although this is not necessary. The LAN Switch may filter the multicast stream sent to each segment so that only multicast addresses which are currently "joined" by plans on a segment will be placed on the segment. For the Remote ISP, the multicast streams preferably to not use bandwidth on the Router link to the ISP (to avoid impacting normal Internet traffic). Rather, a bridged connection is used to send the streams to the Remote ISP. The only segments that receive the multicast streams are LAN Segment #1 and the bridged connection to the Remote ISP that is considered to be LAN Segment #2.

In this scenario, the following assumptions have been made: boom

IPMS 120 IP Address=128.0.0.255, Client A IP Address=128.0.0.1;

All IP Multicast Addresses transmitted by the IPMS 120 are "Administratively Scoped" addresses in the range 239.216.0.0 through 239.219.255.255 (addresses 239.216.0.8, 239.216.63.240, 239.216.63.248 used in this example);

Access Switch/Router and IPMS 120 support IGMP V2;

LAN Switch may or may not support IGMP V2;

LAN Switch configuration:
Virtual LAN#1=LAN Segment #1, Backbone, IPMS 120 Control, Filtered Stream#1;
Virtual LAN#2=LAN Segment #2, IPMS 120 Control, Filtered Stream#2;
Virtual LAN#3=LAN Segment #3, Backbone;

LAN Bridge configuration: Only forward 239.216.0.0–239.219.255.255; 224.0.0.1, 224.0.0.2;

Remote Router does not forward IGMP messages with "Administratively Scoped" Multicast addresses (this includes messages with Dest IP=239.*.*.*, and IGMP messages with Dest IP=224.0.0.1/224.0.0.2 that specify a Group Address=239.*.*.* );

The IPMS 120 and the Clients use Multicast Address=239.216.63.240 to pass UDP packets using UDP Port=255.

In this scenario, the following initial handshake operations take place:

1. IPMS 120 sends an IGMP V2 Membership Report (Destination IP Address=239.216.63.240, Group Address=239.216.63.240);
2. LAN Switch receives IGMP V2 Membership Report, forwards the message, and adds the IPMS 120 to the Group, the 239.216.63.240 multicast being used for multicast control messages;
3. Gateway Router does not forward the administratively scoped membership report to the Internet;
4. Client H sends an IGMP V2 Membership Report (Destination IP Address=239.216.63.240, Group Address=239.216.63.240);
5. Access Switch/Router #1 forwards IGMP V2 Membership Report to LAN Segment#1 (assuming it has no other interfaces in Group Address=239.216.63.240);
6. LAN Switch receives IGMP V2 Membership Report, forwards the message, and adds Client H to the Group;
7. Gateway Router does not forward the administratively scoped membership report to the Internet;
8. IPMS 120 receives IGMP V2 Membership Report, the 239.216.63.240 multicast being used for multicast control messages;
9. Client H sends an IGMP V2 Membership Report (Destination IP Address=239.216.63.248, Group Address=239.216.63.248);
10. Access Switch/Router #2 forwards IGMP V2 Membership Report to Remote Backbone (assuming it has no other interfaces in Group Address=239.216.63.248);
11. LAN Bridge forwards IGMP V2 Membership Report;
12. Remote Router ignores the administratively scoped IGMP V2 Membership Report;
13. LAN Switch receives IGMP V2 Membership Report, forwards the message, and enables transmission of 239.216.63.248 multicast to LAN Segment #2;
14. IPMS 120 receives IGMP V2 Membership Report and transmits 239.216.63.248 multicast out NIC #2 and NIC #3 onto Filtered Streams 1 and 2—the data payload of the 239.216.63.248 multicast includes the IPMS 120 IP Address, and a test pattern;
15. If LAN Switch is IGMP V2 enabled, it will forward 239.216.63.248 multicast to LAN Segment #2 only. If it is not so enabled, then the 239.216.63. 248 multicast data will be forwarded to both LAN Segment #1 and LAN Segment #2;
16. LAN Bridge forwards the 239.216.63.248 multicast data;
17. Access Switch/Router #2 forwards 239.216.63.248 multicast to Client H only;
18. Remote Router ignores 239.216.63.248 multicast data;
19. Client H receives the IPMS 120 IP Address and test pattern and then sends an IGMP Leave Group (Destination IP Address=224.0.0.2, Group Address=239.216.63.248);
20. Access Switch/Router #2 receives IGMP Leave Group, verifies it has no other interfaces in Group Address=239.216.63.248 (using IGMP Query), forwards IGMP Leave Group to LAN Bridge, and immediately stops forwarding the 239.216.63.248 multicast to Client H;
21. LAN Bridge forwards the IGMP Leave Group command;
22. Remote Router ignores the administratively scoped IGMP Leave Group command;
23. LAN Switch receives IGMP Leave Group and forwards the message. If it is IGMP V2 enabled, it will verify it has no other LAN Segment #2 Clients in Group Address=239.216.63.248 (using IGMP Query), and will immediately stop transmission of the 239.216.63.248 multicast to LAN Segment #2;
24. IPMS 120 receives the IGMP Leave Group command, verifies it has no other Clients in Group Address=239.216.63.248, and immediately stops transmission of the 239.216.63.248 multicast data;
25. Client H sends a UDP packet (Destination IP Address=128.0.0.255, Port=255) to the IPMS 120;
26. Access Switch/Router #2 forwards a UDP packet to the backbone of the remote ISP;
27. LAN Bridge forwards the IGMP V2 Membership Report;
28. Remote Router ignores the administratively scoped IGMP V2 Membership Report;
29. LAN Switch forwards the UDP packet to the IPMS 120 control stream (NIC #1);
30. IPMS 120 receives UDP packet and sends UDP packet response (Destination IP Address=128.0.0.1, Port=255) from NIC #1;

31. LAN Switch forwards the UDP packet to the LAN Segment #2 since the packet is addressed to Client H;
32. Access Switch/Router #2 forwards UDP packet to Client H;
33. Client H receives UDP packet.

The following operations occur when Client H joins Multicast Group 239.216.0.8:

34. Client H sends an IGMP V2 Membership Report (Destination IP Address=239.216.0.8, Group Address=239.216.0.8);
35. Access Switch/Router #2 forwards IGMP V2 Membership Report to Remote Backbone (assuming it has no other interfaces in Group Address=239.216.0.8);
36. LAN Bridge forwards IGMP V2 Membership Report;
37. Remote Router ignores the administratively scoped IGMP V2 Membership Report;
38. LAN Switch receives IGMP V2 Membership Report and forwards the message. If it is IGMP V2 enabled, it will enable transmission of 239.216.0.8 multicast to LAN Segment #2;
39. IPMS 120 receives the IGMP V2 Membership Report and transmits the 239.216.0.8 multicast through NIC#3 onto Filtered Stream #2;
40. LAN Switch forwards 239.216.0.8 multicast to LAN Segment #2 only;
41. LAN Bridge forwards the 239.216.0.8 multicast data;
42. Access Switch/Router #2 forwards 239.216.0.8 multicast data to Client H only;
43. Remote Router ignores 239.216.0.8 multicast data;
44. Client H receives 239.216.0.8 multicast.

The following query operations also take place to ensure that unnecessary multicast data is not transmitted over any LAN:

45. Access Switch/Router #2 sends IGMP Group-Specific Query (Destination IP Address=239.216.0.8, Group Address=239.216.0.8) to Client H;
46. If Access Switch/Router #2 receives an IGMP V2 Membership Report (Destination IP Address=239.216.0.8, Group Address=239.216.0.8), do nothing;
47. If there is no Membership Report, then Access Switch/Router #2 sends an IGMP Leave Group command (Destination IP Address=224.0.0.2, Group Address=239.216.0.8) to the backbone of the remote ISP and immediately stops forwarding the 239.216.0.8 multicast data to Client H; operations then proceed from Step 63 below;
48. IPMS 120 sends UDP packet (Destination IP Address=239.216.63.240, Port=255) from NIC #1;
49. If LAN Switch is IGMP V2 enabled, it will forward the packet to all interfaces currently monitoring the 239.216.63.240 stream; if it is not IGMP V2 enabled, the packet will be forwarded to all LAN interfaces;
50. Access Switch/Routers forwards the packet to all Clients listening to the 239.216.63.240 stream;
51. Client H responds with a UDP packet (Destination IP Address=239.216.63.240, Port=255);
52. Access/Switch Router #2 forwards the packet to the backbone of the remote ISP;
53. LAN Bridge forwards packet;
54. Remote Router ignores packet;
55. The LAN Switch forwards packet to the IPMS 120 NIC #1;
56. If IPMS 120 does not receive a UDP response, then it immediately stops forwarding the 239.216.0.8 to all Clients (group is left due to no response).

If the LAN Switch is IGMP V2 enabled, the following operations will take place:

57. LAN Switch sends IGMP Group-Specific Query (Destination IP Address=239.216.0.8, Group Address=239.216.0.8) to LAN Segment #2;
58. LAN Bridge forwards IGMP Group-Specific Query;
59. If LAN Switch receives an IGMP V2 Membership Report(Destination IP Address=239.216.0.8, Group Address=239.216.0.8), then do nothing;
60. If there is no Membership Report, then LAN Switch immediately stops transmission of 239.216.0.8 multicast to LAN Segment #2 (group is left due to no response).

The following operations take place when Client H leaves Multicast Group 239.216.0.8:

61. Client H sends an IGMP Leave Group command (Destination IP Address=224.0.0.2, Group Address=239.216.0.8);
62. Access Switch/Router #2 receives the IGMP Leave Group command, verifies it has no other interfaces in Group Address=239.216.0.8 (using IGMP Query), forwards the IGMP Leave Group to the backbone of the remote ISP, and immediately stops forwarding the 239.216.0.8 multicast data to Client H;
63. LAN Bridge forwards IGMP Leave Group command;
64. Remote Router ignores the administratively scoped IGMP Leave Group command;
65. LAN Switch receives the IGMP Leave Group command and forwards the message; if it is IGMP V2 enabled, it verifies it has no other LAN Segment #2 Clients in Group Address=239.216.0.8 (using IGMP Query), and immediately stops transmission of 239.216.0.8 multicast to LAN Segment #2;
66. IPMS 120 receives the IGMP Leave Group command, verifies it has no other Clients in Group Address=239.216.0.8, and immediately stops transmission of the 239.216.0.8 multicast.

The following termination handshake operations also take place:

67. Client H sends a UDP packet (Destination IP Address=128.0.0.255, Port=255) to the IPMS 120;
68. Access Switch/Router #2 forwards the UDP packet to the backbone of the remote ISP;
69. LAN Bridge forwards the packet;
70. Remote Router ignores the packet;
71. LAN Switch forwards the packet to IPMS 120 NIC #1;
72. IPMS 120 receives the UDP packet and sends a UDP packet (Destination IP Address=128.0.0.1, Port=255) to Client H;
73. LAN Switch forwards the packet to LAN Segment #2 only;
74. LAN Bridge forwards the packet;
75. Access Switch/Router #2 forwards the packet to Client H only;
76. Client H receives the UDP packet.

If Remote Clients join "normal" Multicast Groups through the Remote Router, the 224.0.0.1 and 224.0.0.2 IGMP V2 messages will be bridged to the LAN Switch. The LAN Switch will forward the IGMP messages through LAN segment #2 to the IPMS 120. The IPMS 120 will ignore the messages issued for a non-existent stream.

Figure 27:
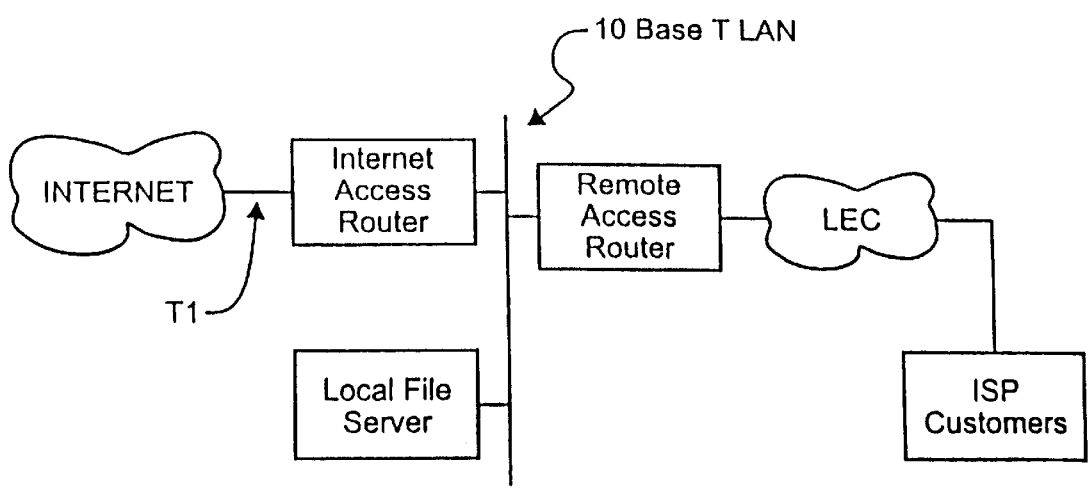
FIGS. 27–29 illustrate a further manner of deploying the present system at an ISP.

FIG. 27 shows a basic ISP configuration. The Internet is connected to an internal 10 BaseT LAN. This internal LAN has a local file server that is used for locally served Web pages. Also on this LAN is connected a remote access server (modem pool) which is used to connect the ISP customers via the LEC (local exchange carrier—the local phone company) to the Internet.

Figure 28:
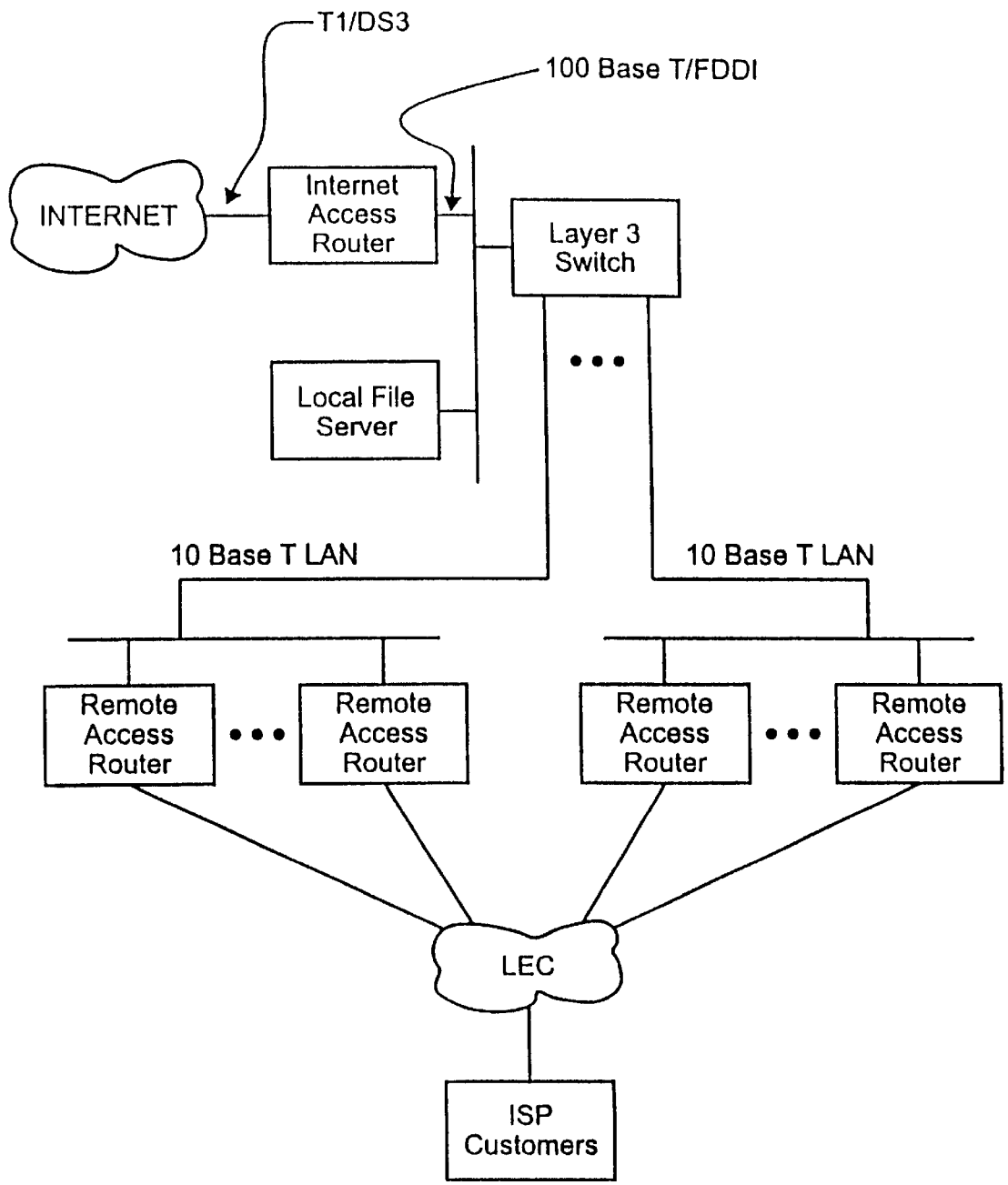

FIG. 28 shows how this ISPO grows to serve more customers. A layer 3 switch is added to the Internal ISP LAN. This LAN is usually interconnected by 100 BaseT added to the internal ISP LAN. This LAN is usually interconnected by 100 BaseT or FDDI transmission technology. The switch is used to interconnect multiple 10 BaseT LAN segments to the ISP LAN. Each of these segments have multiple remote access servers that are used to connect users to the Internet.

Figure 29:
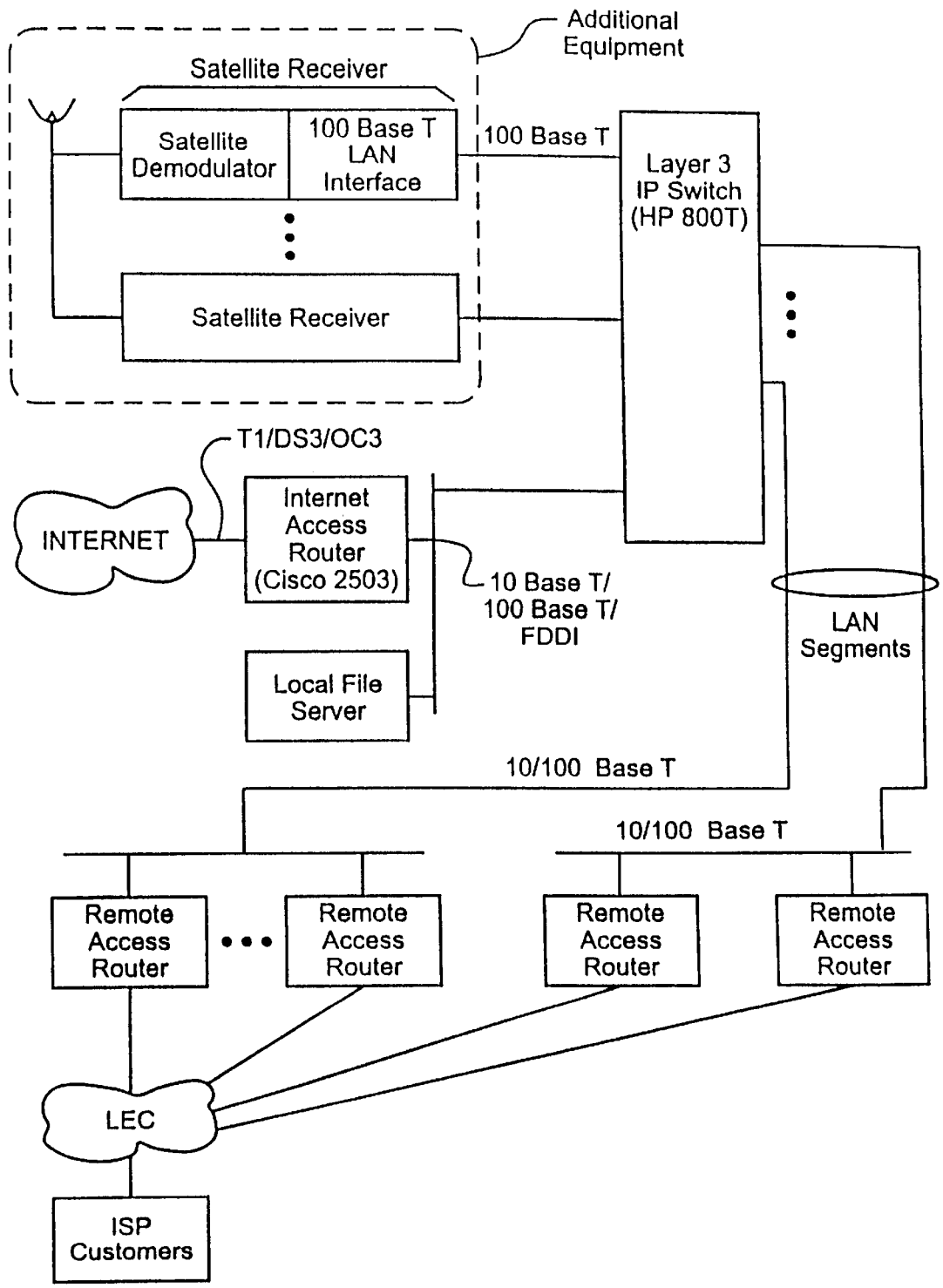

FIG. 29 shows how broadband multimedia data is inserted into an ISP using the ideas described in this application. This configuration takes advantage of current ISP architectures. Many ISP's today have evolved over time as shown in FIG. 27 and FIG. 28. They started with one remote access router serving a few customers (FIG. 27) and have expanded to multiple remote access routers (FIG. 28). FIG. 29 shows the addition of multiple satellite receivers that receive multicast data.

In this configuration, the Layer 3 IP switch performs several functions. The first function is to connect the proper multicast stream form the appropriate satellite receiver to the appropriate LAN segments. This requires the switch to implement the IP Multicast Protocol (RFC1112).

The second function is to connect the proper Internet traffic to the appropriate LAN segment.

The third function of the Layer 3 switch is to perform the IGMP queryer function as specified in RFC1112.

If the existing Layer 3 switch meets the above requirements, then it can be used. If not, then the ISP must upgrade the switch with one that meets these requirements. The commercially available HP800T switch is one example of such a layer 3 multicast enabled switch.

Such a configuration has the advantage of simplicity since the satellite receiver only needs to strip the HDLC (or other) encapsulation from the incoming data and electrically convert the data to the ethernet format. It does not need to have any knowledge of IP multicasting protocols.

Enhancements that could be incorporated in the receiver could be multicast address translation and data de-scrambling. In this case, the receiver must understand the IP multicasting protocol to perform these appropriate functions.

FIG. 30 illustrates the layout of an exemplary, traditional web page 80 suitable for use in the present multicast system. As illustrated, the web page includes a video display window 800 that accepts and displays a video data stream from the broadcast transmission. External to the video display window 800, text, and graphic content relating to the content of the video is displayed. Such content can be provided in the broadcast transmission itself, over the backbone of the Internet, or from storage at the ISP.

The web page is also provided with a plurality of baud rate selection buttons 810, 815, 820, and 825. Each button corresponds to a baud rate of a broadcast video stream, each stream having the same multimedia content. For example, button 810 may correspond to transmission of the media content for the display window 800 at 14.4 K. Similarly, buttons 815, 820, and 825 may correspond to baud rates of 28.8 K, 56.6 K, and 1.5 MB, respectively. This allows the client to select a baud rate for the video transmission rate that is suited to his system.

The web page provides substantial information and versatility to the user. The user may be presented with a substantially continuous flow of video information while concurrently having text and other information presented to him that may or may not be related to the video to allow the user to select other web pages, audio information, further video content, etc. These further selections may relate to the particular topic, product, etc., provided in the video content. The user may be given an option to select multiple video channels that may be supplied concurrently. The user is provided with a substantial number of channels to choose from, thereby allowing the user to select the desired video content.

The web page needed not necessarily be provided with buttons for the selection of baud rate. Rather, a software plug-in for the web browser used by the client may be used to automatically join the appropriate multicast group depending on the data rate at which the client communicates with the ISP. In such instances, the plug-in software first detects the data rate at which the client is communicating with the Internet service provider. When a client wishes to view a particular video stream content. the software compares this detected data rate against a table of different data rates for the same content, each data rate corresponding to a unique multicast Group address. The software joins the client to the mulitcast group having the maximum data rate that does not exceed the data rate at which the software detected the communications between the client and the Internet service provider. An exemplary embodiment of software that may be used for this purpose is set forth in Appendix A. Appendix A includes listings of software source code in C++ for automatically detecting the baud rate at which the client is connected to the system and selecting the proper multicast join group.

Numerous modifications can be made to the foregoing system without departing from the spirit and scope of the invention as set forth in the appended claims. Therefore, it is the intention of the inventors to encompass all such changes and modifications that fall within the scope of the appended claims.

What is claimed is:

1. A method of multicasting digital data to a plurality of separate users accessing an Internet connection at least in part via an Internet backbone, the method comprising the steps of:

a) formatting digital data in accordance with an IP protocol to generate IP digital data;

b) stream transmitting, in a relatively time-sensitive manner, the IP digital data from a transmission site to a remote Internet point of presence through a transmission channel substantially separate from the Internet backbone;

c) multicasting the IP digital data transmitted by step (b) from the remote Internet point of presence for delivery to a plurality of separate receiving Internet user apparatus connected to but distal from the remote Internet point of presence;

d) contemporaneously with step c), transmitting, in a relatively time-insensitive manner, additional IP digital data separate from the transmission channel to the remote Internet point of presence and then to the plurality of separate receiving Internet user apparatus; and f) processing the multicasted IP digital data and the additional IP digital data on each among the plurality of separate receiving Internet user apparatus to simultaneously provide information from both the multicasted IP digital data and the additional IP digital data to each among the plurality of separate Internet users.

2. A method of multicasting digital data to a plurality of separate Internet users connected to an Internet connection at least in part via an Internet backbone, the method comprising the steps of:
   a) formatting digital data, including video information, in accordance with an IP protocol to generate IP digital data;
   b) stream transmitting, in a relatively time-sensitive manner, the IP digital data from a transmission site to a remote Internet point of presence through dedicated one-way transmission bandwidth substantially separate from the Internet backbone; and
   c) multicasting the IP digital data from the remote Internet point of presence for delivery to said plurality of separate Internet users connected to but distal from the remote Internet point of presence.

3. The method of claim 1 wherein the digital data of step a) includes video information and the transmission of step b) is substantially a one-way data-flow transmission.

4. The method of claim 1 wherein the method also includes the step of:
   contemporaneously with step c), receiving and processing at least one IP request transmitted from at least one of said Internet users to the remote Internet point of presence.

5. The method of claim 3 wherein the method also includes the step of:
   contemporaneously with step c), receiving and processing at least one IP request from at least one of said Internet user apparatus to the remote Internet point of presence.

6. The method of claim 2 wherein the one-way transmission bandwidth of step b) comprises an extraterrestrial satellite.

7. The method of claim 3 wherein the one-way transmitting of step b) is through an extraterrestrial satellite.

8. The method of claim 5 wherein the one-way transmitting of step b) is through an extraterrestrial satellite.

9. The method of claim 2 wherein the delivery of step c) takes place over a terrestrial telecommunications system including POTS lines connecting the remote Internet point of presence to the plurality of separate Internet users.

10. The method of claim 1 wherein the delivery of step c) and the transmitting of step d) from the remote Internet point of presence to the plurality of separate receiving Internet user apparatus is through a terrestrial telecommunications system connecting the remote Internet point of presence to the plurality of separate receiving Internet user apparatus.

11. The method of claim 2 wherein the delivery of step c) takes place over a terrestrial telecommunications system connecting the remote Internet point of presence to the plurality of separate Internet users.

12. The method of claim 3 wherein the delivery of step c) and the transmitting of step d), from the remote Internet point of presence to the plurality of separate receiving Internet user apparatus, is through a terrestrial telecommunications system connecting the remote Internet point of presence to the plurality of separate receiving Internet user apparatus.

13. The method of claim 4 wherein the delivery of step c) and the transmitting of step d), from the remote Internet point of presence to the plurality of separate receiving Internet user apparatus, is through a terrestrial telecommunications system connecting the remote Internet point of presence to the plurality of separate receiving Internet user apparatus.

14. The method of claim 5 wherein the delivery of step c) and the transmitting of step d), from the remote Internet point of presence to the plurality of separate receiving Internet user apparatus, is through a terrestrial telecommunications system connecting the remote Internet point of presence to the plurality of separate receiving Internet user apparatus.

15. The method of claim 6 wherein the delivery of step c) takes place over a terrestrial telecommunications system connecting the remote Internet point of presence to the plurality of separate Internet users.

16. The method of claim 7 wherein the delivery of step c) and the transmitting of step d), from the remote Internet point of presence to the plurality of separate receiving Internet user apparatus, is through a terrestrial telecommunications system connecting the remote Internet point of presence to the plurality of remote receiving Internet user apparatus.

17. A method of multicasting digital data, including video or audio content, to multiple separate Internet users running Internet browsers accessing a distal Internet backbone through disparate Internet service providers, the method comprising the steps of:
   a) multicast transmitting the digital data to at least one distal Internet point of presence through dedicated one-way transmission bandwidth substantially separate from the Internet backbone; and
   b) transmitting the digital data from said distal Internet point of presence to a plurality of the separate Internet browsers over a two-way network connecting the remote Internet point of presence to the plurality of separate Internet browsers.

18. The method of claim 17 wherein each of the plurality of separate Internet browsers provides a browser screen that displays received digital data on at least a portion of the browser screen and a separate portion of the browser screen can simultaneously provide two-way, interactive Internet browser connectivity between the separate screen portion and an Internet server connected through the Internet backbone to the remote Internet point of presence.

19. The method of claim 17 wherein said dedicated one-way transmission bandwidth comprises an extraterrestrial satellite transmission system.

20. The method of claim 18 wherein said dedicated one-way transmission bandwidth comprises an extraterrestrial satellite transmission system.

21. The method of claim 17 wherein said dedicated one-way transmission bandwidth comprises a one-way wireless transmission system.

22. The method of claim 20 wherein said dedicated one-way transmission bandwidth comprises a one-way satellite transmission system.

23. The method of claim 17 wherein the transmitting of step a) comprises transmitting the digital content to plural distal Internet points of presence, including said at least one distal Internet point of presence, substantially through said dedicated one-way transmission bandwidth.

24. The method of claim 18 wherein the transmitting of step a) comprises transmitting the digital content to plural distal Internet points of presence, including said at least distal Internet point of presence, substantially through said dedicated one-way transmission bandwidth.

25. The method of claim 19 wherein the transmitting of step a) comprises transmitting the digital content to plural distal Internet points of presence, including said at least one distal Internet point of presence, substantially through said dedicated one-way transmission bandwidth.

26. The method of claim 20 wherein the transmitting of step a) comprises transmitting the digital content to plural distal Internet points of presence, including said at least one distal Internet point of presence, substantially through said dedicated one-way transmission bandwidth.

27. The method of claim 21 wherein the transmitting of step a) comprises transmitting the digital content to plural distal Internet points of presence, including said at least one distal Internet point of presence, substantially through said dedicated one-way transmission bandwidth.

28. The method of claim 22 wherein the transmitting of step a) comprises transmitting the digital content to plural distal Internet points of presence, including said at least one distal Internet service gateway, substantially through said dedicated one-way transmission bandwidth.

29. The method of claim 17 wherein the two-way network comprises a telecommunications network.

30. The method of claim 18 wherein the two-way network comprises a telecommunications network.

31. The method of claim 19 wherein the two-way network comprises a telecommunications network.

32. The method of claim 20 wherein the two-way network comprises a telecommunications network.

33. The method of claim 21 wherein the two-way network comprises a telecommunications network.

34. The method of claim 22 wherein the two-way network comprises a telecommunications network.

35. The method of claim 23 wherein the two-way network comprises a telecommunications network.

36. The method of claim 24 wherein the two-way network comprises a telecommunications network.

37. The method of claim 25 wherein the two-way network comprises a telecommunications network.

38. The method of claim 26 wherein the two-way network comprises a telecommunications network.

39. The method of claim 27 wherein the two-way network comprises a telecommunications network.

40. The method of claim 28 wherein the two-way network comprises a telecommunications network.

41. The method of claim 17 wherein the two-way network comprises a cable network.

42. The method of claim 18 wherein the two-way network comprises a cable network.

43. The method of claim 19 wherein the two-way network comprises a cable network.

44. The method of claim 20 wherein the two-way network comprises a cable network.

45. The method of claim 21 wherein the two-way network comprises a cable network.

46. The method of claim 22 wherein the two-way network comprises a cable network.

47. The method of claim 23 wherein the two-way network comprises a cable network.

48. The method of claim 24 wherein the two-way network comprises a cable network.

49. The method of claim 25 wherein the two-way network comprises a cable network.

50. The method of claim 26 wherein the two-way network comprises a cable network.

51. The method of claim 27 wherein the two-way network comprises a cable network.

52. The method of claim 28 wherein the two-way network comprises a cable network.

53. The method of claim 17 wherein the two-way network comprises a computer network.

54. The method of claim 18 wherein the two-way network comprises a computer network.

55. The method of claim 19 wherein the two-way network comprises a computer network.

56. The method of claim 20 wherein the two-way network comprises a computer network.

57. The method of claim 21 wherein the two-way network comprises a local area computer network.

58. The method of claim 22 wherein the two-way network comprises a local area computer network.

59. The method of claim 23 wherein the two-way network comprises a local area computer network.

60. The method of claim 24 wherein the two-way network comprises a local area computer network.

61. The method of claim 25 wherein the two-way network comprises a computer network.

62. The method of claim 26 wherein the two-way network comprises a computer network.

63. The method of claim 27 wherein the two-way network comprises a local area computer network.

64. The method of claim 28 wherein the two-way network comprises a computer network.

65. The method of claim 29 wherein the telecommunications network includes a POTS line connecting at least one remote Internet point of presence to an associated remote Internet browser whereby said associated remote Internet browser may receive and play said digital data.

66. The method of claim 30 wherein the telecommunications network includes a POTS line connecting at least one remote Internet point of presence to an associated remote Internet browser whereby said associated remote Internet browser may receive and play said digital data.

67. The method of claim 31 wherein the telecommunications network includes a POTS line connecting at least one remote Internet point of presence to an associated remote Internet browser whereby said associated remote Internet browser may receive and play said digital data.

68. The method of claim 32 wherein the telecommunications network includes a POTS line connecting at least one remote Internet point of presence to an associated remote Internet browser whereby said associated remote Internet browser may receive and play said digital data.

69. The method of claim 33 wherein the telecommunications network includes a POTS line connecting at least one remote Internet point of presence to an associated remote Internet browser whereby said associated remote Internet browser may receive and play said digital data.

70. The method of claim 34 wherein the telecommunications network includes a POTS line connecting at least one remote Internet point of presence to an associated remote Internet browser whereby said associated remote Internet browser may receive and play said digital data.

71. The method of claim 35 wherein the telecommunications network includes a POTS line connecting at least one remote Internet point of presence to an associated remote Internet browser whereby said associated remote Internet browser may receive and play said digital data.

72. The method of claim 36 wherein the telecommunications network includes a POTS line connecting at least one remote Internet point of presence to an associated remote Internet browser whereby said associated remote Internet browser may receive and play said digital data.

73. The method of claim 37 wherein the telecommunications network includes a POTS line connecting at least one remote point of presence to an associated remote Internet browser whereby said associated remote Internet browser may receive and play said digital data.

74. The method of claim 38 wherein the telecommunications network includes a POTS line collecting at least one remote point of presence to an associated remote Internet browser whereby said associated remote Internet browser may receive and play said digital data.

75. The method of claim 39 wherein the telecommunications network includes a POTS line connecting at least one remote point of presence to an associated remote Internet browser whereby said associated remote Internet browser may receive and play said digital data.

76. The method of claim 40 wherein the telecommunications network includes a POTS line connecting at least one remote point of presence to an associated remote Internet browser whereby said associated remote Internet browser may receive and play said digital data.

77. A method of transmitting digital video or audio content to independent and distal users accessing the Internet via an Internet backbone, the method comprising the steps of:

a) predetermining a schedule for streaming transmission of streaming digital content from a head-end; and b) stream transmitting the streaming digital content from the head-end, generally according to the schedule, through one-way dedicated transmission bandwidth substantially separate from the Internet backbone for receipt by at least one remote Internet point of presence providing relatively time-insensitive data transmission to a plurality of distal Internet users via two-way Internet connecting through the Internet backbone, c) whereby the plurality of distal Internet users can receive and play the streaming digital content from the Internet point of presence generally according to the predetermined schedule while maintaining said two-way Internet connections of data for the Internet users.

78. The method of claim 77 wherein the Internet point of presence transmits the digital content through remote affiliate points of presence to distal Internet users connected to the remote affiliate points of presence.

* * * * *